United States Patent
Hanauer et al.

(10) Patent No.: US 9,430,107 B2
(45) Date of Patent: Aug. 30, 2016

(54) DETERMINING TOUCH LOCATIONS AND FORCES THERETO ON A TOUCH AND FORCE SENSING SURFACE

(71) Applicant: Microchip Technology Incorporated, Chandler, AZ (US)

(72) Inventors: Jerry Hanauer, Germantown, WI (US); Lance Lamont, Brookfield, WI (US); Keith E. Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/254,098

(22) Filed: Apr. 16, 2014

(65) Prior Publication Data
US 2014/0210791 A1    Jul. 31, 2014

Related U.S. Application Data

(63) Continuation-in-part of application No. 13/830,891, filed on Mar. 14, 2013, now Pat. No. 9,207,820, which is a continuation of application No. 14/097,370, filed on Dec. 5, 2013.

(60) Provisional application No. 61/617,831, filed on Mar. 30, 2012, provisional application No. 61/777,910, filed on Mar. 12, 2013.

(51) Int. Cl.
G06F 3/041 (2006.01)
G06F 3/044 (2006.01)

(52) U.S. Cl.
CPC ............. *G06F 3/044* (2013.01); *G06F 3/0416* (2013.01); *G06F 2203/04104* (2013.01)

(58) Field of Classification Search
CPC ................. G06F 3/044; G06F 3/0416; G06F 2203/04104

USPC .......................................................... 345/174
See application file for complete search history.

(56) References Cited

U.S. PATENT DOCUMENTS 7,460,441 B2    12/2008    Bartling ......................... 368/118
7,764,213 B2    7/2010    Bartling et al. .............. 341/152
(Continued)

FOREIGN PATENT DOCUMENTS

| EP | 2444880 A2 | 4/2012 | ............. G06F 3/044 |
| WO | 97/18528 A1 | 5/1997 | ............. G06F 3/033 |
| WO | 2010/144152 A1 | 12/2010 | ............. G06F 3/041 |

OTHER PUBLICATIONS

Skanda, Vinaya, "AN1208: Integrated Power Factor Correction (PFC) and Sensorless Field Oriented Control (FOC) System," 22 pages, Jun. 17, 2008.

(Continued)

*Primary Examiner* — Temesgh Ghebretinsae
*Assistant Examiner* — Benyam Ketema
(74) *Attorney, Agent, or Firm* — Slayden Grubert Beard PLLC

(57) ABSTRACT

A projected capacitive touch and force sensor capable of detecting multiple touches thereto and forces thereof is coupled with a digital device having multi-touch and force decoding capabilities. Once a touch has been established, a force thereof may be assigned to the touch based upon the magnitude of change of capacitance values determined during scans of the projected capacitive touch and force sensor. The touch forces applied to the touch sensor from the associated tracked touch points may be utilized in further determining three dimensional gesturing, e.g., X, Y and Z positions and forces, respectively.

36 Claims, 37 Drawing Sheets

(56) References Cited

U.S. PATENT DOCUMENTS

| | | | |
|---|---|---|---|
| 7,916,126 B2 | 3/2011 | Westerman et al. | 345/173 |
| 8,614,681 B2 | 12/2013 | Hill et al. | 345/173 |
| 8,692,795 B1 | 4/2014 | Kremin et al. | 345/174 |
| 8,816,986 B1 | 8/2014 | Park et al. | 345/174 |
| 8,976,151 B2 | 3/2015 | Tan et al. | 345/174 |
| 8,982,097 B1 | 3/2015 | Kuzo et al. | 345/174 |
| 2003/0206162 A1 | 11/2003 | Roberts | 345/173 |
| 2007/0229464 A1 | 10/2007 | Hotelling et al. | 345/173 |
| 2008/0018611 A1 | 1/2008 | Serban et al. | 345/173 |
| 2008/0309629 A1 | 12/2008 | Westerman et al. | 345/173 |
| 2009/0174675 A1 | 7/2009 | Gillespie et al. | 345/173 |
| 2009/0231305 A1 | 9/2009 | Hotelling et al. | 345/174 |
| 2010/0026664 A1 | 2/2010 | Geaghan | 345/174 |
| 2010/0181180 A1 | 7/2010 | Peter | 200/5 R |
| 2010/0253651 A1* | 10/2010 | Day | G06F 3/044 345/175 |
| 2010/0289769 A1 | 11/2010 | Watanabe | 345/174 |
| 2011/0025629 A1* | 2/2011 | Grivna | G06F 3/0416 345/173 |
| 2011/0096003 A1 | 4/2011 | Hill et al. | 345/173 |
| 2011/0157074 A1 | 6/2011 | Lin et al. | 345/174 |
| 2011/0175835 A1 | 7/2011 | Wang | 345/174 |
| 2012/0050211 A1* | 3/2012 | King | G06F 3/0416 345/174 |
| 2012/0075243 A1* | 3/2012 | Doi | G06F 3/044 345/174 |
| 2012/0079434 A1* | 3/2012 | Jung | G06T 19/800 715/849 |
| 2012/0105358 A1* | 5/2012 | Momeyer | G06F 3/0414 345/174 |
| 2012/0113047 A1 | 5/2012 | Hanauer et al. | 345/174 |
| 2012/0147052 A1* | 6/2012 | Homma | G06F 3/044 345/660 |
| 2012/0235936 A1 | 9/2012 | Yeh et al. | 345/173 |
| 2013/0021303 A1 | 1/2013 | Martin et al. | 345/178 |
| 2013/0057503 A1 | 3/2013 | Hristov et al. | 345/174 |
| 2013/0068038 A1 | 3/2013 | Bolender et al. | 73/862.626 |
| 2013/0093500 A1 | 4/2013 | Bruwer | 327/517 |
| 2013/0127770 A1 | 5/2013 | Trend | 345/174 |
| 2013/0234985 A1 | 9/2013 | Huang | 345/174 |
| 2013/0257797 A1 | 10/2013 | Wu et al. | 345/174 |
| 2013/0257799 A1 | 10/2013 | Lamont et al. | 345/174 |

OTHER PUBLICATIONS

Bohn, Bruce, "AN1250: Microchip CTMU for Capacitive Touch Applications," Microchip Technology Incorporated, 22 pages, Jan. 16, 2009.

Perme, Thomas et al., "AN1298: Capacitive Touch Using Only an ADC ("CVD")," Microchip Technology Incorporated, 4 pages, Mar. 26, 2009.

O'Connor, Todd, "TB3064: mTouch™ Projected Capacitive Touch Screen Sensing Theory of Operation," Microchip Technology Incorporated, 16 pages, 2010.

Curtis, Keith et al., "AN1325: mTouchTM Metal Over Cap Technology," Microchip Technology Incorporated, URL: http://ww1.microchip.com/downloads/en/AppNotes/01325A.pdf, 8 pages, Jan. 5, 2010

Davison, Burke, "AN1334: Techniques for Robust Touch Sensing Design," Microchip Technology Incorporated, 28 pages, Jul. 15, 2010.

Yedamale, Padmaraja et al., "AN1375: See What You Can Do with the CTMU," Microchip Technology Incorporated, 12 pages, Feb. 18, 2011.

Partial International Search Report, Application No. PCT/US2013/034635, 2 pages, Jun. 18, 2013.

International Search Report and Written Opinion, Application No. PCT/US2013/034635, 17 pages, Sep. 26, 2013.

International Search Report and Written Opinion, Application No. PCT/US2014/01973, 14 pages, May 8, 2014.

Partial International Search Report and Invitation to Pay Additional Fees, Application No. PCT/US2015/025968, 9 pages, Jul. 3, 2015.

International Search Report and Written Opinion, Application No. PCT/US2015/025968, 20 pages, Sep. 10, 2015.

U.S. Non-Final Office Action, U.S. Appl. No. 14/097,370, 17 pages, Mar. 23, 2016.

U.S. Final Office Action, U.S. Appl. No. 14/097,370, 25 pages, Sep. 30, 2015.

U.S. Advisory Action, U.S. Appl. No. 14/097,370, 4 pages, Dec. 17, 2015.

European Office Action, Application No. 13715583.4, 6 pages, Jun. 10, 2016.

* cited by examiner

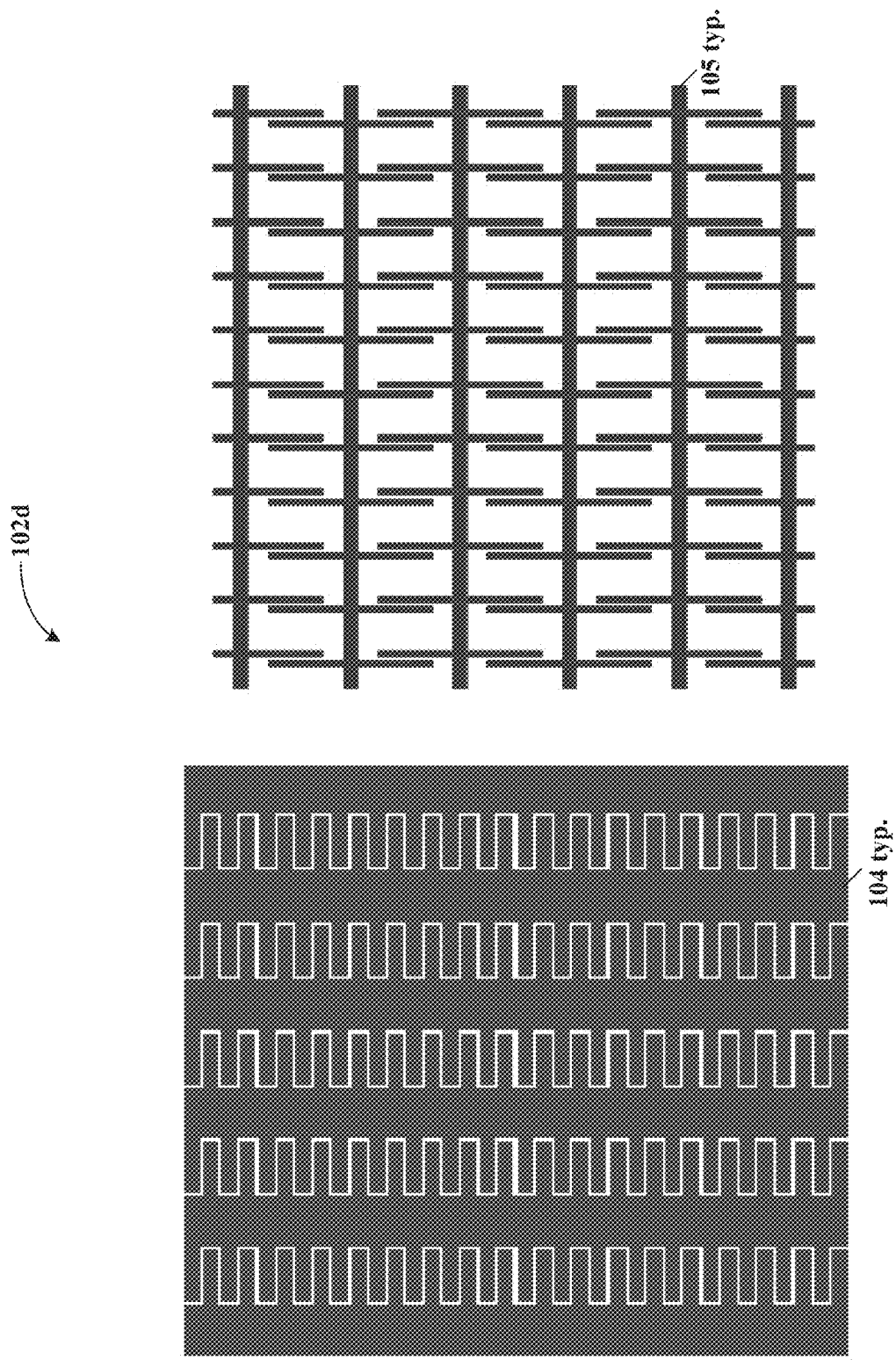

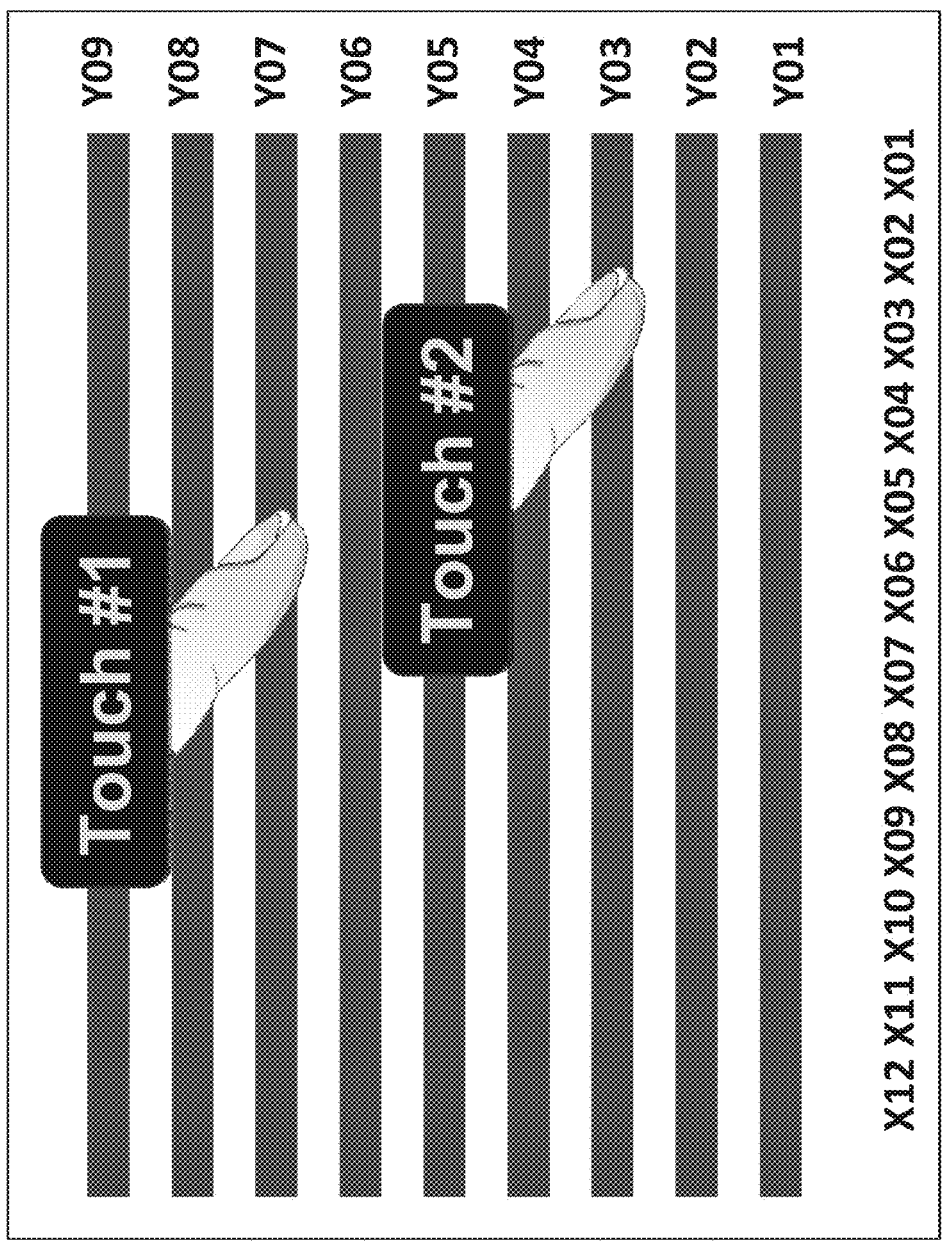

DETERMINING TOUCH LOCATIONS AND FORCES THERETO ON A TOUCH AND FORCE SENSING SURFACE

RELATED PATENT APPLICATION

This application is a continuation-in-part of U.S. patent application Ser. No. 13/830,891; filed Mar. 14, 2013; which claims priority to U.S. Provisional Patent Application No. 61/617,831; filed Mar. 30, 2012. This application is a continuation-in-part of U.S. patent application Ser. No. 14/097,370; filed Dec. 5, 2013; which claims priority to U.S. Provisional Patent Application Ser. No. 61/777,910; filed Mar. 12, 2013; wherein all of which are hereby incorporated by reference herein for all purposes.

TECHNICAL FIELD

The present disclosure relates to capacitive touch sensing, and more particularly, to touch sensing that determines both touch locations and pressure (force) applied at the touch locations.

BACKGROUND

Human interface devices include touch control systems that are based on touch sensing surfaces, e.g., pads, screens, etc., using capacitive sensors that change capacitance values when touched. Transforming the touch(es) on the touch sensor into one or more touch locations is non-trivial. Tracking one or more touches on the touch sensor is also challenging. Advanced touch control systems are capable of detecting not only a single touch and/or movement on a touch sensing surface such as a touch screen, but also so-called multi-touch scenarios in which a user touches more than one location and/or moves more than one finger over the respective touch sensing surface, e.g., gesturing.

Key challenges of multi-touch systems are: limited processing speed of low cost systems, such as processing capabilities of, for example but not limited to, 8-bit microcontroller architectures as these architectures may be unable to do advanced math for processing the respective signals generated by the touch sensing device. There may also exist limited touch scanning performance, for example the entire system may be unable to reasonably sample the entire plane of the touch sensor or screen every "frame." Other challenges include having enough program memory space to provide for touch location determination programs that are concise, modular and general purpose. Limited random access memory (RAM) space may make the touch determination system unable to store multiple entire "images" of the touch detection and location(s) thereof simultaneously.

Hence, there exists a need to improve and simplify touch determination methods. Conventional solutions were threshold based and required complex computations. Hence, there is a need for touch determination methods that are more robust and less computation intensive. Furthermore, there exists a need for high quality multi-touch decoding, in particular, a method and/or system that can be implemented with, for example but not limited to, a low-cost 8-bit micro controller architecture.

Present technology touch sensors generally can only determine a location of a touch thereto, but not a force value of the touch to the touch sensing surface. Being able to determine not only the X-Y coordinate location of a touch but also the force of that touch gives another control option that may be used with a device having a touch sensing surface with such force sensing feature.

SUMMARY

The aforementioned problems are solved, and other and further benefits achieved by a touch location and force determining method and system disclosed herein.

According to an embodiment, a method for decoding multiple touches and forces thereof on a touch sensing surface may comprise the steps of: scanning a plurality of channels aligned on an axis for determining self capacitance values of each of the plurality of channels; comparing the self capacitance values to determine which one of the channels has a local maximum self capacitance value; scanning a plurality of nodes of the at least one channel having the local maximum self capacitance value for determining mutual values of the nodes; comparing the mutual values to determine which one of the nodes has the largest mutual capacitance value, wherein the node having the largest mutual capacitance value on the local maximum self capacitance value channel may be a potential touch location; and determining a force at the potential touch location from a change in the mutual capacitance values of the node at the potential touch location during no touch and during a touch thereto.

According to a further embodiment, the method may comprise the steps of: determining if at least one of the self values may be greater than a self touch threshold, wherein if yes then continue to the step of scanning a plurality of nodes of the at least one channel having the largest self value, and if no then end a touch detection frame as completed. According to a further embodiment, the method may comprise the steps of: determining left and right slope values for the at least one self value, wherein: the left slope value may be equal to the at least one self value minus a self value of a channel to the left of the at least one channel, and the right slope value may be equal to the at least one self value minus a self value of a channel to the right of the at least one channel.

According to a further embodiment, the method may comprise the steps of: determining if the left slope value may be greater than zero (0) and the right slope value may be less than zero (0), wherein if yes then return to the step of scanning the plurality of nodes of the at least one channel, and if no then continue to next step; determining if the left slope value may be greater than zero (0) and greater than the right slope value, wherein if yes then return to the step of scanning the plurality of nodes of the at least one channel, and if no then continue to next step; determining if the left slope value may be less than zero (0) and greater than a percentage of the right slope value, wherein if yes then return to the step of scanning the plurality of nodes of the at least one channel, and if no then continue to next step; determining if there may be another self value, wherein if yes then return to the step of determining if at least one of the self values may be greater than the self touch threshold value using the another self value, and if no then end a touch detection frame as completed.

According to a further embodiment, the method may comprise the steps of: determining if at least one of the mutual values may be greater than a mutual touch threshold, wherein if yes then continue to the step of scanning a plurality of nodes of the at least one channel having the largest self value, and if no then end the touch detection frame as completed. According to a further embodiment, the method may comprise the steps of: determining a next slope value, wherein the next slope value may be equal to a current mutual value minus a next mutual value of a next node; and determining a previous slope value, wherein the previous slope value may be equal to the current mutual value minus a previous mutual value of a previous node.

According to a further embodiment, the method may comprise the steps of: determining if the next slope value may be less than zero (0) and the previous slope value may be greater than zero (0), wherein if yes then begin the step of validating the node, and if no then continue to next step; determining if the next slope value may be greater than zero (0) and less than a percentage of the previous slope value, wherein if yes then begin the step of validating the node, and if no then continue to next step; determining if the next slope value may be less than zero (0) and greater than the previous slope value, wherein if yes then begin the step of validating the node, and if no then continue to next step; determining if there may be another mutual value, wherein if yes then return to the step of determining if at least one of the mutual values may be greater than the mutual touch threshold, and if no then continue to the next step; and determining if there may be another self value, wherein if yes then examine another self value and return to the step of determining if at least one of the self values may be greater than a self touch threshold, and if no then end the touch detection frame as completed.

According to a further embodiment of the method, the step of validating the node may comprise the steps of: identifying the node having a local maximum mutual value as a current node; determining if there may be a valid node north of the current node, wherein if no then continue to the step of determining if there may be a valid node south of the current node, and if yes then perform a mutual measurement on the north node and continue to the next step; determining if the north node may be greater then the current node, if yes then make the north node the current node and continue to the step of determining whether a touch point already exists at this node, and if no then continue to the next step; determining if there may be a valid node south of the current node, wherein if no then continue to the step of determining if there may be a valid node east of the current node, and if yes then perform a mutual measurement on the south node and continue to the next step; determining if the south node may be greater then the current node, wherein if yes then make the south node the current node and continue to the step of determining whether a touch point already exists at this node, and if no then continue to the next step; determining if there may be a valid node east of the current node, wherein if no then continue to the step of determining if there may be a valid node west of the current node, and if yes then perform a mutual measurement on the east node and continue to the next step; determining if the east node may be greater then the current node, if yes then make the east node the current node and continue to the step of determining whether a touch point already exists at this node, and if no then continue to the next step; determining if there may be a valid node west of the current node, wherein if no then continue to the step of determining if there may be a valid node left of the current node, and if yes then perform a mutual measurement on the west node and continue to the next step; determining if the west node may be greater then the current node, if yes then make the west node the current node and continue to the step of determining whether a touch point already exists at this node, and if no then continue to the next step; determining if there may be a valid node left of the current node, wherein if no then define a left mutual value as a center mutual value minus a right mutual value and continue to the step of determining a fine position for the node, and if yes then perform a mutual measurement on the left node and continue to the next step; determining if there may be a valid node right of the current node, wherein if no then define the mutual value as the center mutual value minus the left mutual value and continue to the step of determining the fine position for the node, and if yes then perform a mutual measurement on the right node and continue to the next step; defining a fine position of the node by subtracting the left value from the right value, dividing this difference by the center value and multiplying the result thereof by 64 and continue to the next step; and determining whether interpolation was performed for each axis, wherein if yes, then add another touch point to a list of all detected touch points and return to the step of determining if there may be additional mutual values, and if no, then interpolate an other axis by using left and right nodes of the other axis for starting again at the step of determining if there may be a valid node left of the current node.

According to another embodiment, a system for determining gesturing motions and forces thereof on a touch sensing surface having a visual display may comprise: a first plurality of electrodes arranged in a parallel orientation having a first axis, wherein each of the first plurality of electrodes may comprise a self capacitance; a second plurality of electrodes arranged in a parallel orientation having a second axis substantially perpendicular to the first axis, the first plurality of electrodes may be located over the second plurality of electrodes and form a plurality of nodes may comprise overlapping intersections of the first and second plurality of electrodes, wherein each of the plurality of nodes may comprise a mutual capacitance; a flexible electrically conductive cover over the first plurality of electrodes, wherein a face of the flexible electrically conductive cover forms the touch sensing surface; a plurality of deformable spacers between the flexible electrically conductive cover and the first plurality of electrodes, wherein the plurality of deformable spacers maintains a distance between the flexible electrically conductive cover and the first plurality of electrodes; a digital processor and memory, wherein digital outputs of the digital processor may be coupled to the first and second plurality of electrodes; an analog front end coupled to the first and second plurality of electrodes; an analog-to-digital converter (ADC) having at least one digital output coupled to the digital processor; wherein values of the self capacitances may be measured for each of the first plurality of electrodes by the analog front end, the values of the measured self capacitances may be stored in the memory; values of the mutual capacitances of the nodes of at least one of the first electrodes having at least one of the largest values of self capacitance may be measured by the analog front end, the values of the measured mutual capacitances may be stored in the memory; and the digital processor uses the stored self and mutual capacitance values for determining a gesturing motion and at least one force associated therewith applied to the touch sensing surface.

According to a further embodiment, the digital processor, memory, analog front end and ADC may be provided by a digital device. According to a further embodiment, the digital device may comprise a microcontroller. According to a further embodiment, the flexible electrically conductive cover may comprise a flexible metal substrate. According to a further embodiment, the flexible electrically conductive cover may comprise a flexible non-metal substrate and an electrically conductive coating on a surface thereof. According to a further embodiment, the flexible electrically conductive cover may comprise a substantially light transmissive flexible substrate and a coating of Indium Tin Oxide (ITO) on a surface of the flexible substrate. According to a further embodiment, the flexible electrically conductive cover may comprise a substantially light transmissive flexible substrate and a coating of Antimony Tin Oxide (ATO) on a surface of the flexible substrate.

According to yet another embodiment of the method for determining the gesturing motion and the at least one force associated therewith may comprise the step of selecting an object shown in the visual display by touching the object with a first force. According to a further embodiment, the method may comprise the step of locking the object in place by touching the object with a second force. According to a further embodiment, the method may comprise the step of releasing the lock on the object by touching the object with a third force and moving the touch in a direction across the touch sensing surface. According to a further embodiment, the method may comprise the step of releasing the lock on the object by removing the touch at a first force to the object and then touching the object again at a second force. According to a further embodiment of the method, the second force may be greater than the first force.

According to still another embodiment, a method for determining the gesturing motion and the at least one force associated therewith may comprise the steps of: touching a right portion of an object shown in the visual display with a first force; touching a left portion of the object with a second force; wherein when the first force may be greater than the second force the object rotates in a first direction, and when the second force may be greater than the first force the object rotates in a second direction.

According to a further embodiment of the method, the first direction may be clockwise and the second direction may be counter-clockwise. According to a further embodiment of the method, when the touch at the left portion of the object moves toward the right portion of the object the object rotates in a third direction, and when the touch at the right portion of the object moves toward the left portion of the object may rotate in a fourth direction. According to a further embodiment of the method, the first and second directions may be substantially perpendicular to the third and fourth directions.

According to a further embodiment of the method for determining the gesturing motion and the at least one force associated therewith may comprise the step of: changing a size of an object shown in the visual display by touching a portion of the object with a force, wherein the greater the force the large the size of the object becomes. According to a further embodiment of the method, the size of the object may be fixed when the touch and the force may be moved off of the object. According to a further embodiment of the method, the size of the object varies in proportion to the amount of force applied to the object.

According to a further embodiment of the method for determining the gesturing motion and the at least one force associated therewith may comprise the step of: handling pages of a document shown in the visual display by touching a portion of the document with a force sufficient to flip through the pages. According to a further embodiment of the method, the step of removing a currently visible page may further comprise the step of moving the touch at the currently visible page in a first direction parallel with the touch sensing surface. According to a further embodiment of the method, the step of inserting the removed page into a new document may comprise the step of touching the removed page with the force near the new document.

According to a further embodiment of the method for determining the gesturing motion and the at least one force associated therewith may comprise the step of changing values of an alpha-numeric character shown in the visual display by touching the alpha-numeric character with different forces, wherein a first force will cause the alpha-numeric character to increment and a second force will cause the alpha-numeric character to decrement. According to a further embodiment of the method, the value of the alpha-numeric character may be locked when the touch may be moved off of the alpha-numeric character and parallel to the touch sensing surface.

According to a further embodiment of the method for determining the gesturing motion and the at least one force associated therewith may comprise the steps of: incrementing a value of an alpha-numeric character shown in the visual display by touching an upper portion of the alpha-numeric character with a force; and decrementing the value of the alpha-numeric character by touching an lower portion of the alpha-numeric character with the force. According to a further embodiment of the method, the value of the alpha-numeric character may be locked when the touch may be moved off of the alpha-numeric character and parallel to the touch sensing surface. According to a further embodiment of the method, a speed of incrementing or decrementing the value of the alpha-numeric character may be proportional to a magnitude of the force applied to upper portion or lower portion, respectively, of the alpha-numeric character. According to a further embodiment of the method, the alpha-numeric character may be a number. According to a further embodiment of the method, the alpha-numeric character may be a letter of an alphabet.

BRIEF DESCRIPTION OF THE DRAWINGS

A more complete understanding of the present disclosure thereof may be acquired by referring to the following description taken in conjunction with the accompanying drawings wherein:

FIGS. 4A to 4D illustrate schematic plan views of touch sensors having various capacitive touch sensor configurations, according to the teachings of this disclosure;

FIGS. 4G to 4K illustrate schematic plan views of self and mutual capacitive touch detection of two touches to a touch sensor, according to the teachings of this disclosure;

Figure 1:
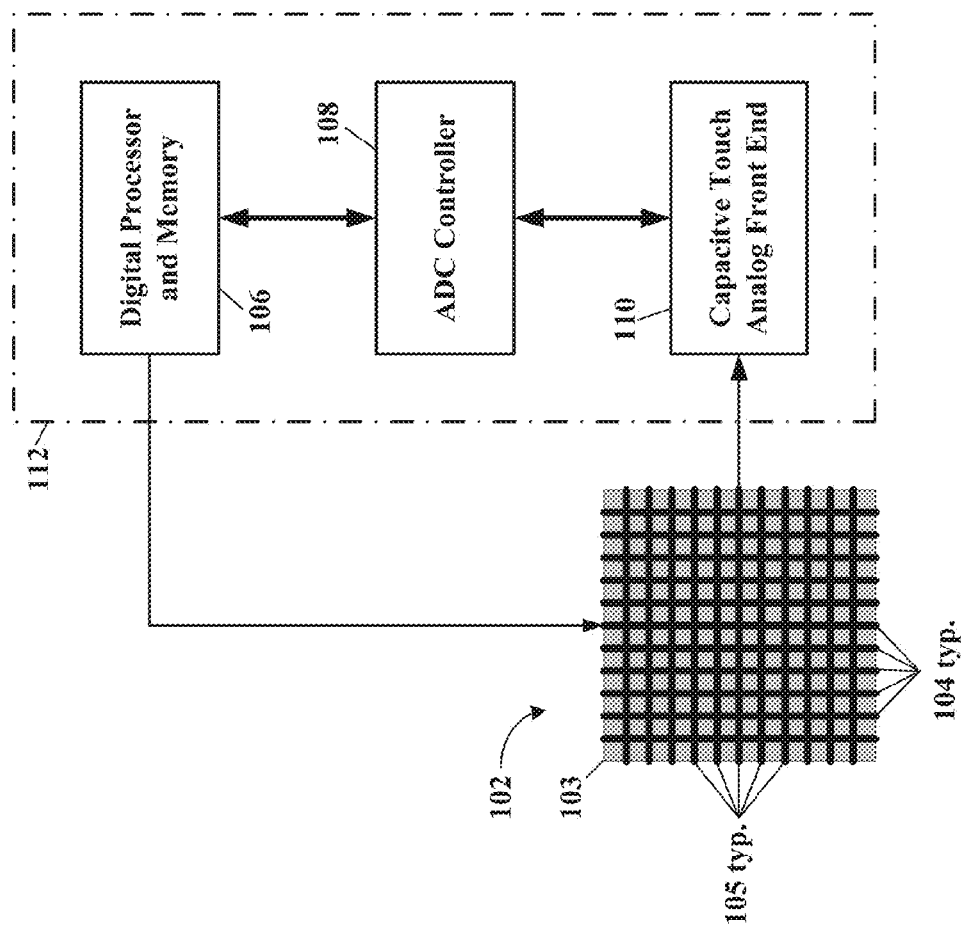
FIG. 1 illustrates a schematic block diagram of an electronic system having a capacitive touch sensor, a capacitive touch analog front end and a digital processor, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, a series of optimized processes may be provided that scan a plurality of (electrically) conductive columns and rows arranged in a matrix on a surface, e.g., touch sensor display or panel, and which identify and track a plurality of touches thereto and forces thereof. These processes may be further optimized for operation with a low cost 8-bit microcontroller, according to specific embodiments of this disclosure.

Once a touch has been established, a force thereof may be assigned to the touch based upon the magnitude of change of the capacitance values determined during scans of a touch sensor, as more fully described hereinabove. Also the touch forces applied to the touch sensor from the associated tracked touch points may be utilized in further determining three dimensional gesturing, e.g., X, Y and Z positions and forces, respectively. For example, proportional force at a touch location(s) allows three dimensional control of an object projected onto a screen of the touch sensor. Differing pressures on multiple points, e.g., during more then one touch (multiple fingers touching face of touch sensor), allows object rotation control. A touch at a certain force may allow selecting an object(s) and a touch at a difference, e.g., greater force, may be used to fix the location(s) of the object(s) on the display of the touch sensor.

Rocking multi-touch presses to produce varying touch forces may be used for rotation of an object. A vertical motion, e.g., vertical sliding, press may be used to scale a vertical size of an object. A horizontal motion, e.g., horizontal sliding, press may be used to scale a horizontal size of an object. Touches with varying force may be used to flip through pages of a document. A varying force may be used to insert a page into a stack of pages of a document. A vertical or horizontal gesture and force may be used to activate a function, e.g., empty trash bin icon. Varying touch pressure may be used to lift a page off of a document for transmission to another display. Varying touch pressure may change the scope of a gesture movement, e.g., selecting a picture instead of the full document. Pressing with a sweeping gesture may be used for an object release and discard. Varying touch pressures may be used to select alpha-numeric characters or drop function boxes.

According to various embodiments, these processes utilize both self and mutual scans to perform an optimized scan of the plurality of conductive columns and rows used for touch sensing. Using that as the basis, the proposed processes may use a subset of the data from the plurality of conductive columns and rows in order to do all necessary processing for touch location identification and tracking. The various embodiments specifically focus on a low-resource requirement solution for achieving touch location identification and tracking.

According to various embodiments, self capacitances of either the conductive columns or rows may be measured first then mutual capacitances of only those conductive columns or rows may be measured in combination with the other axis of conductive rows or columns. The various embodiments disclosed herein overcome the problem of transforming these self and mutual capacitance measurements into one or more touches and forces thereof, and tracking these one or more touches and forces thereof through multiple frames of the capacitance measurements of the conductive columns or rows as described hereinabove.

According to various embodiments, at least one process may scan a plurality of conductive columns and rows arranged in a matrix, detect and track up to N touches, using various unique techniques disclosed and claimed herein. A process of peak detection examines slope ratios to accurately and quickly determine peak measurements. According to various embodiments, the challenge of tracking multiple touch locations may be solved through time on associated ones of the plurality of conductive columns or rows.

The various embodiments may allow for N touches to compensate for touches of different finger positions, e.g., such as a flat finger, that prevents missed touches and substantially eliminates incorrect touches.

According to various embodiments, a process is provided for quickly identifying accurate touches instead of only looking at true peaks, wherein a "virtual" peak may be found by examining slope ratios using various techniques disclosed herein for touch identification. A combination of unique processes, according to the teachings of this disclosure, may be used to achieve better accuracy and speed improvements for multi-touch decoding. For example, a peak detection process may be implemented as a "fuzzy"

peak detection process that examines slope relationships, not just signs of the slopes between the conductive columns measured. Furthermore, a so-called "nudge technique" may be used that "nudges" a potential touch location to a best location by examining adjacent values thereto. "Windowed" data cache may be used to accelerate processing in a low capacity RAM environment, e.g., 8-bit microcontroller. Interpolation may be used to increase the touch location resolution based upon measured values adjacent thereto. Multi-touch tracking may be used to identify N touches through time. Multi-touch tracking may be used to track N touches through time. Weighted matching may be used in a weighting method to best match touch points over time. "Area" detection may use a process that allows easy area and/or pressure detection based upon the sum of the nudged values for a given touch location.

Significant accuracy and speed of decoding improvements may use a combination of novel techniques for use in a low memory capacity and low cost digital processor, e.g., microcontroller, microprocessor, digital signal processor (DSP), application specific integrated circuit (ASIC), programmable logic array (PLA), etc. Various embodiments may track eight or more touches and forces thereof on, for example but not limited to, a 3.5 inch touch sensor capacitive sensor array. For example when using a Microchip PIC18F46K22 (64K ROM, <4K RAM) microcontroller.

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a schematic block diagram of an electronic system having a capacitive touch sensor, a capacitive touch analog front end and a digital processor, according to the teachings of this disclosure. A digital device 112 may comprise a digital processor and memory 106, an analog-to-digital converter (ADC) controller 108, and a capacitive touch analog front end (AFE) 110. The digital device 112 may be coupled to a touch sensor 102 comprised of a plurality of conductive columns 104 and rows 105 arranged in a matrix and having a flexible electrically conductive cover 103 thereover. It is contemplated and within the scope of this disclosure that the conductive rows 105 and/or conductive columns 104 may be, for example but are not limited to, printed circuit board conductors, wires, Indium Tin Oxide (ITO) or Antimony Tin Oxide (ATO) coatings on a clear substrate, e.g., display/touch screen, etc., or any combinations thereof. The flexible electrically conductive cover 103 may comprise metal, conductive non-metallic material, ITO or ATO coating on a flexible clear substrate (plastic), etc. The digital device 112 may comprise a microcontroller, microprocessor, digital signal processor, application specific integrated circuit (ASIC), programmable logic array (PLA), etc., and may further comprise one or more integrated circuits (not shown), packaged or unpackaged.

Figure 2:
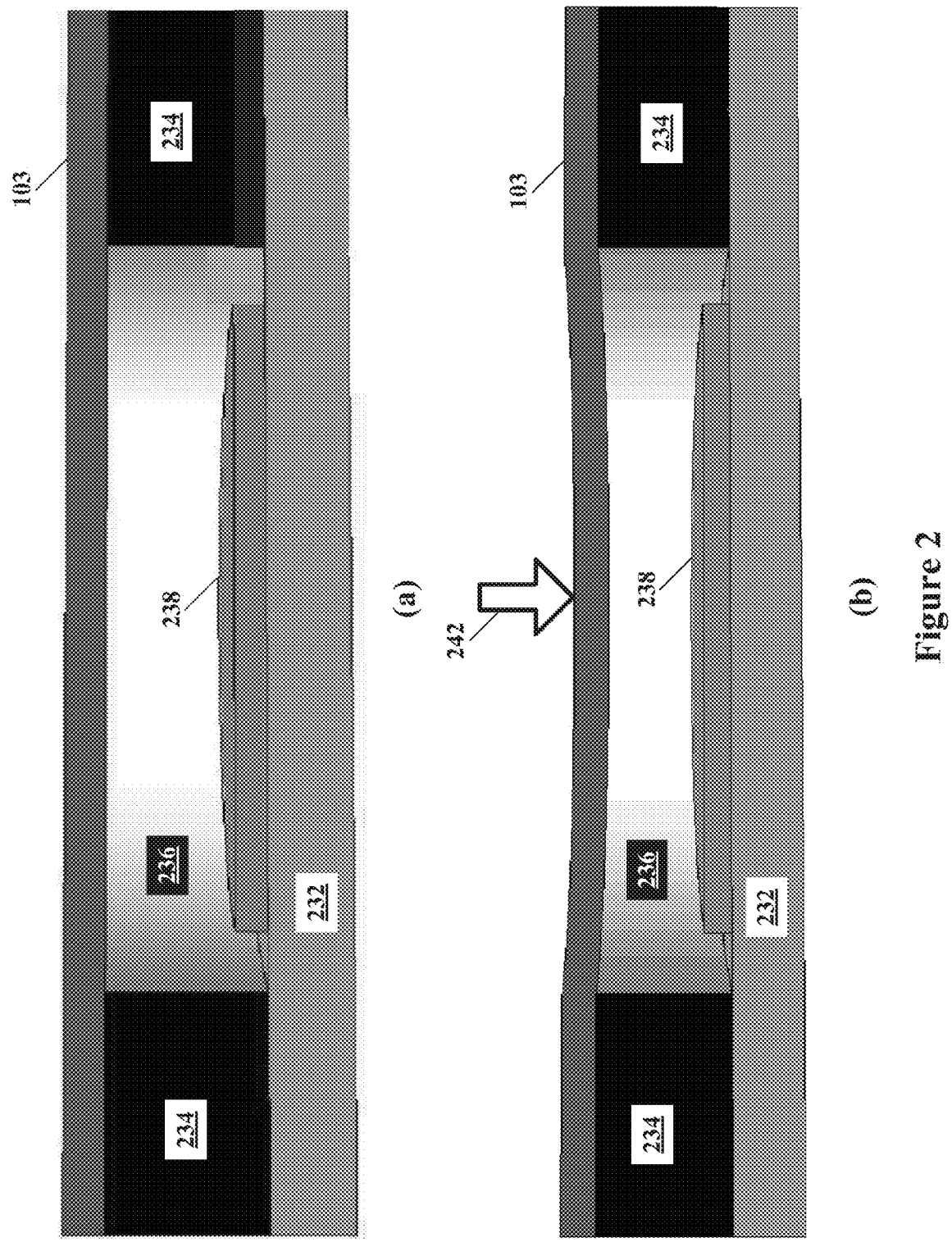
FIG. 2 illustrates schematic elevational views of metal over capacitive touch sensors, according to the teachings of this disclosure.

Referring to FIG. 2, depicted are schematic elevational views of metal over capacitive touch sensors, according to the teachings of this disclosure. A capacitive sensor 238 is on a substrate 232. On either side of the capacitive sensor 238 are spacers 234, and an electrically conductive flexible cover 103, e.g., metal, ITO or ATO coated plastic, etc.; is located on top of the spacers 234 and forms a chamber 236 over the capacitive sensor 238. When a force 242 is applied to a location on the flexible cover 103, the flexible cover 103 moves toward the capacitive sensor 238, thereby increasing the capacitance thereof. The capacitance value(s) of the capacitive sensor(s) 238 is measured and an increase in capacitance value thereof will indicate the location of the force 242 (e.g., touch). The capacitance value of the capacitive sensor 238 will increase the closer the flexible cover 103 moves toward the face of the capacitive sensor 238. Metal over capacitive touch technology is more fully described in Application Note AN1325, entitled "mTouch™ Metal over Cap Technology" by Keith Curtis and Dieter Peter, available www.microchip.com; and is hereby incorporated by reference herein for all purposes.

Figure 3:
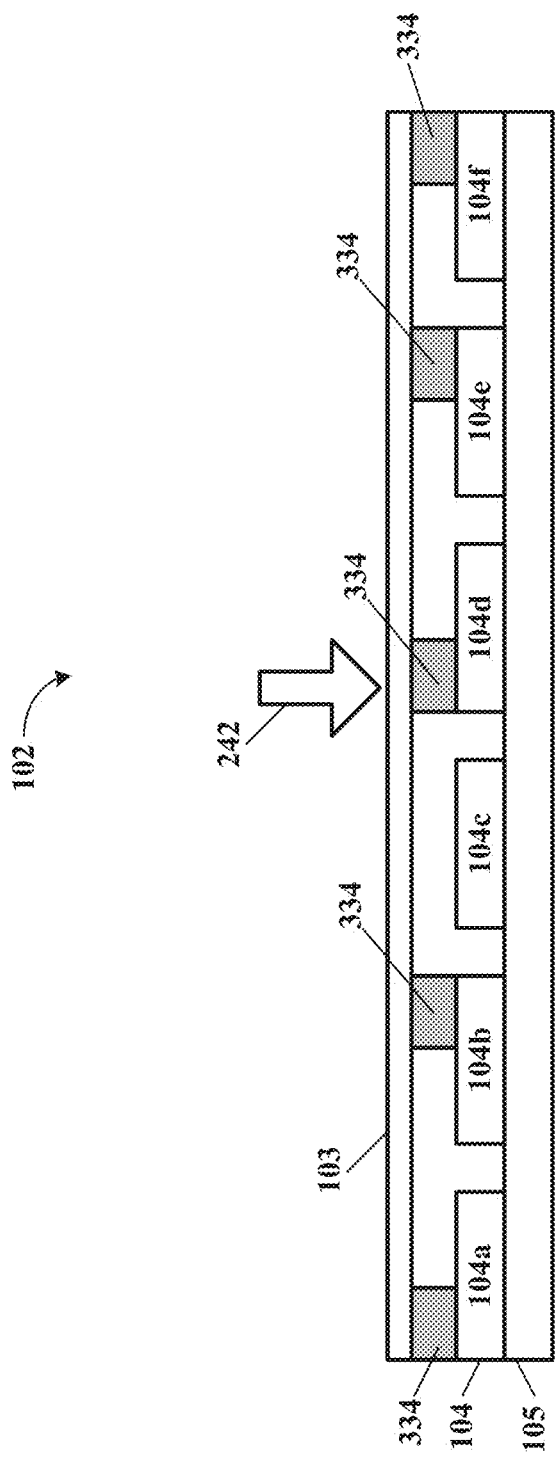
FIG. 3 illustrates a schematic elevational view of a touch sensor capable of detecting both locations of touches thereto and forces of those touches, according to the teachings of this disclosure.

Referring to FIG. 3, depicted is a schematic elevational view of a touch sensor capable of detecting both locations of touches thereto and forces of those touches, according to the teachings this disclosure. A touch sensor capable of detecting both a location of a touch(es) thereto and a force(s) of that touch(es) thereto, generally represented by the numeral 102, may comprise a plurality of conductive rows 105, a plurality of conductive columns 104, a plurality of deformable spacers 334, and a flexible electrically conductive cover 103.

The conductive columns 104 and the conductive rows 105 may be used in determining a location(s) of a touch(es), more fully described in Technical Bulletin TB3064, entitled "mTouch™ Projected Capacitive Touch Screen Sensing Theory of Operation" referenced hereinabove, and the magnitude of changes in the capacitance values of the conductive column(s) 104 at and around the touch location(s) may be used in determining the force 242 (amount of pressure applied at the touch location). The plurality of deformable spacers 334 may be used to maintain a constant spacing between the flexible conductive cover 103 and a front surface of the conductive columns 104 when no force 242 is being applied to the flexible electrically conductive cover 103. When force 242 is applied to a location on the flexible electrically conductive cover 103, the flexible electrically conductive cover 103 will be biased toward at least one conductive column 104, thereby increasing the capacitance thereof. Direct measurements of capacitance values and/or ratios of the capacitance values may be used in determining the magnitude of the force 242 being applied at the touch location(s).

Referring back to FIG. 1, digital devices 112, e.g., microcontrollers, now include peripherals that enhance the detection and evaluation of such capacitive value changes. More detailed descriptions of various capacitive touch system applications are more fully disclosed in Microchip Technology Incorporated application notes AN1298, AN1325 and AN1334, available at www.microchip.com, and all are hereby incorporated by reference herein for all purposes.

One such application utilizes the capacitive voltage divider (CVD) method to determine a capacitance value and/or evaluate whether the capacitive value has changed. The CVD method is more fully described in Application Note AN1208, available at www.microchip.com; and a more detailed explanation of the CVD method is presented in commonly owned United States Patent Application Publication No. US 2010/0181180, entitled "Capacitive Touch Sensing using an Internal Capacitor of an Analog-To-Digital Converter (ADC) and a Voltage Reference," by Dieter Peter; wherein both are hereby incorporated by reference herein for all purposes.

A Charge Time Measurement Unit (CTMU) may be used for very accurate capacitance measurements. The CTMU is more fully described in Microchip application notes AN1250 and AN1375, available at www.microchip.com, and commonly owned U.S. Pat. No. 7,460,441 B2, entitled "Measuring a long time period;" and U.S. Pat. No. 7,764, 213 B2, entitled "Current-time digital-to-analog converter," both by James E. Bartling; wherein all of which are hereby incorporated by reference herein for all purposes.

It is contemplated and within the scope of this disclosure that any type of capacitance measurement circuit having the necessary resolution may be used in determining the capacitance values of the plurality of conductive columns 104 and nodes (intersections of columns 104 and rows 105), and that a person having ordinary skill in the art of electronics and having the benefit of this disclosure could implement such a capacitance measurement circuit.

Figure 4A:
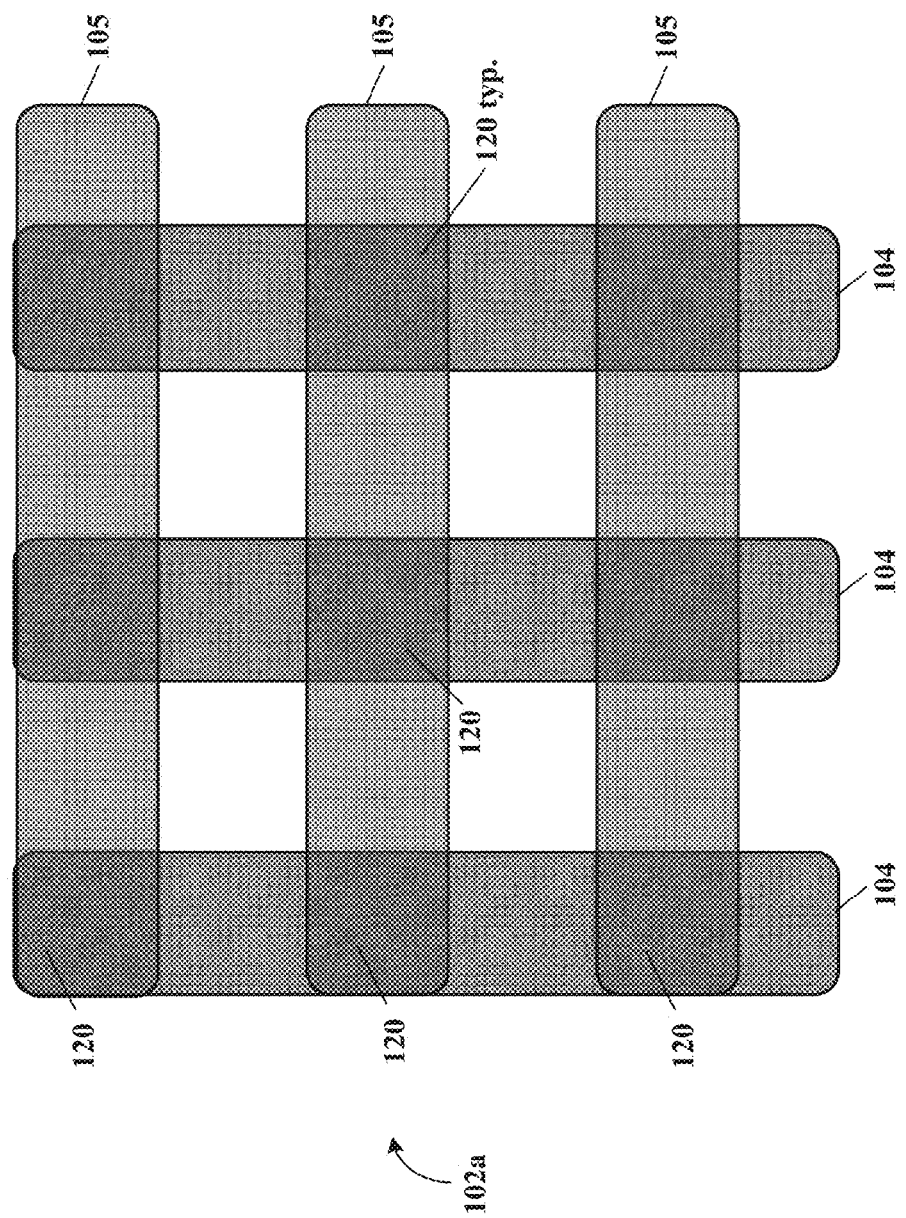

Referring to FIGS. 4A to 4D, depicted are schematic plan views of touch sensors having various capacitive touch sensor configurations, according to the teachings of this disclosure. FIG. 4A shows conductive columns 104 and conductive rows 105. Each of the conductive columns 104 has a "self capacitance" that may be individually measured when in a quiescent state, or all of the conductive rows 105 may be actively excited while each one of the conductive columns 104 has self capacitance measurements made thereof. Active excitation of all of the conductive rows 105 may provide a stronger measurement signal for individual capacitive measurements of the conductive columns 104.

For example, if there is a touch detected on one of the conductive columns 104 during a self capacitance scan, then only that conductive column 104 having the touch detected thereon need be measured further during a mutual capacitance scan thereof. The self capacitance scan may only determine which one of the conductive columns 104 has been touched, but not at what location along the axis of that conductive column 104 where it was touched. The mutual capacitance scan may determine the touch location along the axis of that conductive column 104 by individually exciting (driving) one at a time the conductive rows 105 and measuring a mutual capacitance value for each one of the locations on that conductive column 104 that intersects (crosses over) the conductive rows 105. There may be an insulating non-conductive dielectric (not shown) between and separating the conductive columns 104 and the conductive rows 105. Where the conductive columns 104 intersect with (crossover) the conductive rows 105, mutual capacitors 120 are thereby formed. During the self capacitance scan above, all of the conductive rows 105 may be either grounded or driven with a logic signal, thereby forming individual column capacitors associated with each one of the conductive columns 104.

Figure 4B:
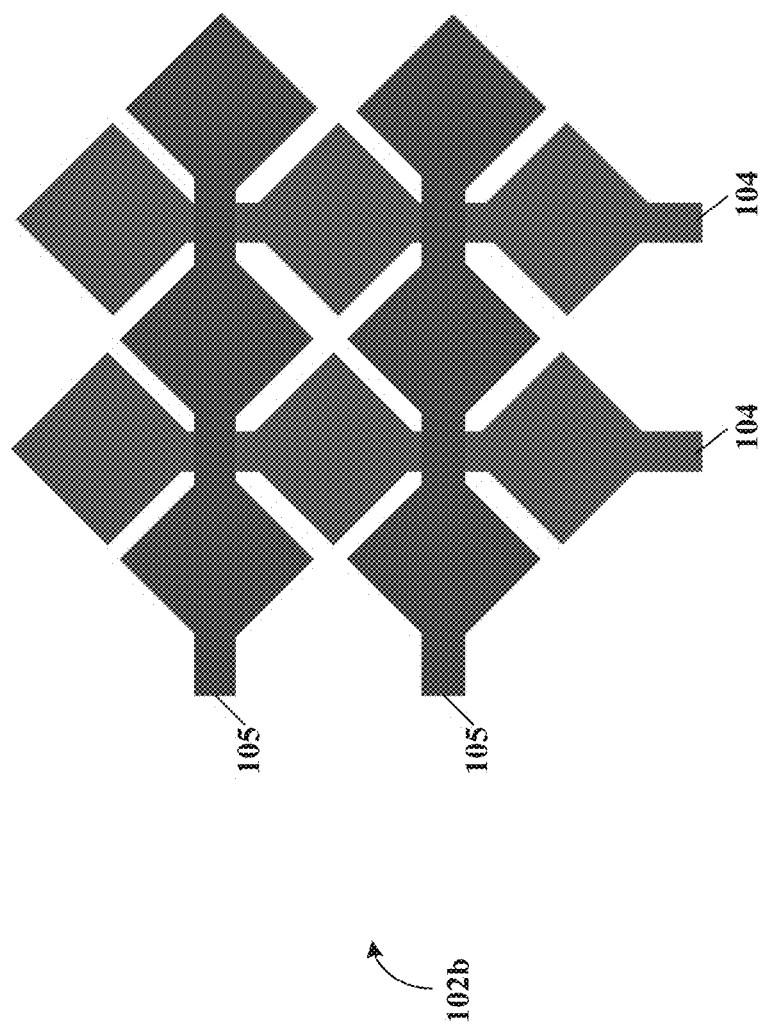
Figure 4C:
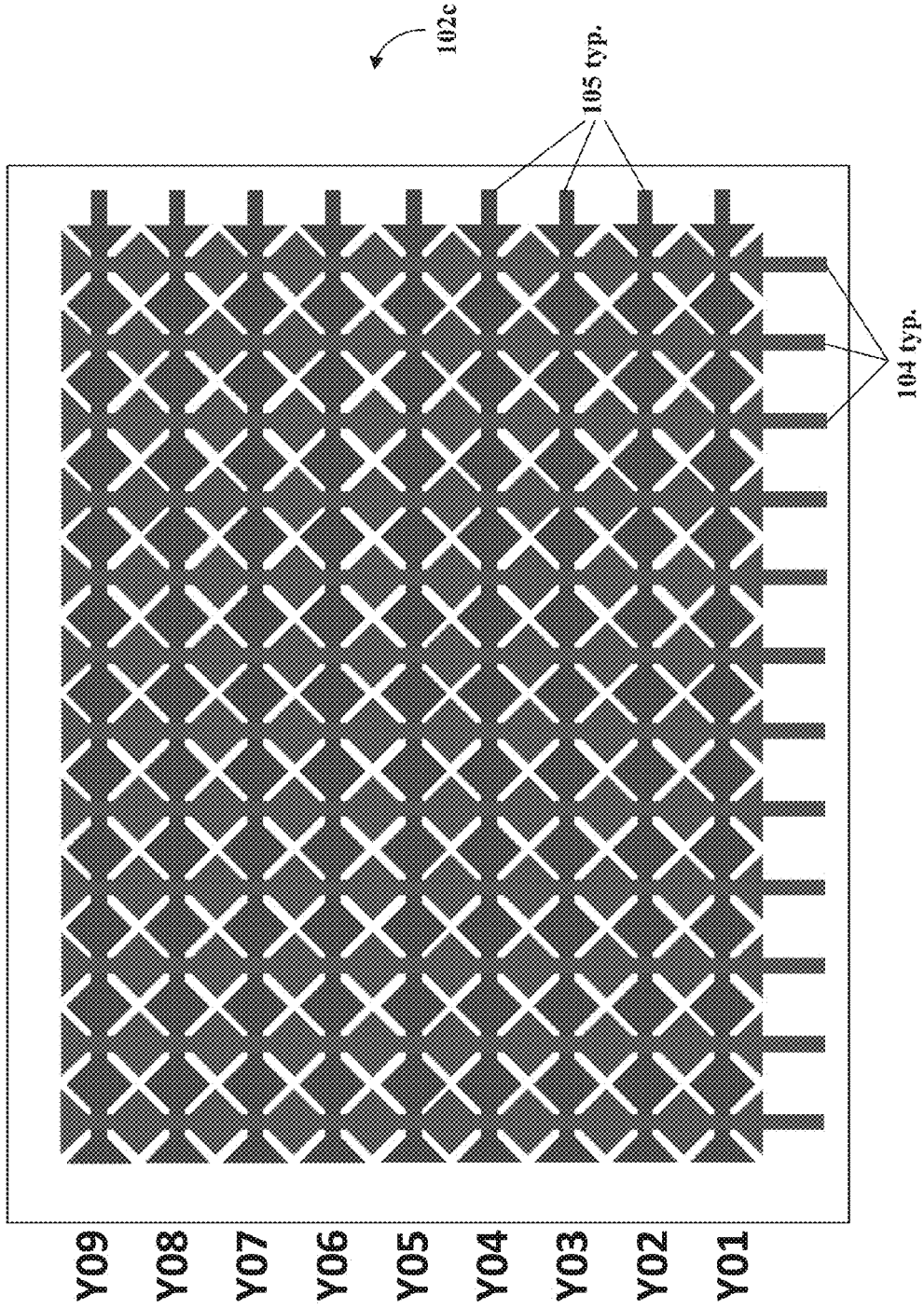

FIGS. 4B and 4C show interleaving of diamond shaped patterns of the conductive columns 104 and the conductive rows 105. This configuration may maximize exposure of each axis conductive column and/or row to a touch (e.g., better sensitivity) with a smaller overlap between the conductive columns 104 and the conductive rows 105. FIG. 4D shows receiver (top) conductive rows (e.g., electrodes) 105*a* and transmitter (bottom) conductive columns 104*a* comprising comb like meshing fingers. The conductive columns 104*a* and conductive rows 105*a* are shown in a side-by-side plan view, but normally the top conductive rows 105*a* would be over the bottom conductive columns 104*a*. Self and mutual capacitive touch detection is more fully described in Technical Bulletin TB3064, entitled "mTouch™ Projected Capacitive Touch Screen Sensing Theory of Operation" by Todd O'Connor, available at www.microchip.com; and commonly owned United States Patent Application Publication No. US 2012/0113047, entitled "Capacitive Touch System Using Both Self and Mutual Capacitance" by Jerry Hanauer; wherein both are hereby incorporated by reference herein for all purposes.

Figure 4E:
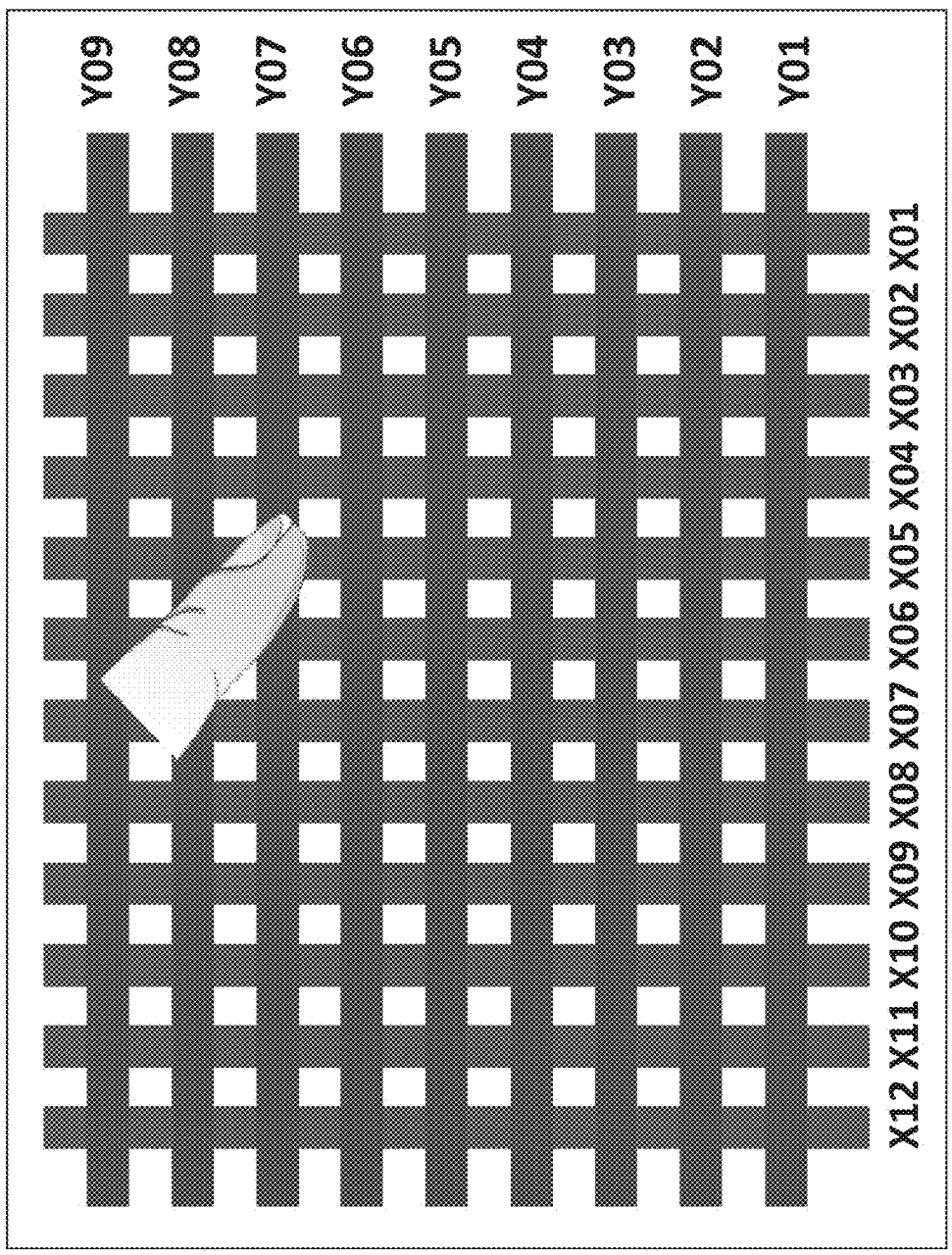
FIGS. 4E and 4F illustrate schematic plan views of self and mutual capacitive touch detection of a single touch to a touch sensor, according to the teachings of this disclosure.
Figure 4F:
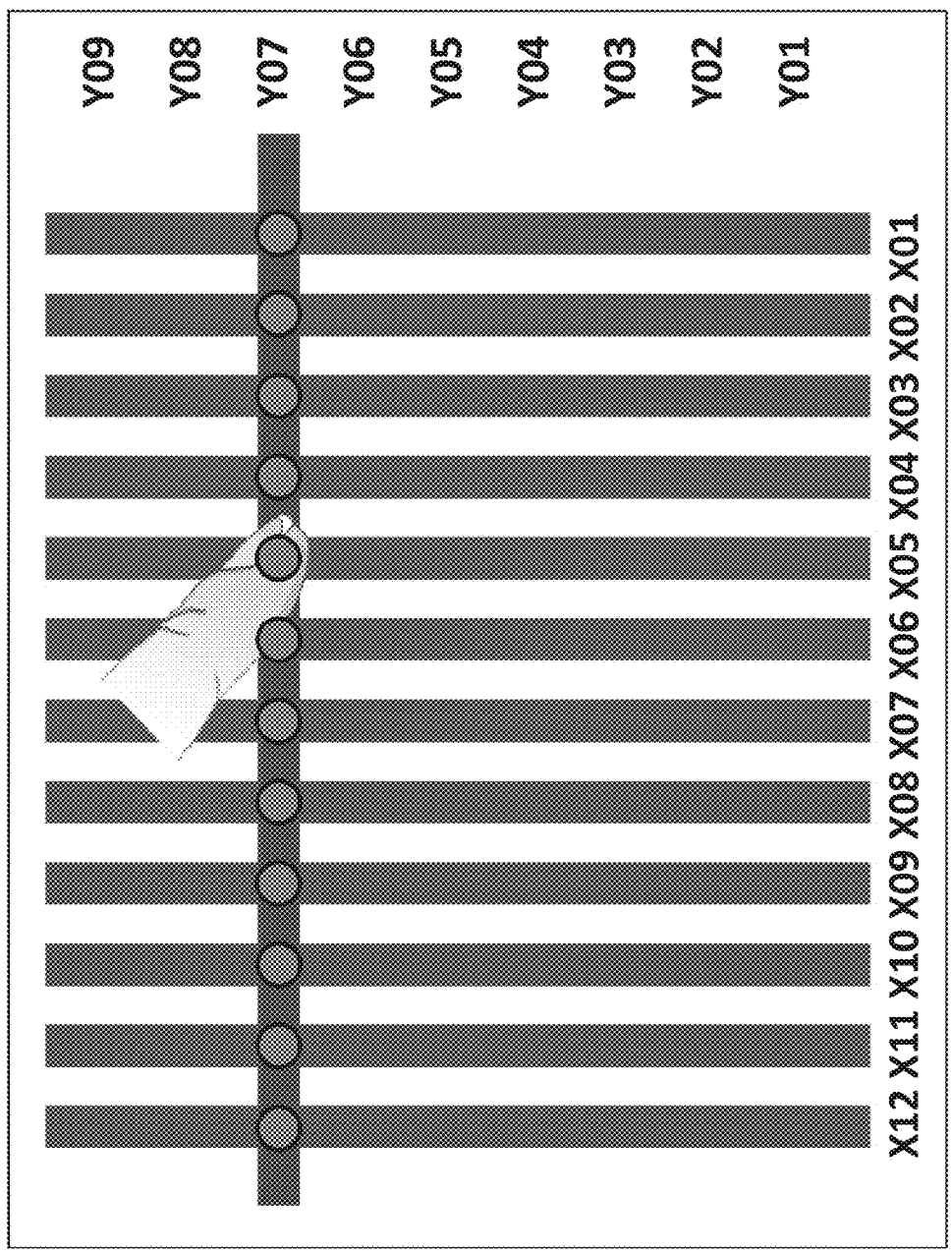

Referring to FIGS. 4E and 4F, depicted are schematic plan views of self and mutual capacitive touch detection of a single touch to a touch sensor, according to the teachings of this disclosure. In FIG. 4E a touch, represented by a picture of a part of a finger, is at approximately the coordinates of X05, Y07. During self capacitive touch detection each one of the rows Y01 to Y09 may be measured to the determine the capacitance values thereof. Note that baseline capacitance values with no touches thereto for each one of the rows Y01 to Y09 have been taken and stored in a memory (e.g., memory 106—FIG. 1). Any significant capacitance change to the baseline capacitance values of the rows Y01 to Y09 will be obvious and taken as a finger touch. In the example shown in FIG. 4E the finger is touching row Y07 and the capacitance value of that row will change, indicating a touch thereto. However it is still unknown from the self capacitance measurements where on this row that the touch has occurred.

Once the touched row (Y07) has been determined using the self capacitance change thereof, mutual capacitive detection may be used in determining where on the touched row (Y07) the touch has occurred. This may be accomplished by exciting, e.g., putting a voltage pulse on, each of the columns X01 to X12 one at a time while measuring the capacitance value of row Y07 when each of the columns X01 to X12 is individually excited. The column (X05) excitation that causes the largest change in the capacitance value of row Y07 will be the location on that row which corresponds to the intersection of column X05 with row Y07, thus the single touch is at point or node X05, Y07. Using self and mutual capacitance touch detection significantly reduces the number of row and column scans to obtain the X,Y touch coordinate on the touch sensor 102. In this example, nine (9) rows were scanned during self capacitive touch detection and twelve (12) columns were scanned during mutual capacitive touch detection for a total number of 9+12=21 scans. If individual x-y capacitive touch sensors for each node (location) were used then 9×12=108 scans would be necessary to find this one touch, a significant difference. It is contemplated and within the scope of this disclosure that the self capacitances of the columns X01 to X21 may be determined first then mutual capacitances determined of a selected column(s) by exciting each row Y01 to Y09 to find the touch location on the selected column(s).

Figure 4G:
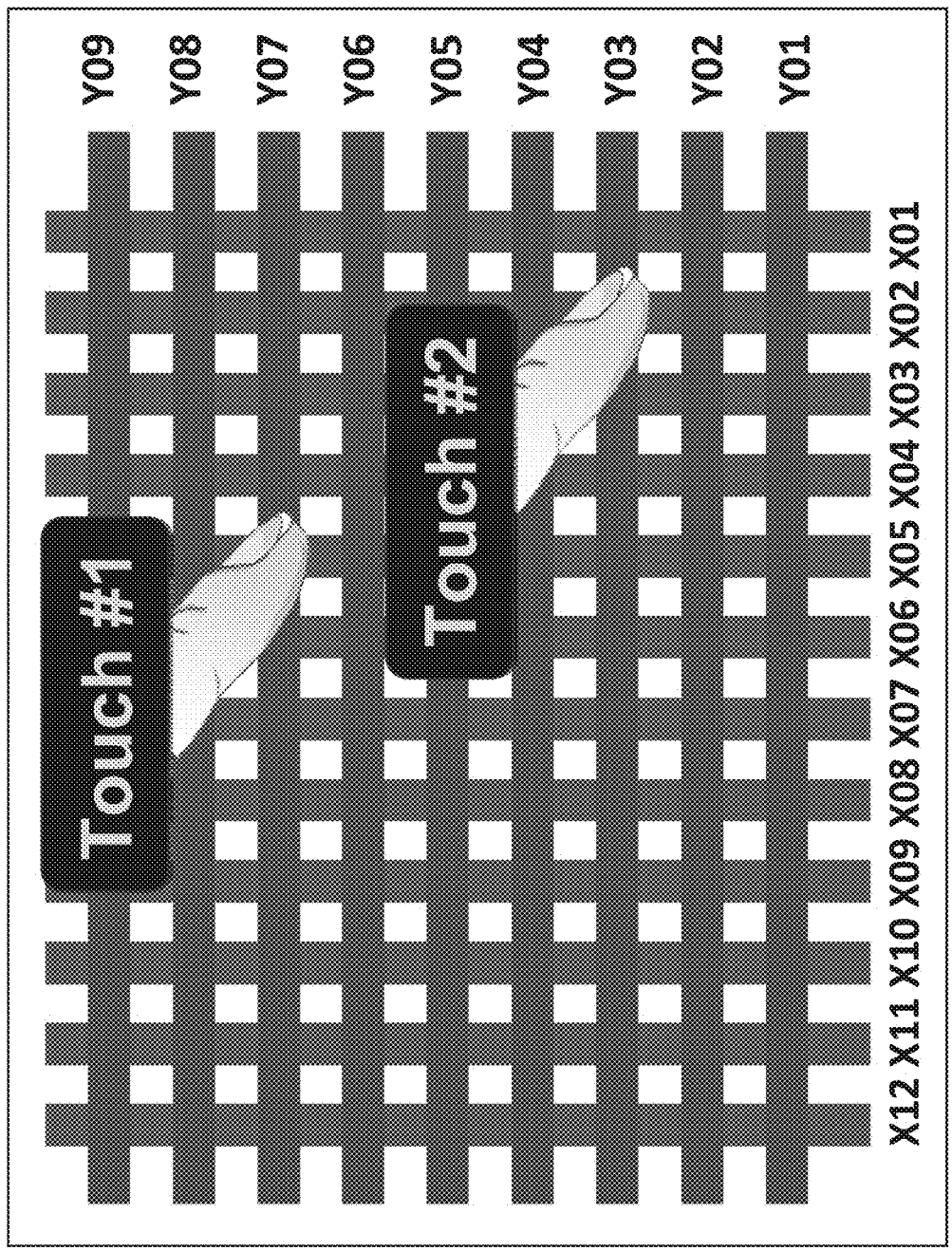

Referring to FIGS. 4G to 4K, depicted are schematic plan views of self and mutual capacitive touch detection of two touches to a touch sensor, according to the teachings of this disclosure. In FIG. 4G two touches, represented by a picture of parts of two fingers, are at approximately the coordinates of X05, Y07 for touch #1 and X02, Y03 for touch #2. During self capacitive touch detection each one of the rows Y01 to Y09 may be measured to the determine the capacitance values thereof. Note that baseline capacitance values with no touches thereto for each one of the rows Y01 to Y09 have been taken and stored in a memory (e.g., memory 106—FIG. 1). Any significant capacitance changes to the baseline capacitance values of the rows Y01 to Y09 will be obvious and taken as finger touches. In the example shown in FIG. 4H the first finger is touching row Y07 and the second finger is touching row Y03, wherein the capacitance values of those two rows will change, indicating touches thereto. However it is still unknown from the self capacitance measurements where on these two row that the touches have occurred.

Figure 4I:
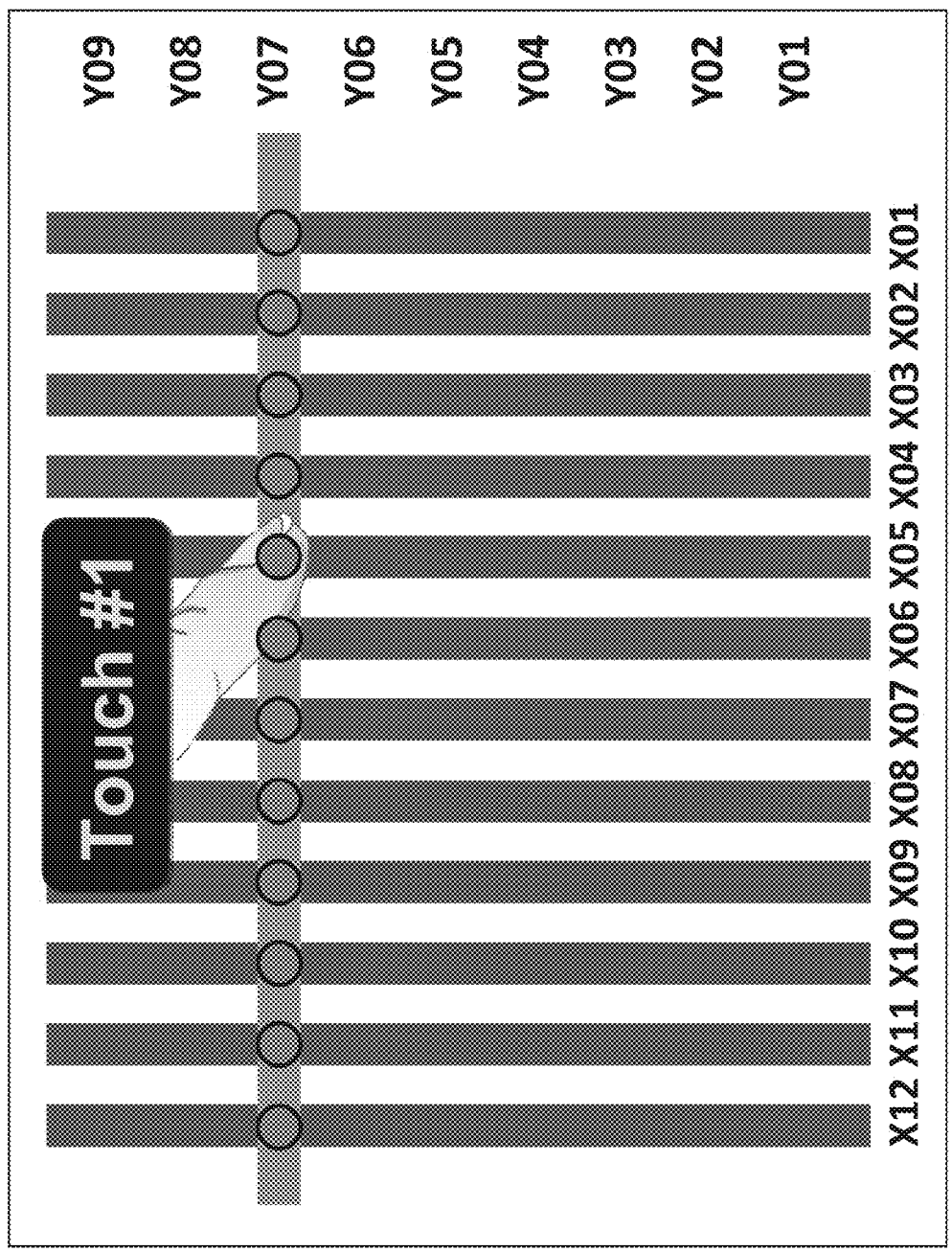
Figure 4J:
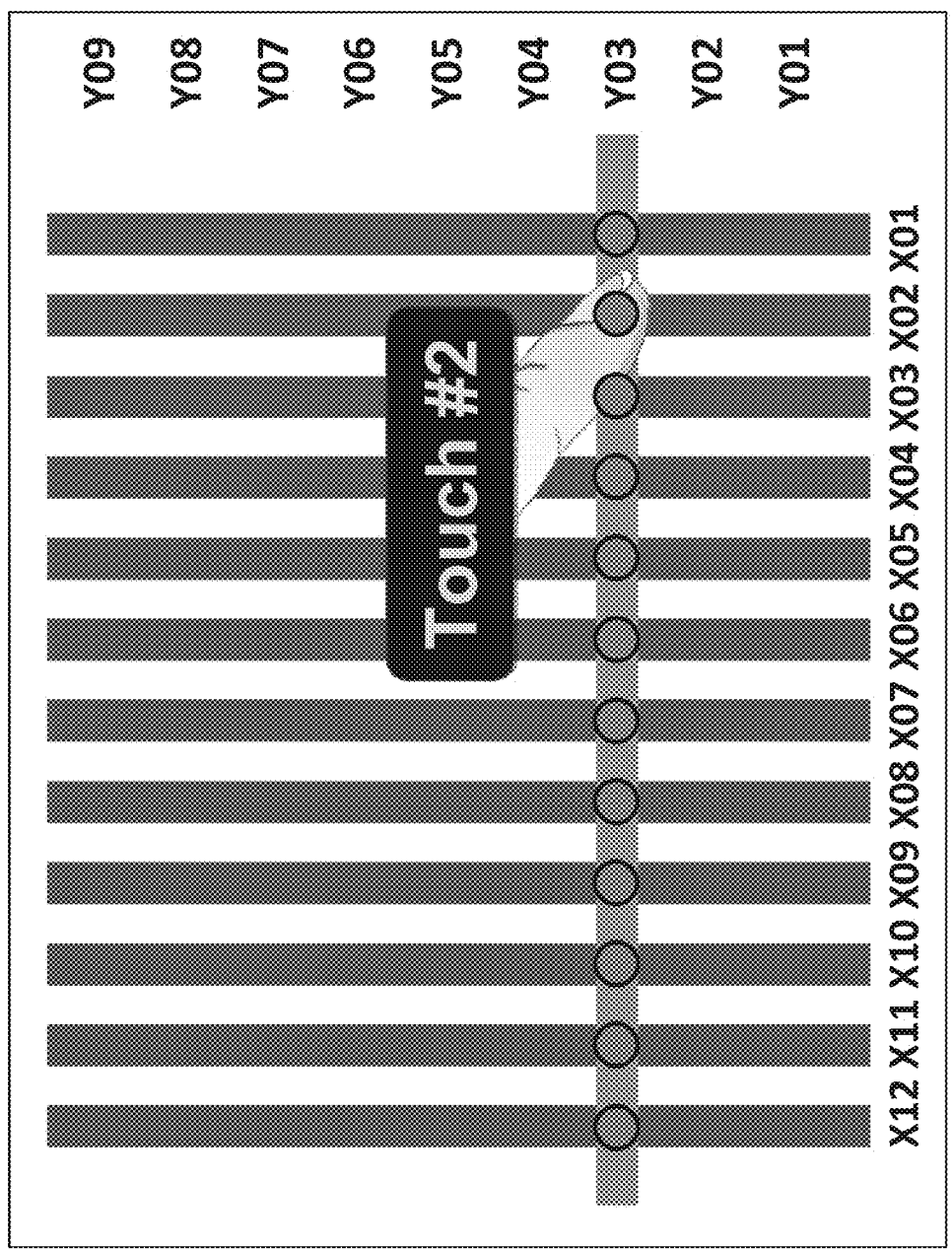
Figure 4K:
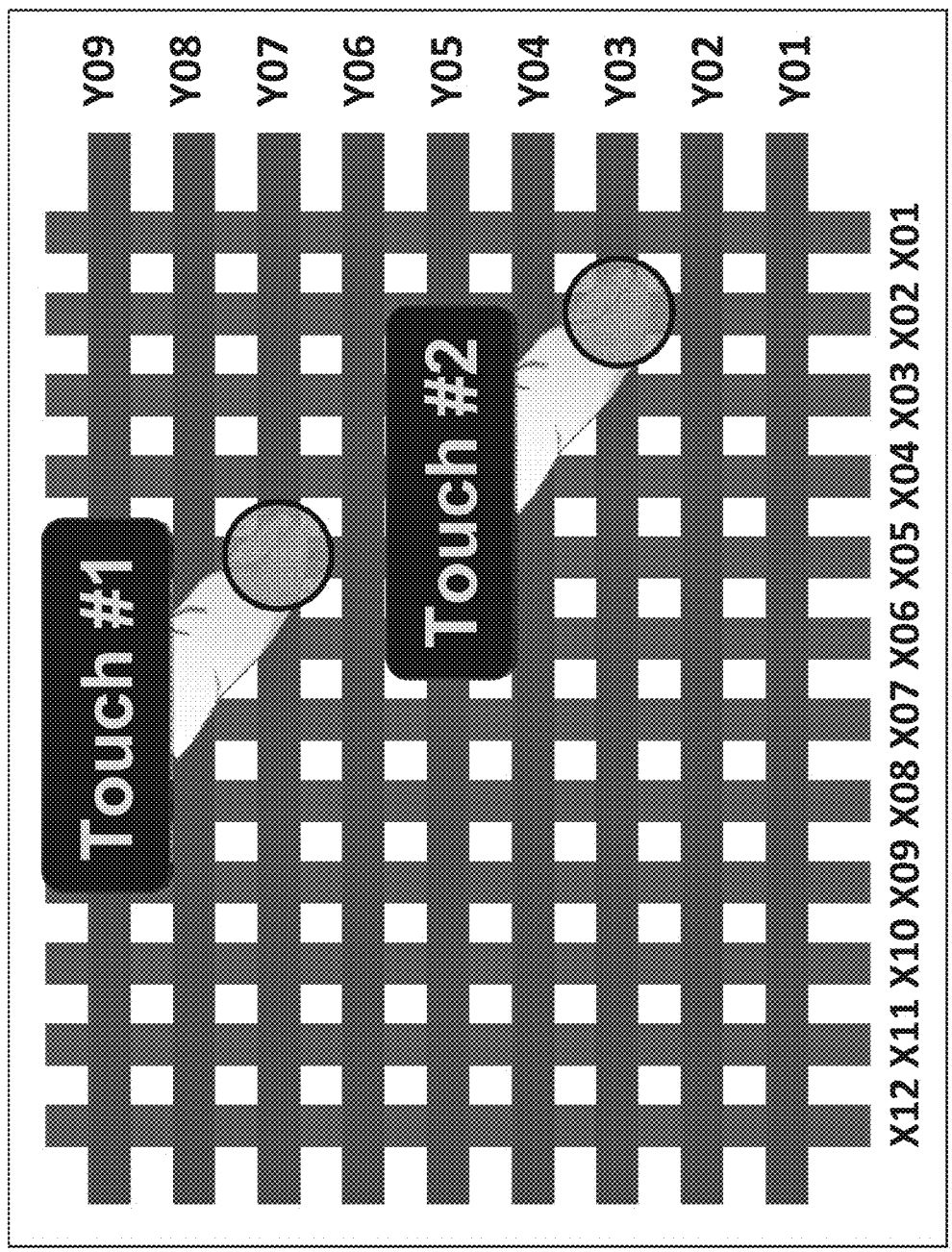

Once the touched rows (Y07 and Y03) have been determined using the self capacitance changes thereof, mutual capacitive detection may be used in determining where on these two touched rows (Y07 and Y03) the touches have occurred. Referring to FIG. 4I, this may be accomplished by exciting, e.g., putting a voltage pulse on, each of the columns X01 to X12 one at a time while measuring the capacitance value of row Y07 when each of the columns X01 to X12 is individually excited. The column (X05) excitation that causes the largest change in the capacitance value of row Y07 will be the location on that row that corresponds to the intersection of column X05 with row Y07. Referring to FIG. 4J, likewise measuring the capacitance value of row Y03 when each of the columns X01 to X12 is individually excited determines where on column Y03 the touch #2 has occurred. Referring to FIG. 4K, the two touches are at points or nodes (X05, Y07) and (X02, Y03). It is contemplated and within the scope of this disclosure that if the capacitances of more then one of the selected rows, e.g., Y07 and Y03, can be measured simultaneously, then only one set of individual column X01 to X12 excitations is needed in determining the two touches to the touch sensor 102.

Figure 5:
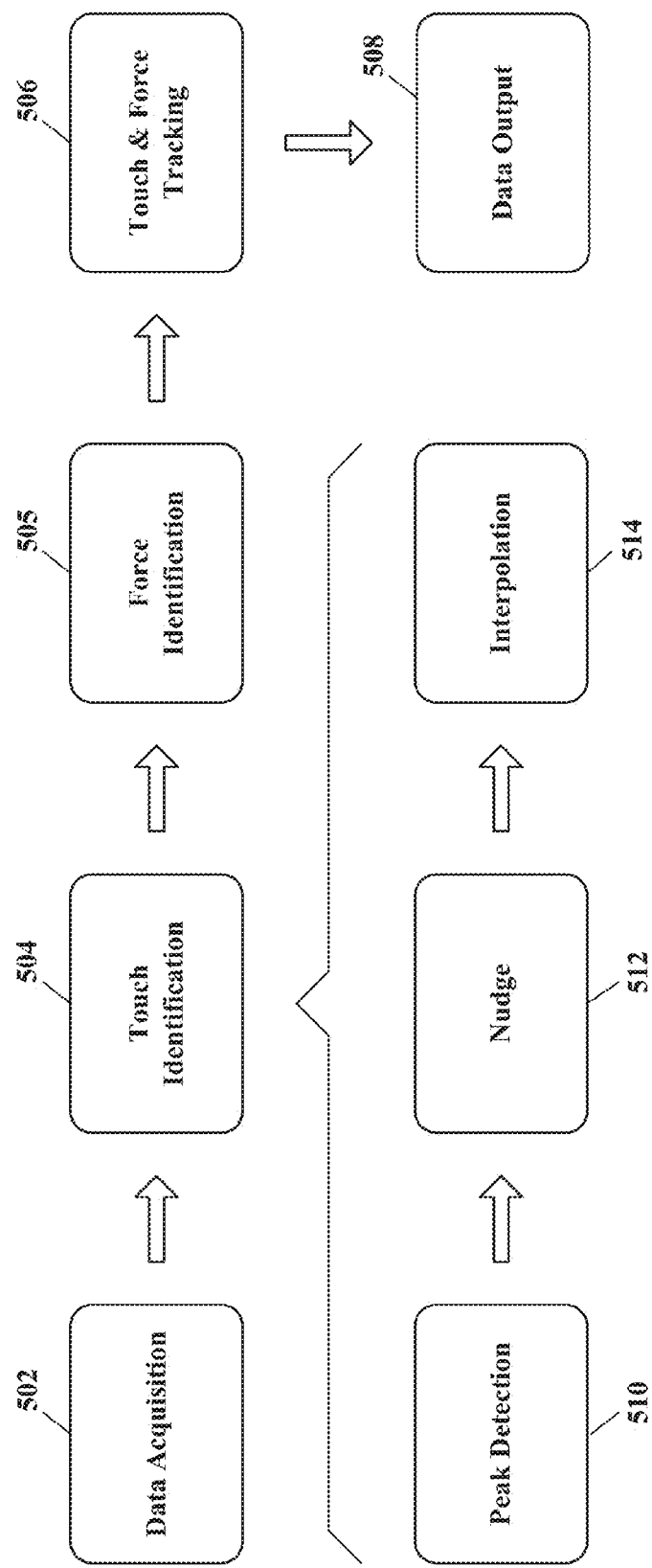
FIG. 5 illustrates a schematic process flow diagram for multi-touch and force decoding of a touch sensor as shown in FIG. 1, according to specific example embodiments of this disclosure.

Referring to FIG. 5, depicted is a schematic process flow diagram for multi-touch and force decoding of a touch sensor as shown in FIG. 1, according to specific example embodiments of this disclosure. A process of multi-touch decoding may comprise the steps of Data Acquisition 502, Touch Identification 504, Force Identification 505, Touch and Force Tracking 506, and Data Output 508. The step of Touch Identification 504 may further comprise the steps of Peak Detection 510, Nudge 512 and Interpolation 514, more fully described hereinafter.

Data Acquisition.

Data Acquisition 502 is the process of taking self capacitance measurements of the plurality of conductive columns 104 or conductive rows 105, and then mutual capacitance measurements of selected ones of the plurality of conductive columns 104 or conductive rows 105, and intersections of the plurality of conductive rows 105 or conductive columns 104, respectively therewith, to acquire touch identification data. The touch identification data may be further processed to locate potential touches and forces thereto on the touch sensor 102 using the process of Touch Identification 504 and Force Identification 505, respectively, as more fully described hereinafter.

Touch Identification

Touch Identification 504 is the process of using the touch identification data acquired during the process of Data Acquisition 502 to locate potential touches on the touch sensor 102. The following are a sequence of process steps to determine which ones of the plurality of conductive columns 104 or conductive rows 105 to select that have a touch(es) thereto using self capacitance measurements thereof, and where on the selected conductive columns 104 or conductive rows 105 the touch(es) may have occurred using mutual capacitance measurements thereof.

Peak Detection

Peak detection 510 is the process of identifying where potential touch locations may be on the touch sensor 102. However according to the teachings of this disclosure, instead of only looking at actual detected "peaks," peak detection may purposely be made "fuzzy," e.g., identifying potential peaks by looking for ratios of differences of slope values as well as slope "signs," not just a low-high-low value sequence. A "virtual" peak may be detected by examining slope ratios, e.g., 2:1 slope ratio, wherein a change in slope may be identified as a potential peak. This may be repeated until no additional peaks are detected.

Nudge

Nudge 512 is the process of examining each adjacent location of a potential touch location once it has been identified. If the adjacent location(s) has a greater value than the existing touch potential location then eliminate the current potential touch location and identify the adjacent location having the greater value as the potential touch location (see FIG. 8 and the description thereof hereinafter).

Interpolation

Once a touch location has been identified, Interpolation 514 is the process that examines the adjacent values to generate a higher resolution location.

Force Identification

Force Identification 505 is the process of using some of the touch identification data acquired during the process of Data Acquisition 502 in combination with the potential touch locations identified during the process of Touch Identification 504. The mutual capacitance measurements associated with the potential touch locations, determined during the process of Touch Identification 504, may be compared with reference capacitance values of those same locations with no touches applied thereto (smaller capacitance values). The magnitude of a capacitance change may thereby be used in determining the force applied by the associated potential touch previously determined.

Touch and Force Tracking

Touch and Force Tracking 506 is the process of comparing time sequential "frames" of touch identification data and then determining which touches are associated between sequential frames. A combination of weighting and "best guess" matching may be used to track touches and forces thereof through multiple frames during the process of Data Acquisition 502 described hereinabove. This is repeated for every peak detected and every touch that was identified on the previous frame. A "frame" is the set of self and mutual capacitive measurements of the plurality of conductive columns 104 or conductive rows 105 in order to capture a single set of touches at a specific time. Each full set of scans (a "frame") of the self and mutual capacitance measurements of the plurality of conductive columns 104 or conductive rows 105 to acquire touch identification data of the touch sensor 102 at a given time associated with that frame.

Touch and Force Tracking 506 associates a given touch in one frame with a given touch in a subsequent frame. Touch and Force tracking may create a history of touch frames, and may associate the touch locations of a current frame with the touch locations of a previous frame or frames. In order to associate a previous touch location to a current potential touch location a "weighting" function may be used. The weight values ("weight" and "weight values" will be used interchangeably herein) between time sequential touch locations (of different frames) represent the likelihood that time sequential touch locations (of different frames) are associated with each other. Distance calculations may be used to assign weight values between these associated touch locations. A "true" but complex and processor intensive calculation for determining weight value between touch locations is:

$$\text{Weight value} = \text{SQRT}[(X_{previous} - X_{current})^2 + (Y_{previous} - Y_{current})^2] \quad \text{Eq. (1)}$$

A simplified distance (weight value) calculation may be used that measures $\Delta X$ and $\Delta Y$ and then sums them together:

$$\text{Weight value}' = ABS(X_{previous} - X_{current}) + ABS(Y_{previous} - Y_{current}) \quad \text{Eq. (2)}$$

The above simplified weight value calculation, Eq. (2), creates a diamond shaped pattern for a given weight value instead of a circular pattern of the more complex weight value calculation, Eq. (1). Use of Eq. (2) may be optimized for speed of the weight value calculations in a simple processing system, distance may be calculated based upon the sum of the change of the X-distances and the change in the Y-distances, e.g., Eq. (2) herein above. A better weight value may be defined as a smaller distance between sequential touch locations.

For each new touch location a weight value may be calculated for all touch locations from the previous frame. The new touch location is then associated with the previous touch location having the best weight value therebetween. If the previous touch location already has an associated touch location from a previous frame, a secondary second-best weight value for each touch location may be examined. The touch location with the lower-cost second-best weight value may then be shifted to its second best location, and the other touch location may be kept as the best touch location. This process is repeated until all touch locations have been associated with previous frame touch locations, or have been identified as "new touches" having new locations with no touch locations from the previous frame being close to the new touch location(s).

An alternative to the aforementioned weighting process may be a vector-based process utilizing a vector created from the previous two locations to create the most likely next location. This vector-based weighting process may use the same distance calculations as the aforementioned weighting process, running it from multiple points and modifying the weight values based upon from which point the measurement was taken.

By looking at the previous two locations of a touch, the next "most likely" location of that touch may be predicted. Once the extrapolated location has been determined that location may be used as the basis for a weighting value. To improve matching on the extrapolated location an "acceleration model" may be used to add weighting points along the vector to the extrapolated locations and past the extrapolated locations. These additional points assist in detecting changes in speed of the touch movement, but may not be ideal for determining direction of the touch motion.

Once the touch locations have been established, forces thereto may be assigned to these touch locations based upon the magnitude of change of the capacitance values determined during the process of Data Acquisition 502, as more fully described hereinabove. Also the forces applied to the touch sensor 102 from the associated tracked touch points may be utilized in further determining three dimensional gesturing, e.g., X-Y and Z directions.

Figure 11:
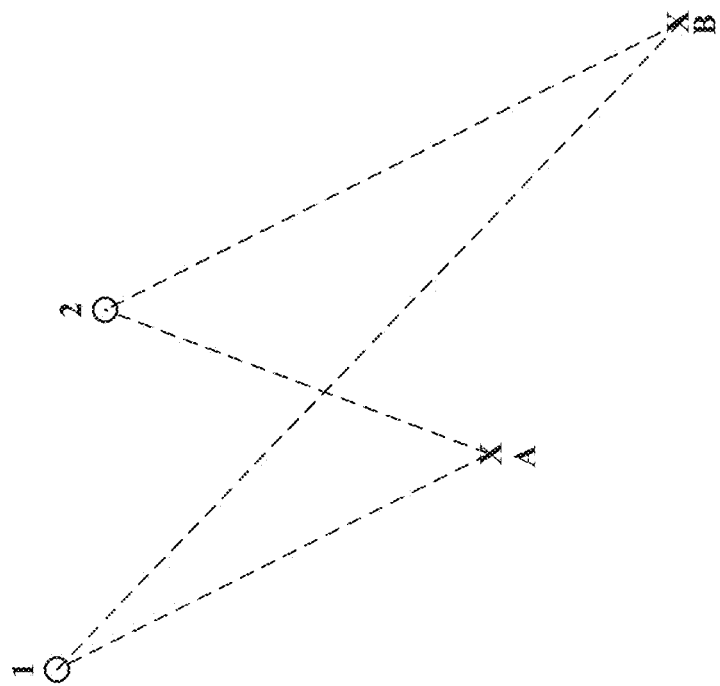
FIGS. 10 and 11 illustrate schematic diagrams of historic and current point locations used for a point weighting example, according to the teachings of this disclosure.
Figure 10:
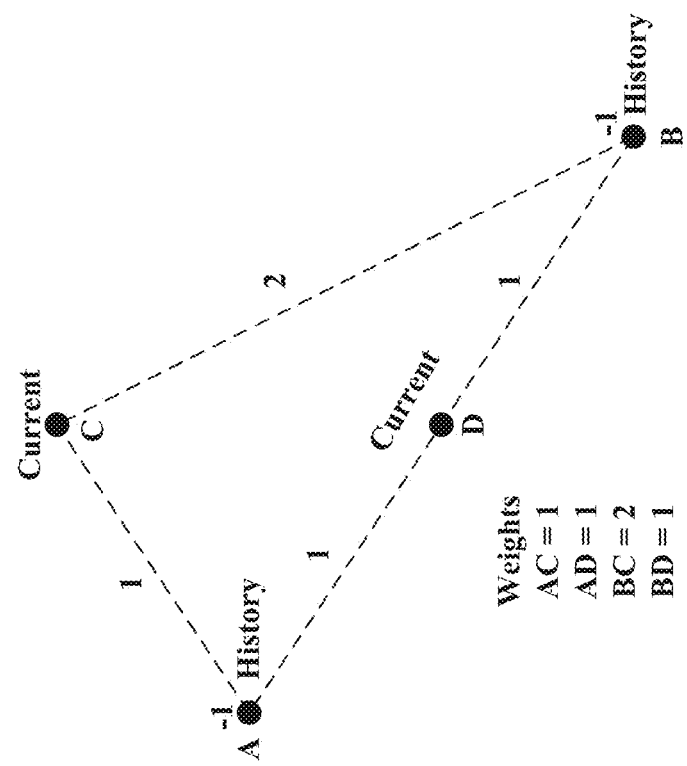

Referring to FIGS. 10 and 11, depicted are schematic diagrams of historic and current point locations used for a point weighting example, according to the teachings of this disclosure. Once weights have been generated, the best combination of weight values and associated touches may be generated. Certain touch scenarios may cause nearly identical weight values, in which case the second best weight values should be compared and associations appropriately shifted. Depending upon the order of operations, points A and D may be associated first. As the weight values for B are generated BD is a better match then BC. In this case look at secondary weight values. Is it less costly to shift A to be associated with C or to shift B to be associated with C?

By extending this sequence of operations, all points can have associations shifted for the best overall match, not just the best local match. Some caution may be needed to prevent infinite loops of re-weighing. This may be accomplished by limiting the number of shifts to a finite number. Referring now to FIG. 11, points A and B are existing points, and points 1 and 2 are "new" points that need to be associated.

Step 1) Calculate weight values between touch locations:
A$\leftrightarrow$1 weight=5 $((\Delta X=2)+(\Delta Y=3)=5)$
A$\leftrightarrow$2 weight=4
B$\leftrightarrow$1 weight=10
B$\leftrightarrow$2 weight=5

Step 2) Select the "best" pair (lowest weight) for each existing touch location:
A$\leftrightarrow$>2 weight=4 and B$\leftrightarrow$>2 weight=5

Step 3) If more than one existing touch location pairs with a given new touch location, then look at the second-best touch locations for each and the difference in weight values from the best to the second best pair (the "cost").
A$\leftrightarrow$1 (weight: 5) Cost=1: (A$\leftrightarrow$1 weight)−(A$\leftrightarrow$2 weight 4)
B$\leftrightarrow$1 (weight: 10) Cost=5: (B$\leftrightarrow$1 weight)−(B$\leftrightarrow$2 weight 5)

Step 4) Shift the pairing to the lowest cost pair thereby allowing the other touch location to maintain the original pairing.
A$\leftrightarrow$1
B$\leftrightarrow$2

Step 5) Repeat steps 2) through 4) until all pairing are 1:1. If there are more touch locations than existing touch locations then start tracking a new touch location. If fewer new touch locations than existing "worst match" touch locations then these worst match touch locations may be lost and no longer tracked.

Flat Finger Identification

Figure 12:
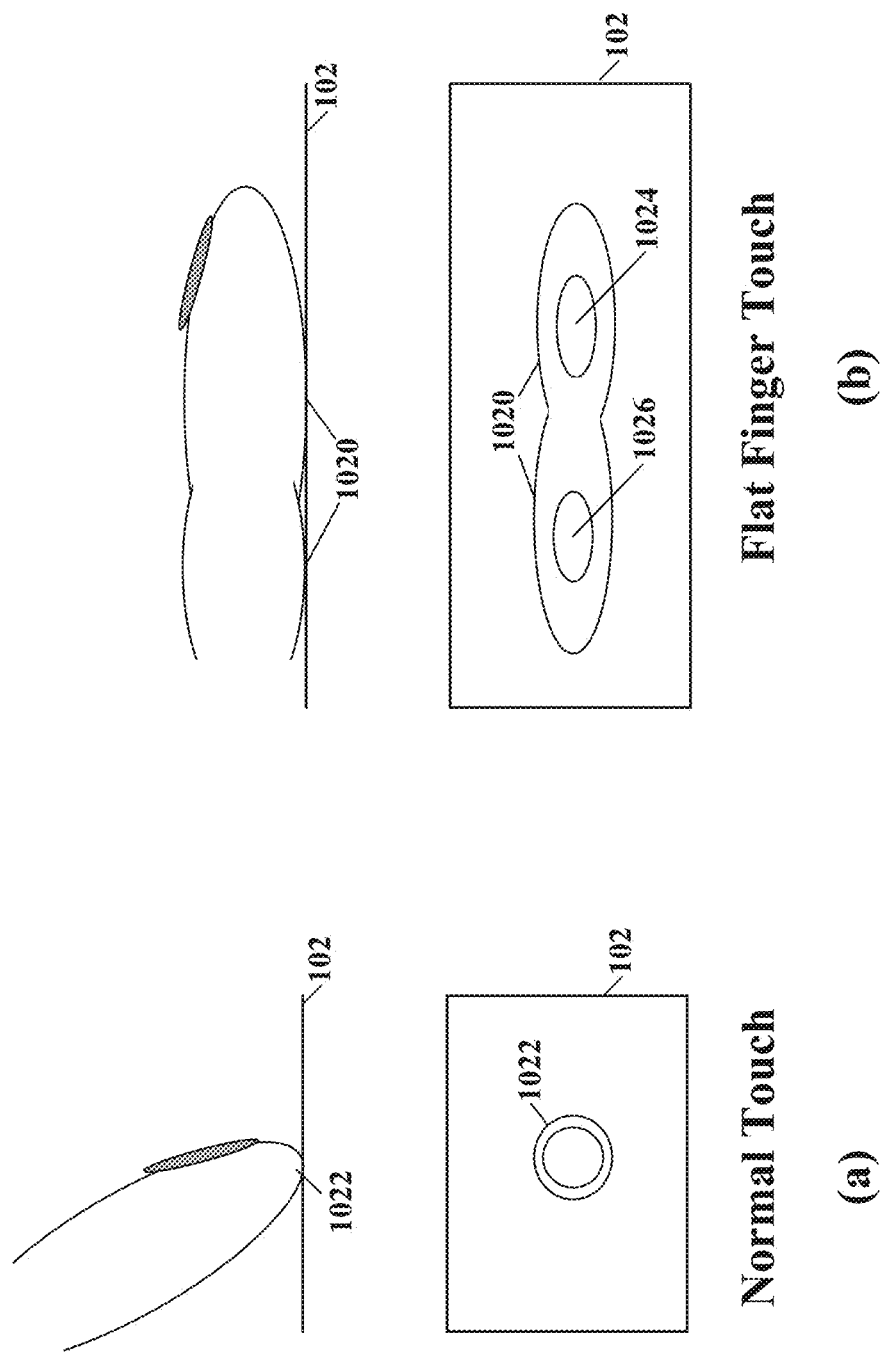
FIG. 12 illustrates schematic drawings of a normal finger touch and a flat finger touch, according to the teachings of this disclosure.

Referring to FIG. 12, depicted are schematic drawings of a normal finger touch and a flat finger touch, according to the teachings of this disclosure. One challenge of identifying a touch is the "flat finger" scenario. This is when the side or flat part of a finger 1020, rather then the finger tip 1022, is placed on the touch sensor 102. Note that a flat finger 1020 may generate two or more potential touch locations 1024 and 1026. It is possible using the teaching of this disclosure to detect a flat finger 1020 by accumulating the sum of the values of all nodes nudged to each peak. If the sum of these values surpasses a threshold then it is likely caused by a flat finger touch. If a flat finger touch is detected then other touches that are near the flat finger peak(s) may be suppressed. In addition, comparing the forces associated with the two or more potential touch locations 1024 and 1026 may also be used in detecting a flat finger 1020 situation.

Data Output

Referring back to FIG. 5, Data Output 508 is the process of providing determined touch location coordinates and associated forces applied thereto in a data packet(s) to a host system for further processing.

Touch Determination

Given an array of touch data, examine the differences between the values thereof and flag certain key scenarios as potential peaks for further examination. All touch data values below a threshold value may be ignored when determining touch locations.

Key Scenario 1: True Peak

Figure 6:
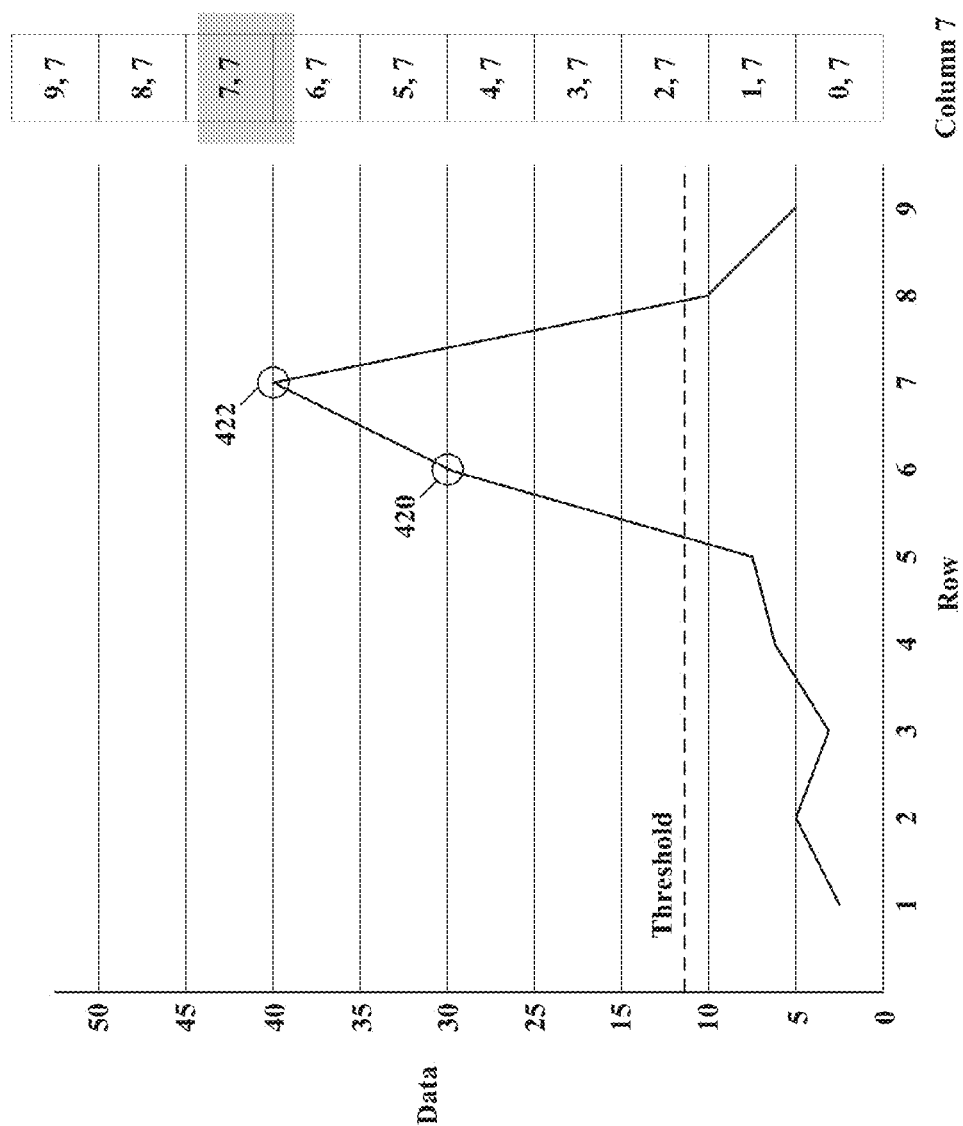
FIG. 6 illustrates a graph of single touch peak detection data, according to specific example embodiments of this disclosure.

Referring to FIG. 6, identify the transition from a positive to a negative slope as a potential peak. This would be the point circled in column 7 of the example data values shown in FIG. 6.

Key Scenario 2: Slope Ratio Beyond Threshold ("Fuzzy" Peak Detection)

A key threshold of slope ratios may be used to flag additional peaks. The threshold value used may be, for example but is not limited to, 2:1; so instances where there is a change of slope greater than 2:1 may be identified as potential peaks. This applies to positive and negative slopes. This would be the point circled in column 6 of the example data values shown in FIG. 6.

Why not Just Look at the Slope Signs?

Since the self scan is only one axis of a two-axis sensor array (e.g., conductive rows 105 and conductive columns 104 of touch sensor 102, FIG. 1), it is possible for two touches that are off by a single "bar" (e.g., column) to only show a single peak. With the example data, there could be two touches, one at 6,6 and another at 7,7 (see FIGS. 6 and 9). Without the additional peak detection, the touch at 6,3 may not be detected.

Nudge Location Refinement

Once a potential touch location is identified, each adjacent touch location may be examined to determine if they have a greater value. If a greater value is present, eliminate the current potential touch location and identify the touch location of the greater value as a potential touch location. This process is repeated until a local peak has been identified.

Referring to FIG. 6, depicted is a graph of single touch peak detection data, according to specific example embodiments of this disclosure. An example graph of data values for one column (e.g., column 7) of the touch sensor 102 is shown wherein a maximum data value determined from the self and mutual capacitance measurements of column 7 occurs at the capacitive touch sensor 104 area located a row 7, column 7. All data values that are below a threshold value may be ignored, e.g., below about 12 in the graphical representation shown in FIG. 6. Therefore only data values taken at row 6 (data value=30) and at row 7 (data value=40) need be processed in determining the location of a touch to the touch sensor 102. Slope may be determined by subtracting a sequence of adjacent row data values in a column to produce either a positive or negative slope value. When the slope value is positive the data values are increasing, and when the slope value is negative the data values are decreasing. A true peak may be identified as a transition from a positive to a negative slope as a potential peak. A transition from a positive slope to a negative slope is indicated at data value 422 of the graph shown in FIG. 6.

However another touch may have occurred at column 6 and was not directly measured in the column 7 scan, but shows up as data value 420 during the column 7 scan. Without another test besides the slope sign transition, the potential touch at column 6 may be missed. Therefore a threshold of slope ratios may further be used to flag additional potential peaks. Slope is the difference between two data values of adjacent conductive columns 104. This threshold of slope ratios may be, for example but is not limited to, 2:1 so instances where there is a change of slope greater than 2:1 may be identified as another potential peak. This may apply to both positive and negative slopes. For example, the data value 420, taken at row 6, has a left slope of 23:1 (30–7) and a right slope of 10:1 (40–30). The data value 422, taken at row 7, has a left slope of 10:1 (40–30) and right slope of –30:1 (10–40). The slope ratio for row 6 of 23:10, exceeds the example 2:1 threshold and would be labeled for further processing. All other data values are below the data value threshold and may be ignored.

Figure 7:
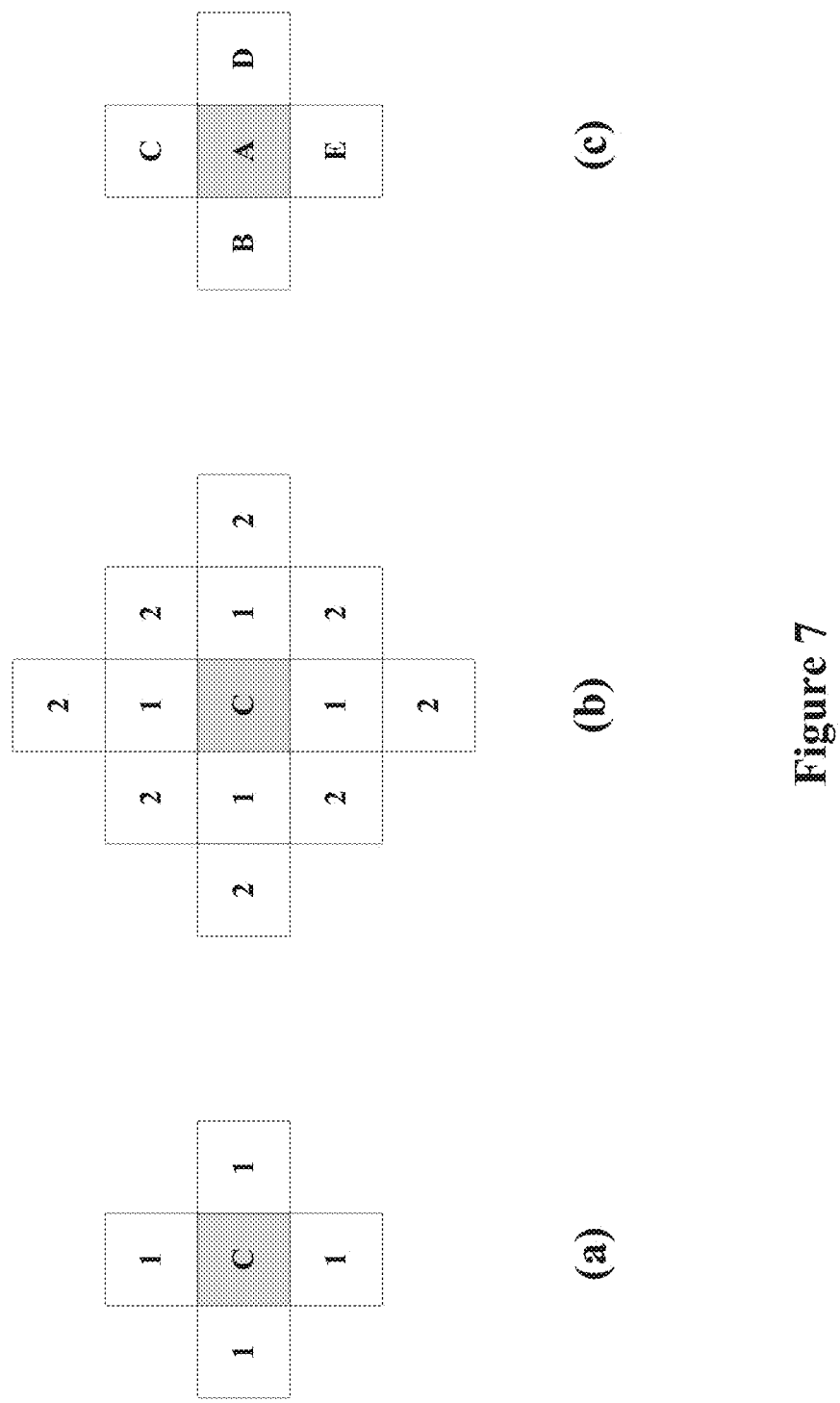
FIG. 7 illustrates a schematic plan diagram of potential touch and mutual touch locations of a touch sensor, according to specific example embodiments of this disclosure.

Referring to FIG. 7, depicted is a schematic plan diagram of potential touch and mutual touch locations of a touch sensor, according to specific example embodiments of this disclosure. Once a potential touch location is identified, each adjacent location thereto may be examined to determine whether any one of them may have a greater data value than the current potential touch location (labeled "C" in FIGS. 7(*a*) & 7(*b*)). If a greater data value is found, then the current potential touch location may be eliminated and the touch location having the greater value may be identified as a potential touch location. This is referred to herein as the process of Nudge 512 and may be repeated until a data peak has been identified.

During a data acquisition scan of a column of rows, only tier one nodes (labeled "1" in FIGS. 7(*a*) and 7(*b*)—adjacent locations to the current potential touch location) are examined. If any of these tier one nodes has a larger data value than the data value of the current potential touch location, a new current touch location is shifted ("nudged") to that node having the highest data value and the process of Nudge 512 is repeated. If a tier one node is already associated with a different potential peak, then no further searching is necessary and the current data peak may be ignored. Tier two nodes (labeled "2" in FIGS. 7(*a*) & 7(*b*)—adjacent locations to the tier one nodes) are examined when there is a potential of a large area activation of the touch sensor 102.

After one conductive column 104 has been scanned for mutual capacitance values, the process of Nudge 512 may be speeded up by storing the mutual capacitance data values of that one column in a cache memory, then doing the Nudge 512 first on the tier one nodes, and then on the tier two nodes of that one column from the mutual capacitance data values stored in the cache memory. Then only after there are no further nudges to do in that one column will the process of Nudge 512 examine the tier one and tier two nodes from the mutual capacitance measurement scans of the two each adjacent columns on either side of the column having the process of Nudge 512 performed thereon.

Interpolation of the potential touch location may be performed by using the peak data value node (touch location) as well as each adjacent node thereto (e.g., tier one nodes from a prior Nudge 512) to create sub-steps between each node. For example, but not limited to, 128 steps may be created between each node. Referring to FIG. 7(*c*), node A is the potential touch location and nodes B, C, D and E are tier one nodes adjacent thereto. The interpolated X, Y location may be found using the following equations:

$$\text{Location}_x = (D_{Value} - B_{Value})/A_{Value} * 64$$

$$\text{Location}_y = (E_{Value} - C_{Value})/A_{Value} * 64$$

It is contemplated and within the scope of this disclosure that variations of the above equations may be used based upon the ratio of values and the signs of the numerator of the division.

Figure 8:
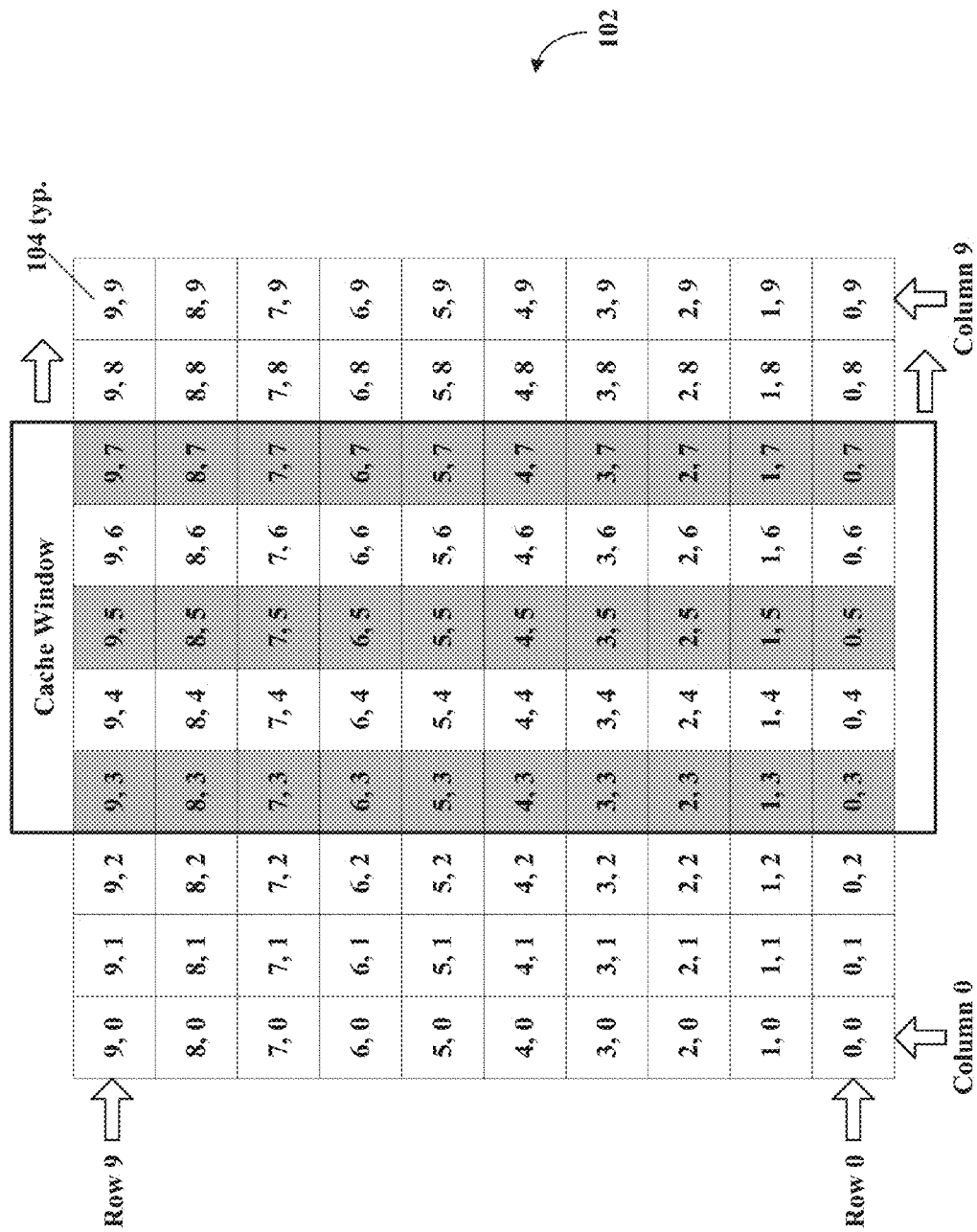
FIG. 8 illustrates a schematic plan view diagram of a touch sensor showing a cache data window thereof, according to specific example embodiments of this disclosure.

Referring to FIG. 8, depicted is a schematic plan view diagram of a touch sensor showing a cache data window thereof, according to specific example embodiments of this disclosure. The conductive columns 104 of the touch sensor 102 may be scanned column by column for self capacitance values until all conductive columns 104 have been scanned. Each conductive column 104 indicating a potential touch from the self capacitance data may be sequentially scanned for determining mutual capacitive values thereof (touch data) and when peaks are discovered they may be processed contemporaneously with the column scan. Furthermore, touch data may be stored in a cache memory for further processing. Since the Nudge 512 looks at the first tier nodes then the second tier nodes, if necessary, not all of the touch data from all of the conductive columns 104 need be stored at one time. This allows a simple caching system using a minimum amount of random access memory (RAM). For example, storing five columns of touch data in a cache. The five columns are contiguous and a cache window may move across the columns 104 of the touch sensor 102 one column 104 at a time. It is contemplated and within the scope of this disclosure that more or fewer than five columns of touch data may be stored in a cache memory and processed therefrom, and/or self capacitance scanning by rows instead of columns may be used instead. All descriptions herein may be equally applicable to self capacitance scanning of rows then mutual capacitance scanning by columns of those row(s) selected from the self capacitance scan data.

Whenever a Mutual Scan of a first or second tier node (capacitive sensor 104) is requested, it may be called first from the cache memory. If the requested node touch data is present in the cache memory, the cache memory returns the requested touch data of that first or second tier node. However, if the requested touch data is not present in the cache memory then the following may occur: 1) If the column of the requested touch data is in the range of the cache window then perform the mutual scan of that column and add the touch data to the cache memory, or 2) If the column of the requested touch data is not in the range of the present cache window then shift the cache window range and perform the mutual scan of the new column and add the resulting touch data from the new cache window to the cache memory.

Figure 9:
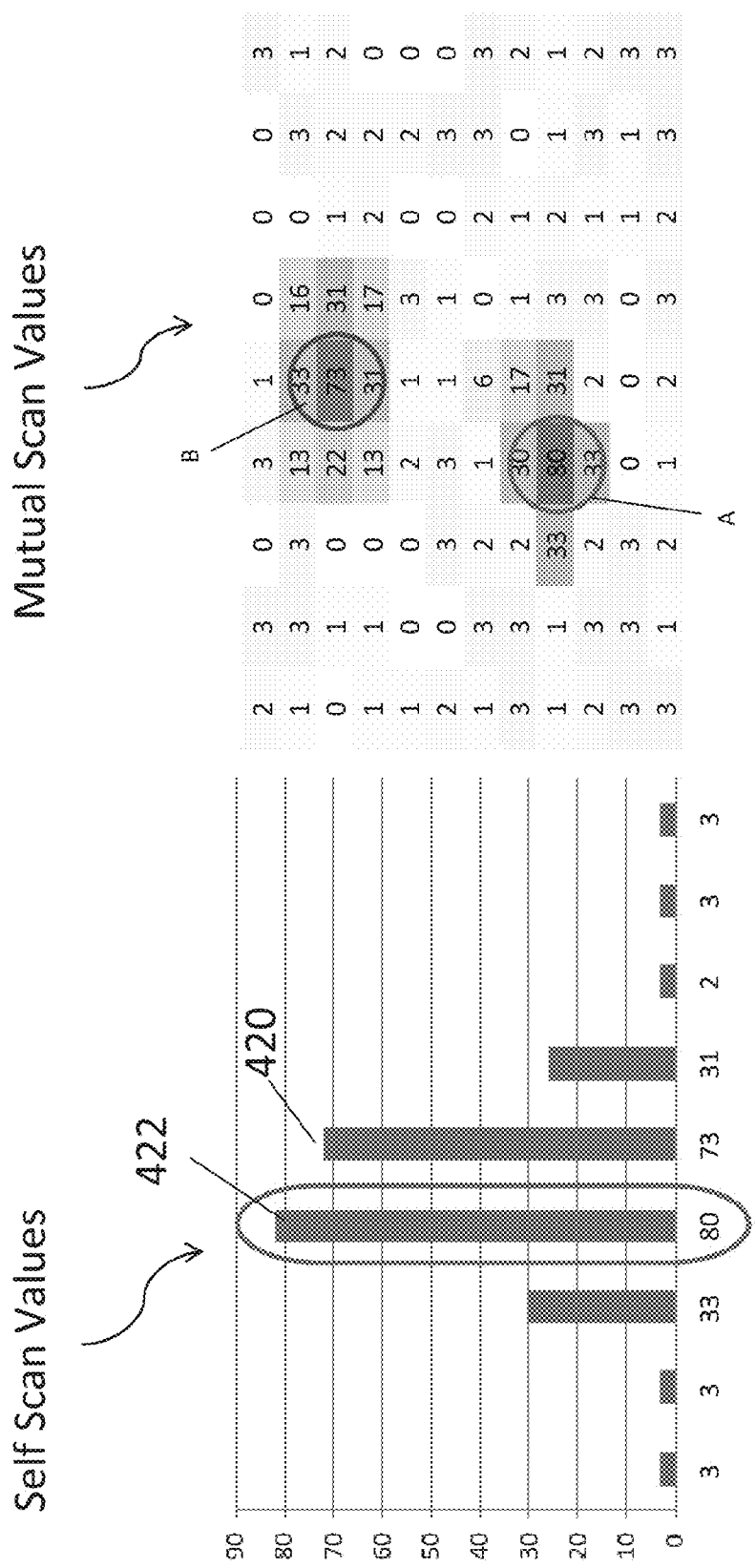
FIG. 9 illustrates a graph of self scan values and a table of mutual scan values for two touch peak detection data, according to specific example embodiments of this disclosure.

Referring to FIG. 9, depicted are a graph of self scan values and a table of mutual scan values for two touch peak detection data, according to specific example embodiments of this disclosure. Since a self scan is performed in only one axis (e.g., one column), it is possible for two touches that are off by a single column to only show a single peak. For the example data values shown in FIG. 9, two touches may have occurred, one at self scan data value 422 and the other indicated at self scan data value 420. Without being aware of change of slopes greater than 2:1, the potential touch represented by self scan data value 420 may have been missed. A first touch may cause data value 422 and a second touch may cause data value 420. The processes of Peak Detection 510 and Nudge 512 (FIG. 5), as described hereinabove, may further define these multiple touches as described herein. Once each multiple touch has been defined a force thereof may be determined and associated its respective touch.

Figure 24:
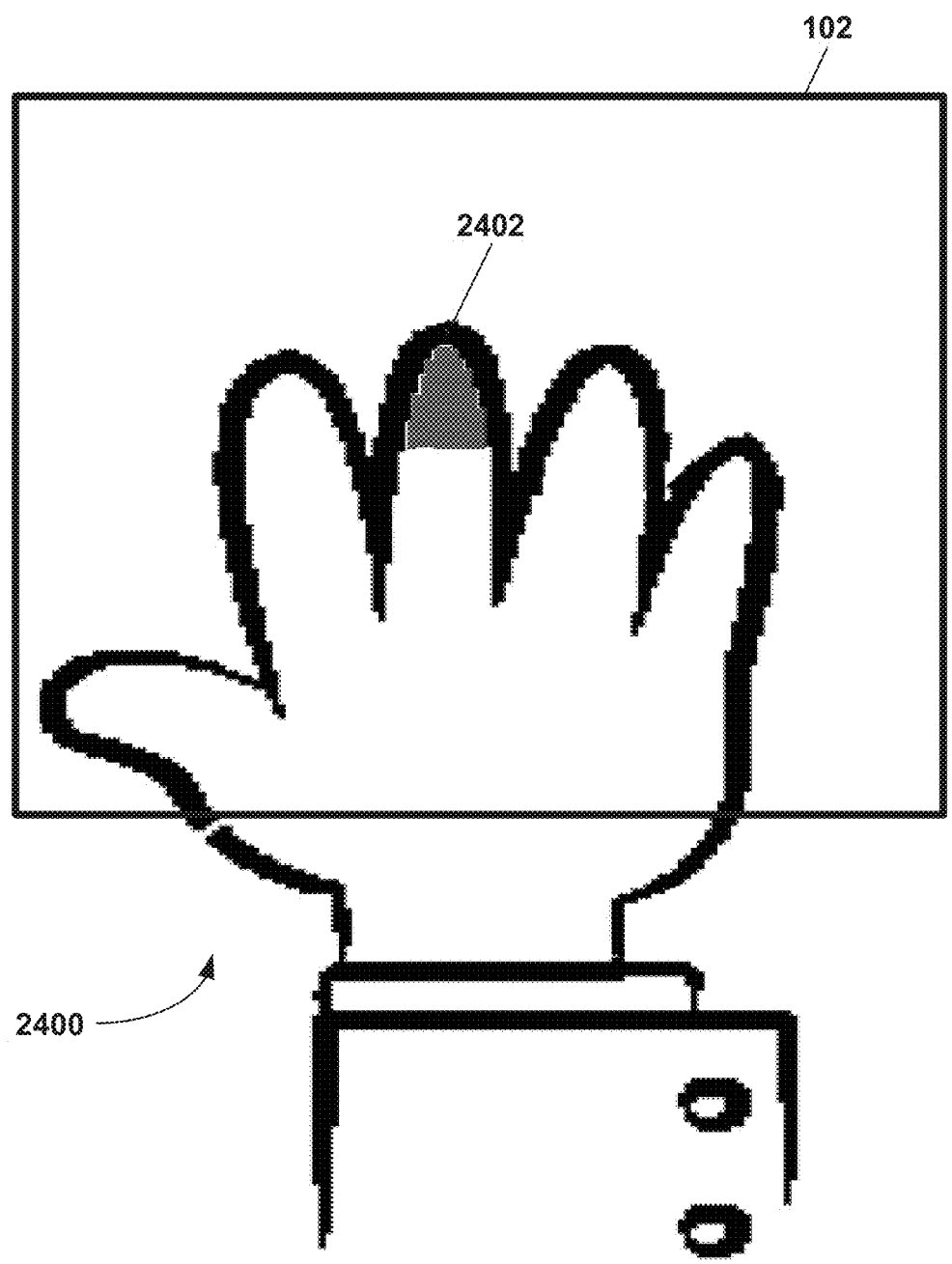
FIG. 24 illustrates a schematic plan view of a finger of a hand touching a surface of a touch sensor, according to a specific example embodiment of this disclosure.

Referring to FIG. 24, depicted is schematic plan view of a finger of a hand touching a surface of a touch sensor, according to a specific example embodiment of this disclosure. A hand of a user, generally represented by the numeral 2400, may hover over a face of a touch sensor 102, e.g., touch screen or panel, having a plurality of locations that when at least one of the plurality of locations is touched by a finger 2402 of the hand 2400, the location and on the face of the touch sensor 102 force thereto is detected and stored for further processing as disclosed herein. For example, a light touch of the finger 2402 on the face of the touch sensor 102 may select an object (not shown) displayed by a visual display integral therewith. Upon the finger 2402 pressing a little harder at the touch location the selected object may be locked in place. Pressing even harder on the locked object and then gesturing to move the object may release the lock on the object. Another example, pressing on the object (not shown) selects the object, then pressing harder fixes the object's location. Releasing the pressure (force) on the object then pressing hard on the object again would release the object to move again.

Figure 25:
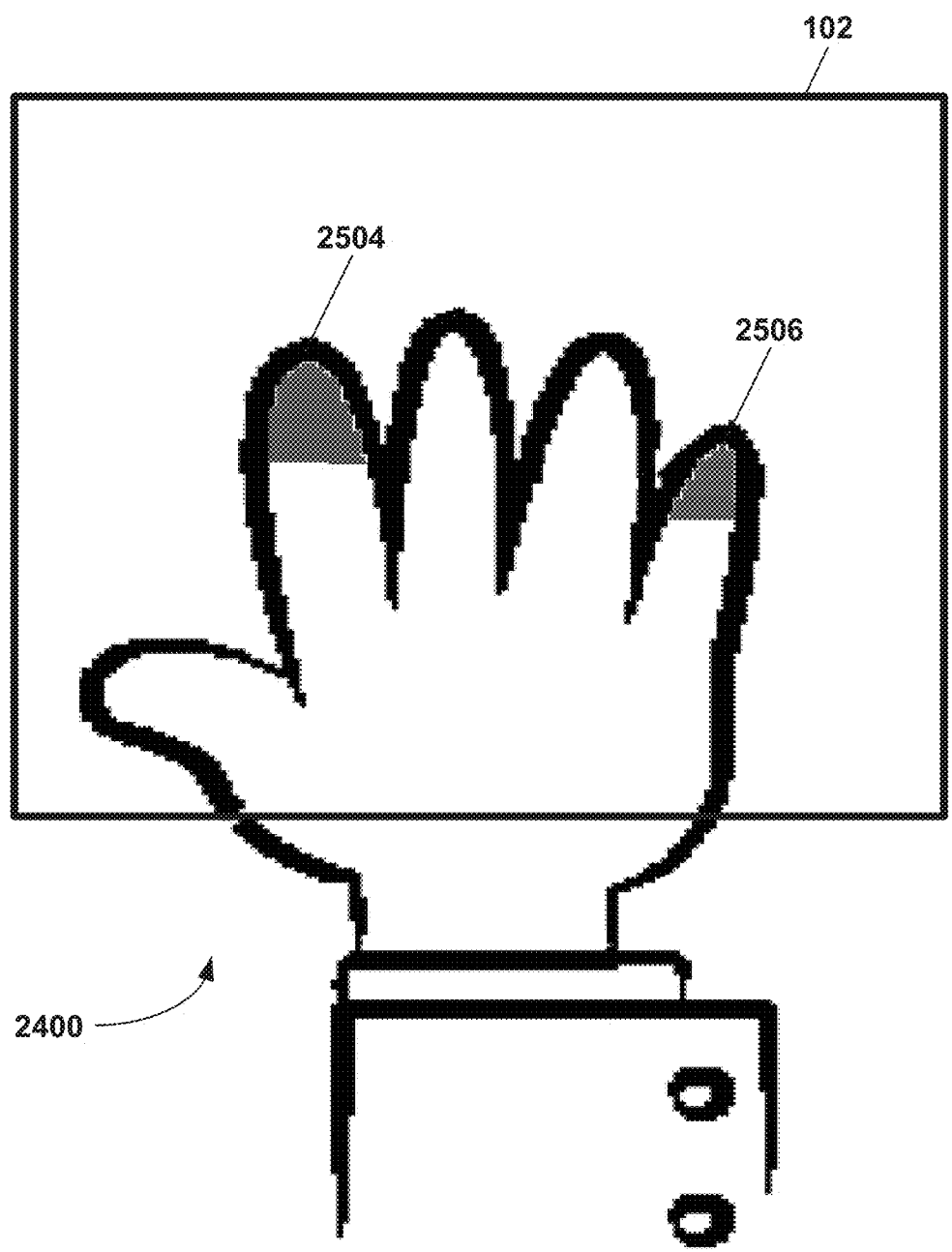
FIG. 25 illustrates a schematic plan view of two fingers of a hand touching a surface of a touch sensor, according to another specific example embodiment of this disclosure.

Referring to FIG. 25, depicted is schematic plan view of two fingers of a hand touching a surface of a touch sensor, according to another specific example embodiment of this disclosure. A finger 2504 over a left portion of the touch sensor 102 and another finger 2506 over a right portion of the touch sensor 102 may be used to rotate an object (not shown) displayed by a visual display integral therewith. For example, when the left oriented finger 2504 presses harder than the right oriented finger 2506 the object may rotate counterclockwise about an axis parallel with the axis of the wrist/arm. When the right oriented finger 2506 presses harder than the left oriented finger 2504 the object may rotate clockwise about the axis parallel with the axis of the wrist/arm. When the wrist is rotated while the fingers 2504 and 2506 are touching the face of the touch sensor 102, the object (not shown) may rotate substantially perpendicular to the axis of the wrist/arm (substantially parallel with the face of the touch sensor 102) and in the direction of the rotation of the fingers 2504 and 2506.

Figure 26:
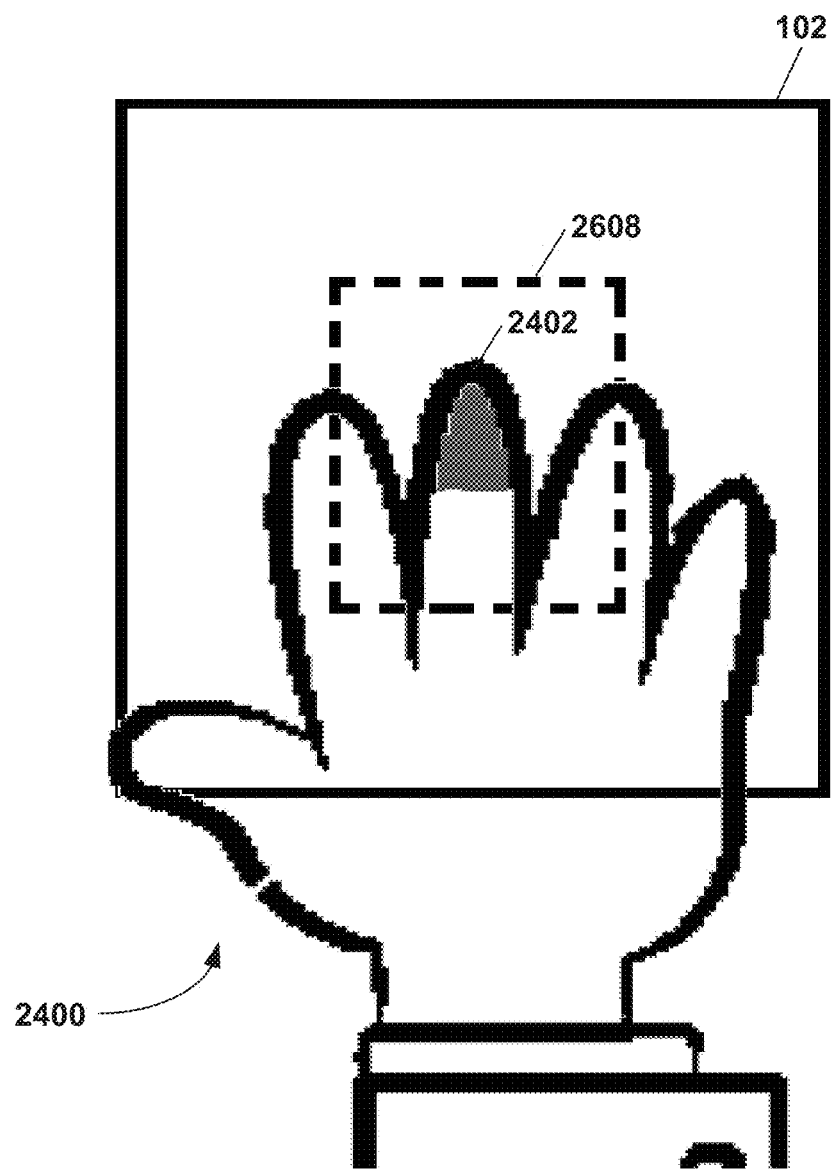
FIG. 26 illustrates a schematic plan view of a finger of a hand touching an object projected on a surface of a touch sensor, according to yet another specific example embodiment of this disclosure.

Referring to FIG. 26, depicted is schematic plan view of a finger of a hand touching an object projected on a surface of a touch sensor, according to yet another specific example embodiment of this disclosure. Pressing on the face of the touch sensor 102 over an object 2608 with a finger 2402 may be used to scale the size of the object. For example, the greater the force of the press (touch) by the finger 2402 the larger in size that the object may be displayed. The object may remain at the new larger size or may vary in size in proportion to the force applied to the face of the touch sensor, e.g., a harder press will result in a larger in size object and a softer press will result in a smaller in size object. The size of the object may follow the amount of force applied by the finger 2402 to the face of the touch sensor 102.

Figure 27:
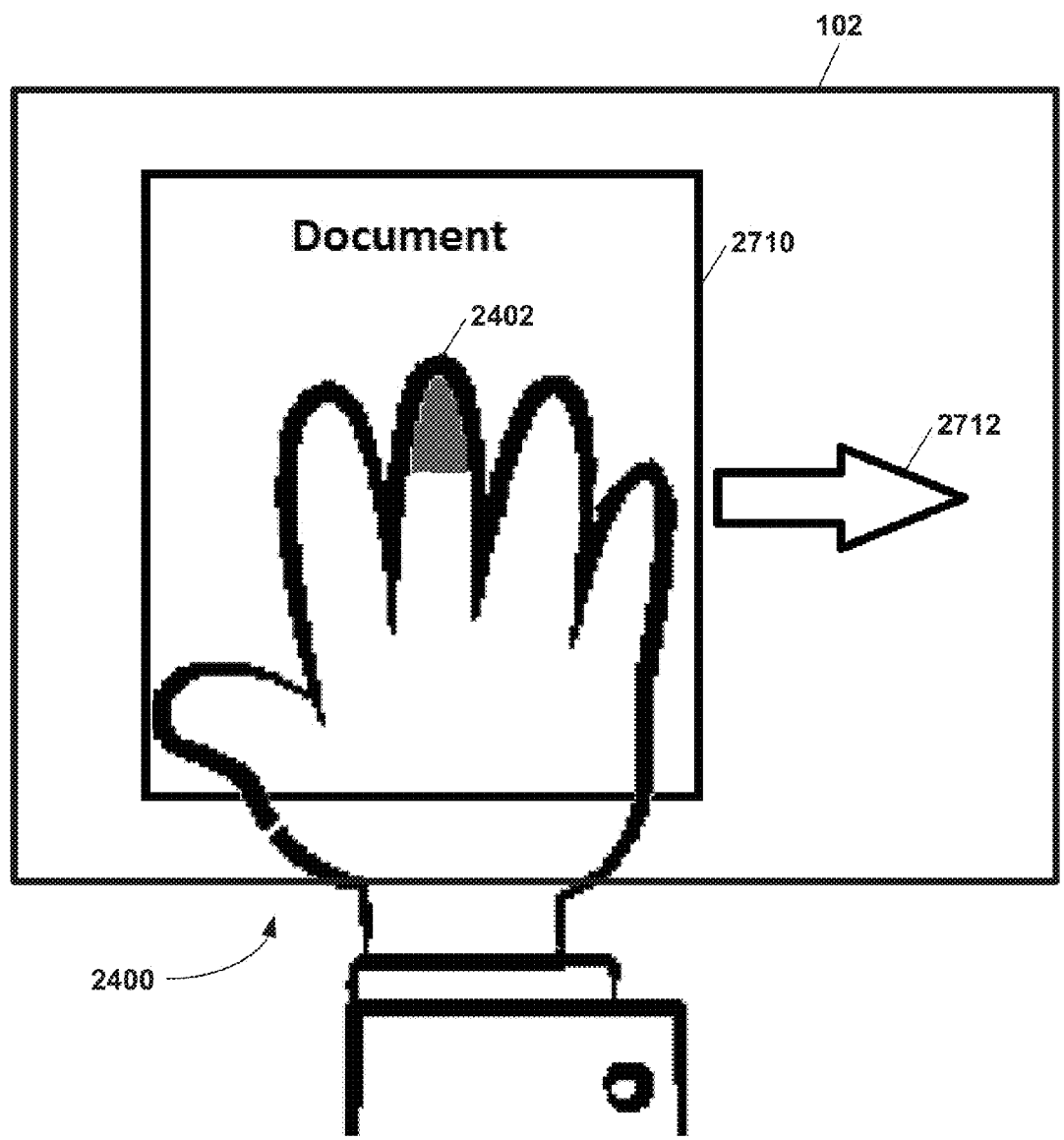
FIG. 27 illustrates a schematic plan view of a finger of a hand touching a document projected on a surface of a touch sensor, according to still another specific example embodiment of this disclosure.

Referring to FIG. 27, depicted is schematic plan view of a finger of a hand touching a document projected on a surface of a touch sensor, according to still another specific example embodiment of this disclosure. A document 2710 may displaced on a face of the touch sensor 102. A touch of sufficient force by the finger 2402 to a portion of the document 2710 may be used to flip through pages thereof. A finger 2402 movement, for example but not limited to, the right may remove currently visible page(s) of the document 2710. Pressing on a removed page near another new document (not shown) may be used to flip through the new document (not shown) and/or may allow insertion of the remove page into the new document. For example, pressing on a document 2710 flips through a stack of document pages. If the finger 2402 then moves off the document the selected page may be removed. Pressing on a single page next to a document may flip through the document and then may insert the page when it is drug over the document.

Figure 28:
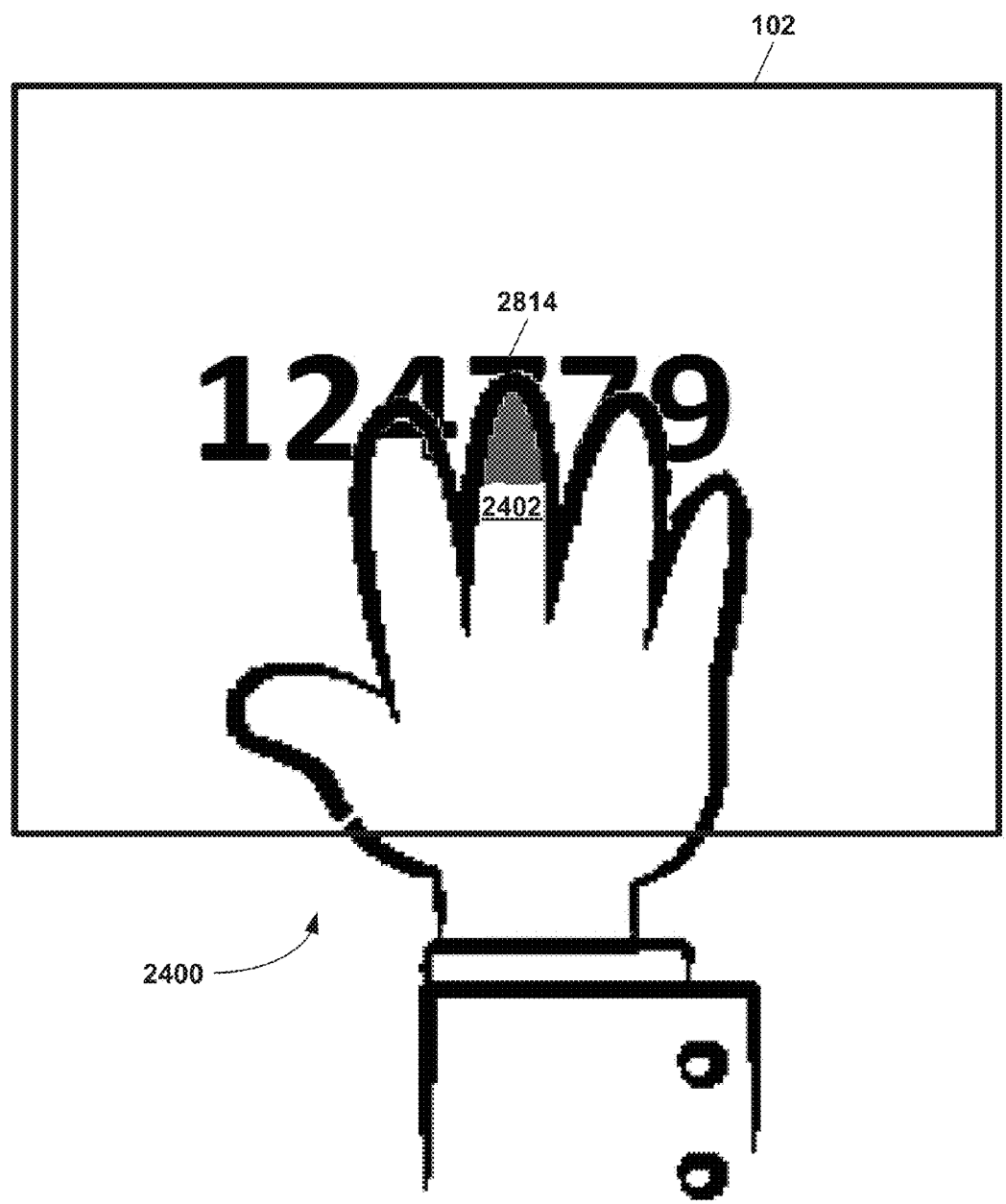
FIG. 28 illustrates a schematic plan view of a finger of a hand touching one digit of a number projected on a surface of a touch sensor, according to another specific example embodiment of this disclosure.

Referring to FIG. 28, depicted is schematic plan view of a finger of a hand touching one digit of a number projected on a surface of a touch sensor, according to another specific example embodiment of this disclosure. At least one number or letter, e.g., alpha-numeric character 2814, may be displayed on the face of the touch sensor. A finger 2402 may press on a portion of the character 2814 wherein the amount of force by the finger 2402 may cause the character 2814 to increase or decrease alpha-numerically in value, accordingly. When the character 2814 is a desired value then the finger 2402 may slide off, e.g., up, down or sideways, to leave editing of the character 2814. An increase in the alpha-numeric value may be controlled by pressing the finger 2402 on an upper portion of the character 2814, and a decrease in the alpha-numeric value may be controlled by pressing the finger 2402 on a lower portion of the character 2814. The speed of increase or decrease of the alpha-numeric value may be proportional to the amount of force applied by the finger 2402 to surface of the touch sensor 102. More than one finger may be used to contemporaneously increase and or decrease more than one alpha-numeric character. For example, a finger 2402 may be pressed on a single digit 2814 of a number (124779 shown), whereby the single digit 2814 sequentially flips through numerical values, e.g., 0-9. When a desired numerical value is displaced, the finger 2402 may be dragged off the digit to leave the selected numerical value.

Figure 13:
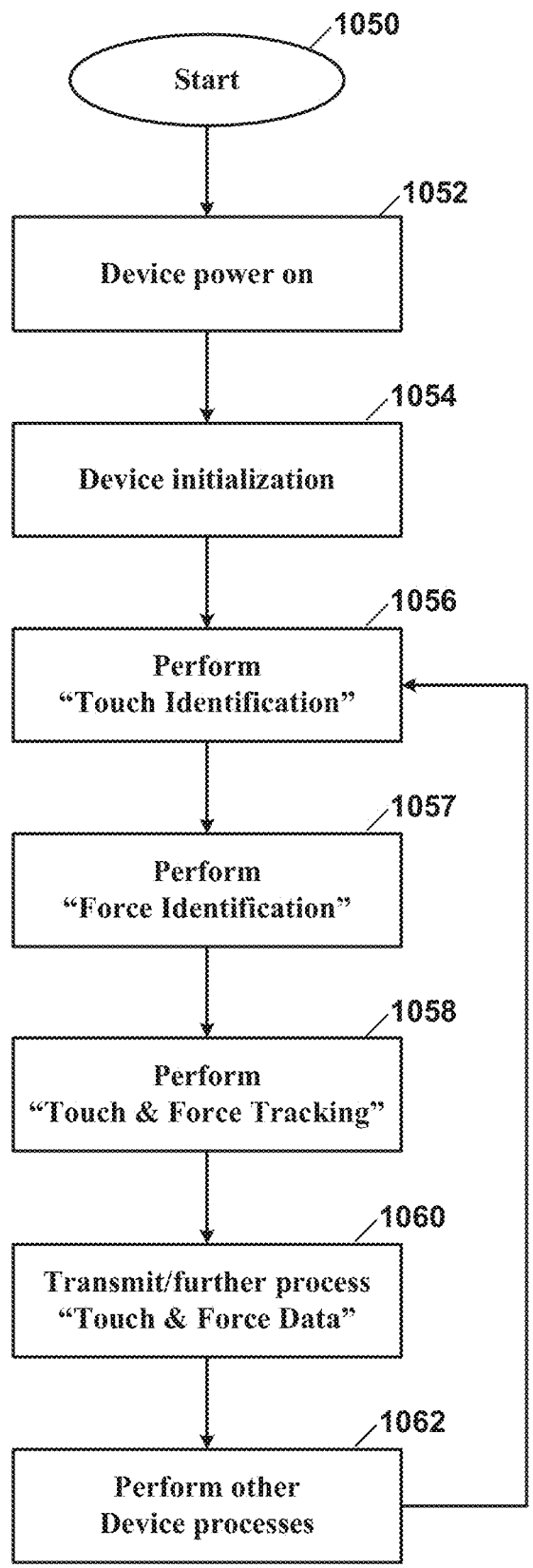
FIGS. 13 to 23 illustrate schematic process flow diagrams for touch decoding and force determination of the decoded touch(es), according to specific example embodiments of this disclosure.

Referring to FIGS. 13 to 23, depicted are schematic process flow diagrams for touch decoding and force determination of the decoded touch(es), according to specific example embodiments of this disclosure. FIG. 13 shows a general overview of possible processes for multi-touch decoding and force determination for a touch sensor 102 enabled device. It is contemplated and within the scope of this disclosure that more, fewer and/or some different processes may be utilized with a touch sensor 102 enabled device and still be within the scope, intent and spirit of this disclosure. In step 1050 a device is started, actuated, etc., when in step 1052 power is applied to the device. In step 1054 the device may be initialized, and thereafter in step 1056 the process of Touch Identification 504 may begin. Once the process of Touch Identification 504 in step 1056 has determined the touch locations, step 1057 determines the force applied at each of those touch locations. In step 1058 touch and force tracking may be performed on those touches identified in step 1056. In step 1060 the touch and force data may be further processed if necessary, otherwise it may be transmitted to the processing and control logic of the device for display and/or control of the device's intended purpose(s) in step 1062.

In the descriptions of the following process steps references to "top" or "north" channel or node will mean the channel or node above another channel or node, "bottom" or "south" channel or node will mean the channel or node below another channel or node, "left" or "west" channel or node will mean the channel or node to the left of another channel or node, and "right" or "east" channel or node will mean the channel or node to the right of another channel or node.

Figure 14:
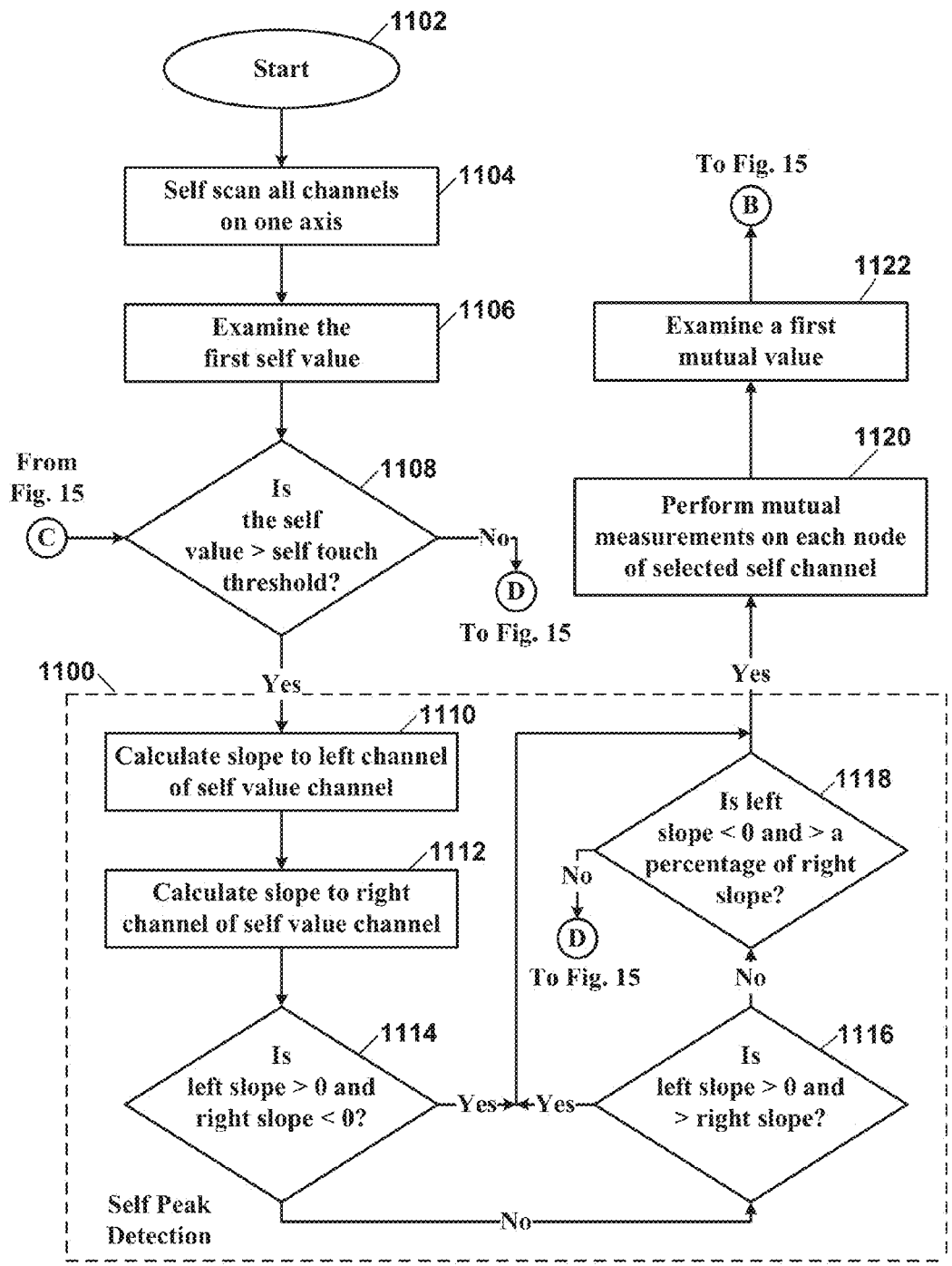

Referring to FIG. 14, a flow diagram of a process of Touch Identification 504 is shown and described hereinafter. In step 1102 the process of Touch Identification 504 (FIG. 5) begins. In step 1104 a self scan of all channels on one axis may be performed, e.g., either all columns or all rows. In step 1106 the first self scan value may be examined. In step 1108 the (first or subsequent) self scan value may be compared to a self touch threshold value.

A self peak detection process 1100 may comprise steps 1110 to 1118, and is part of the overall process of Peak Detection 510 (FIG. 5). If the self scan value is less than the self touch threshold value as determined in step 1108, then step 1238 (FIG. 15) may determine whether there are any additional self scan values to be examined. However, if the self scan value is equal to or greater than the self touch threshold value as determined in step 1108, then step 1110 may calculate a left slope between the self scan value and a self scan value of the channel to the left of the present channel. Then step 1112 may calculate a right slope between the self scan value and a self scan value of the channel to the right of the present channel.

Step 1114 determines whether the left slope may be greater than zero (positive slope) and the right slope may be less than zero (negative slope), identifying a peak. If a yes result in step 1114, then step 1120 may perform mutual scan measurements on each node of the channel selected from the self scan data. If a no result in step 1114, then step 1116 determines whether the left slope may be greater than zero (positive slope) and greater than the right slope may be, for example but is not limited to, two times (twice) greater than the right slope. If a yes result in step 1116, then in step 1120 mutual scan measurements may be performed on each node of the selected self scan channel. If a no result in step 1116, then step 1118 determines whether the left slope may be, for example but is not limited to, less than zero (negative slope) and greater than a percentage of the right slope, e.g., fifty (50) percent. If a yes result in step 1116, then step 1120 may perform mutual scan measurements on each node of the channel selected from the self scan data. If a no result in step 1116, then step 1238 (FIG. 15) may determine whether there are any additional columns to be examined based upon the self scan values thereof. Step 1122 may examine a first mutual scan value.

Figure 15:
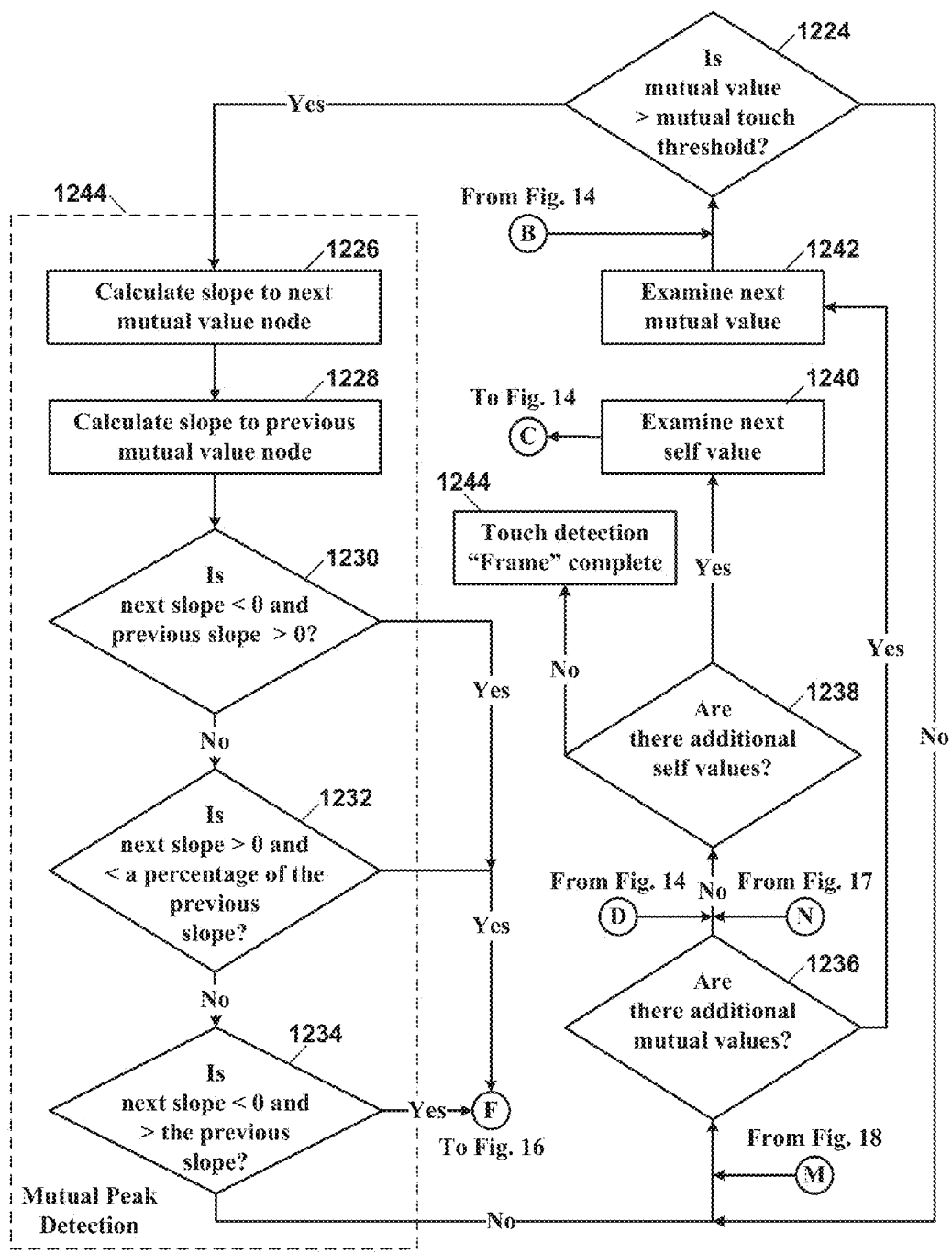

Referring to FIG. 15, a mutual peak detection process 1244 may comprise steps 1226 to 1234, and is part of the overall Peak Detection process 510 (FIG. 5). Step 1224 may compare the (first or subsequent) mutual scan value to a mutual touch threshold value, wherein if the mutual scan value is less than the mutual touch threshold value then step 1236 may determine whether there are any additional mutual scan values to be examined. However, if the mutual scan value is equal to or greater than the mutual touch threshold value then step 1226 may calculate a slope to the next mutual scan value node, then step 1228 may calculate a slope to the previous mutual scan value node.

Step 1230 determines whether the next slope may be less than zero (negative slope) and the previous slope may be greater than zero (positive slope). If a yes result in step 1230, then step 1350 (FIG. 16) may start the process of Nudge 512 and/or the process of Interpolation 514 (FIG. 5). If a no result in step 1230, then step 1232 determines whether the next slope may be, for example but is not limited to, greater than zero (positive slope) and less than a percentage of the previous slope. If a yes result in step 1232, then step 1350 (FIG. 16) may start the process of Nudge 512 and/or the process of Interpolation 514 (FIG. 5). If a no result in step 1232, then step 1234 determines whether the next slope may be, for example but is not limited to, less than zero (negative slope) and greater than the previous slope. If a yes result in step 1234, then step 1350 (FIG. 13) may start the process of Nudge 512 and/or the process of Interpolation 514 (FIG. 5). If a no result in step 1234, then step 1236 determines whether there may be any additional mutual values to be examined. If a yes result in step 1236, then step 1242 may examine a next mutual value. If a no result in step 1236, then step 1238 determines whether there may be any additional self scan values to be examined. If a yes result in step 1238, then step 1240 examines a next self scan value that may be returned to step 1108 (FIG. 14) for further processing thereof. If a no result in step 1238, then in step 1244 a touch detection frame may be complete.

Figure 16:
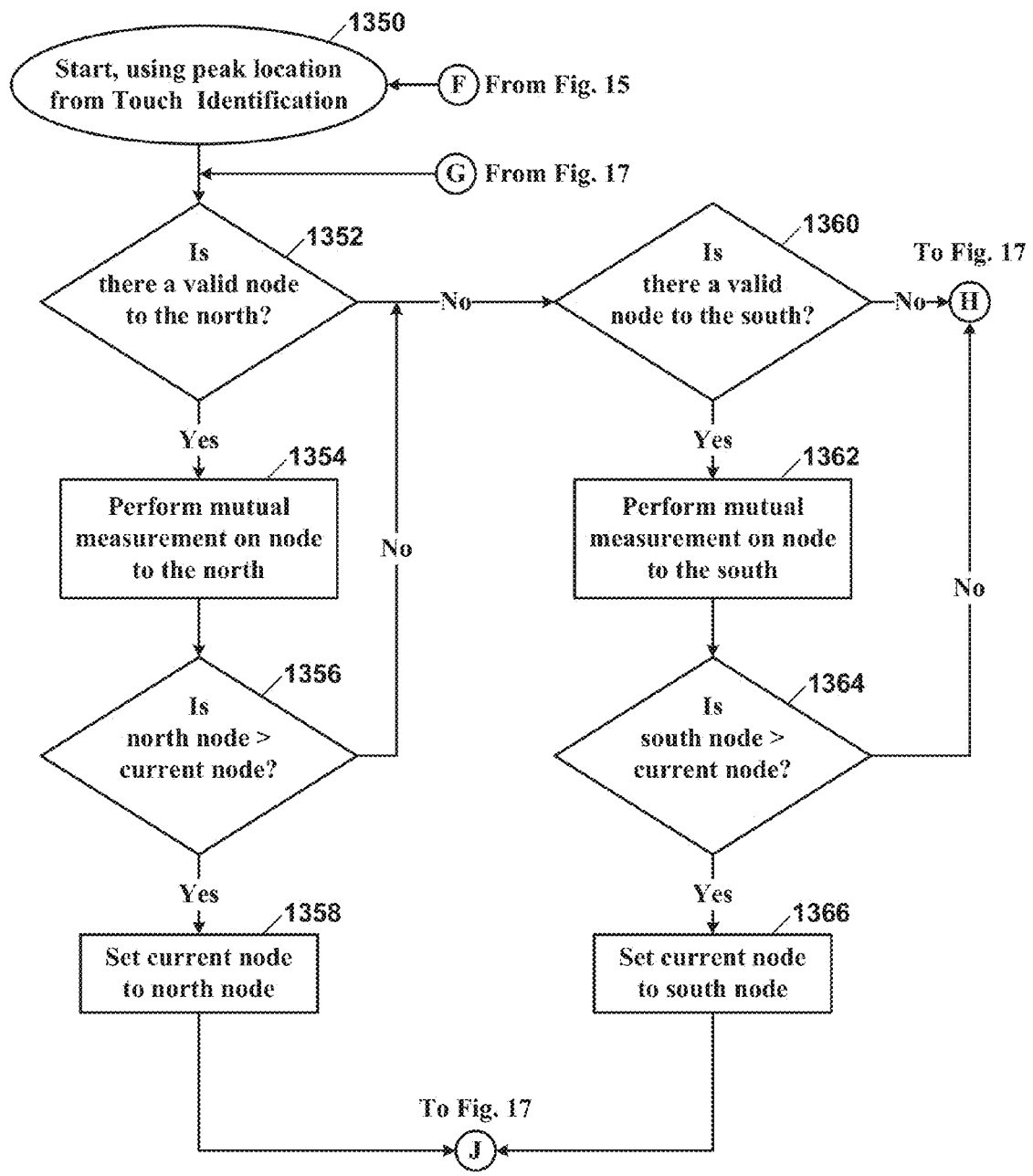
Figure 17:
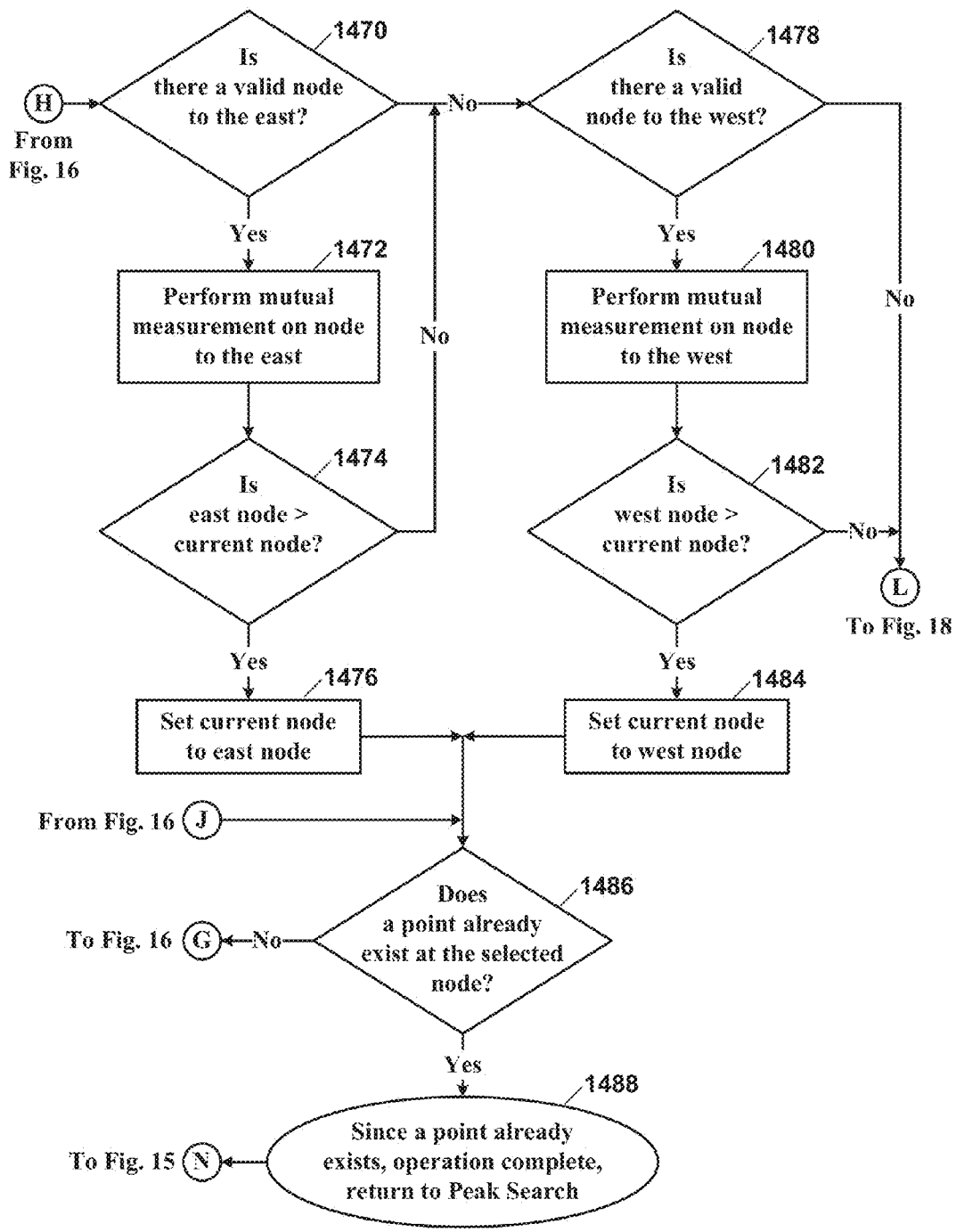
Figure 18:
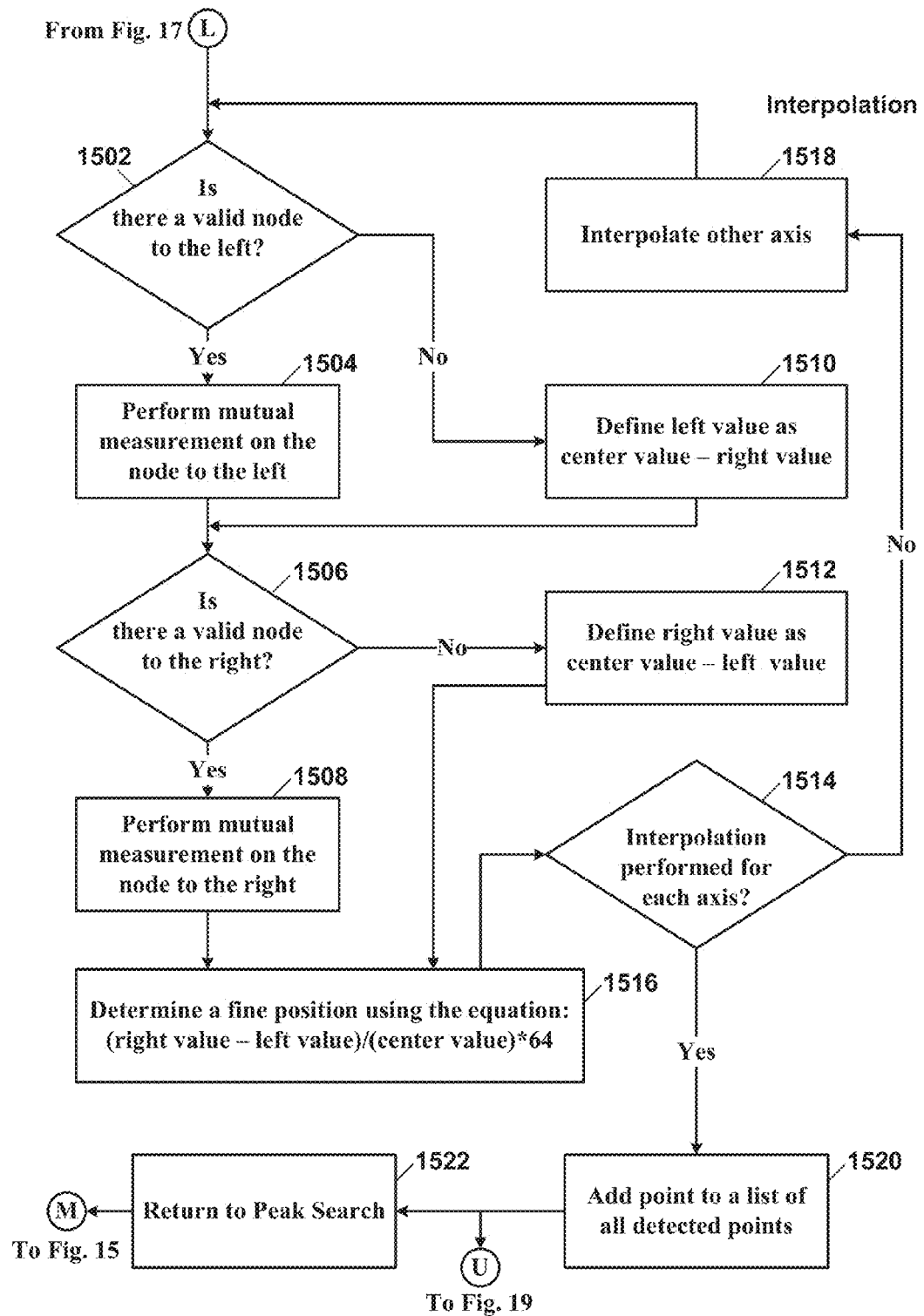

Referring to FIGS. 16-18, flow diagrams of processes for Nudge 512 and Interpolation 514 (FIG. 5) are shown and described hereinafter. Step 1350 may start the process of Nudge 512 and/or the process of Interpolation 514 by using a peak location from the process of Touch Identification 504 (FIG. 5) and may comprise the following process steps: Step 1352 determines whether there may be a valid node to the north. If a no result in step 1352, then continue to step 1360. If a yes result in step 1352, then step 1354 may make a mutual scan measurement of the node to the north. Step 1356 determines whether the mutual scan data of the north node may be greater than the current node. If a no result in step 1356, then continue to step 1360. If a yes result in step 1356, then in step 1358 the north node may become the current node, and then continue to step 1486 (FIG. 17).

Step 1360 determines whether there may be a valid node to the south. If a no result in step 1360, then continue to step 1470 (FIG. 17). If a yes result in step 1360, then step 1362 may make a mutual scan measurement of the node to the south. Step 1364 determines whether the mutual scan data of the south node may be greater than the current node. If a no result in step 1364, then continue to step 1470 (FIG. 17). If a yes result in step 1364, then in step 1366 the south node may become the current node, and then continue to step 1486 (FIG. 17).

Referring to FIG. 17, step 1470 determines whether there may be a valid node to the east. If a no result in step 1470, then continue to step 1478. If a yes result in step 1470, then step 1472 may make a mutual scan measurement of the node to the east. Step 1474 determines whether the mutual scan data of the east node may be greater than the current node. If a no result in step 1474, then continue to step 1478. If a yes result in step 1474, then in step 1476 the east node may become the current node, and then continue to step 1486.

Step 1478 determines whether there may be a valid node to the west. If a no result in step 1478, then continue to step 1502 (FIG. 18). If a yes result in step 1478, then step 1480 may make a mutual measurement of the node to the west. Step 1482 determines whether the mutual scan data of the west node may be greater than the current node. If a no result in step 1482, then continue to step 1502 (FIG. 18). If a yes result in step 1482, then in step 1484 the west node may become the current node. Step 1486 determines whether a touch point may already exist at the selected node. If a no result in step 1486, then continue to step 1352 (FIG. 16). If a yes result in step 1486, then step 1488 may eliminate the current peak, and then continue to step 1236 (FIG. 15).

Referring to FIG. 18, a flow diagram of a process of Interpolation 514 may comprise steps 1502 to 1518. Step 1502 determines whether there may be a valid node to the left. If a no result in step 1502, then continue to step 1510 wherein the left node value may be defined as a center value minus a right value then continue to step 1506. If a yes result in step 1502, then step 1504 may perform a mutual scan measurement on the node to the left. Then step 1506 determines whether there may be a valid node to the right. If a no result in step 1506, then continue to step 1512 wherein the right node value may be defined as a center value minus a left value then continue to step 1516. If a yes result in step 1506, then step 1508 may perform a mutual scan measurement on the node to the right. Step 1516 may determine a fine position by subtracting the left value from the right value, dividing the difference thereof by the center value, and then multiplying the result by, for example but is not limited to, the number 64. It is contemplated and within the scope and spirit of this disclosure that many ways of determining valid peaks and nodes may be used as one having ordinary skill in the art of touch detection and tracking could readily implement by having knowledge based upon the teachings of this disclosure After step 1516 has completed the aforementioned calculations, step 1514 determines whether an Interpolation 514 may have been performed for each axis. If a no result in step 1514, then step 1518 may interpolate another axis, thereafter steps 1502 to 1516 may be repeated, with "above" replacing "left" and "below" replacing "right" in each step. If a yes result in step 1514, then step 1520 may add this touch point to a list of all detected touch points. Then step 1522 may return to step 1236 (FIG. 15) for any additional mutual scan values to be examined.

Figure 19:
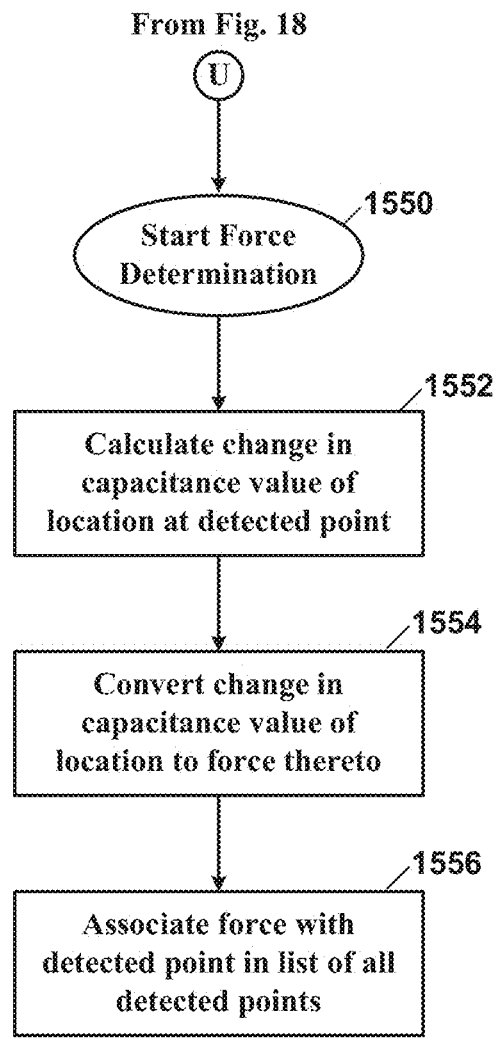

Referring to FIG. 19, a flow diagram of a process of Force Identification 505 is shown and described hereinafter. After a new touch point is added in step 1520 (FIG. 18), step 1550 starts the process of determining the force applied to the touch sensor 102 at that touch point. Untouched mutual capacitances of each point on the touch sensor 102 may be stored in a memory of the digital processor 106 after a "no touch" calibration scan of all points of the touch sensor 102 is performed. When a force is applied to a touch location, the value of the mutual capacitance of that touch location will increase. In step 1552 that mutual capacitance change may be determined, and in step 1554 the mutual capacitance change may be converted into a force value. Once this force value is determined, in step 1556 the force value may then be associated with the new touch point and stored in the list of all detected touches.

Figure 20:
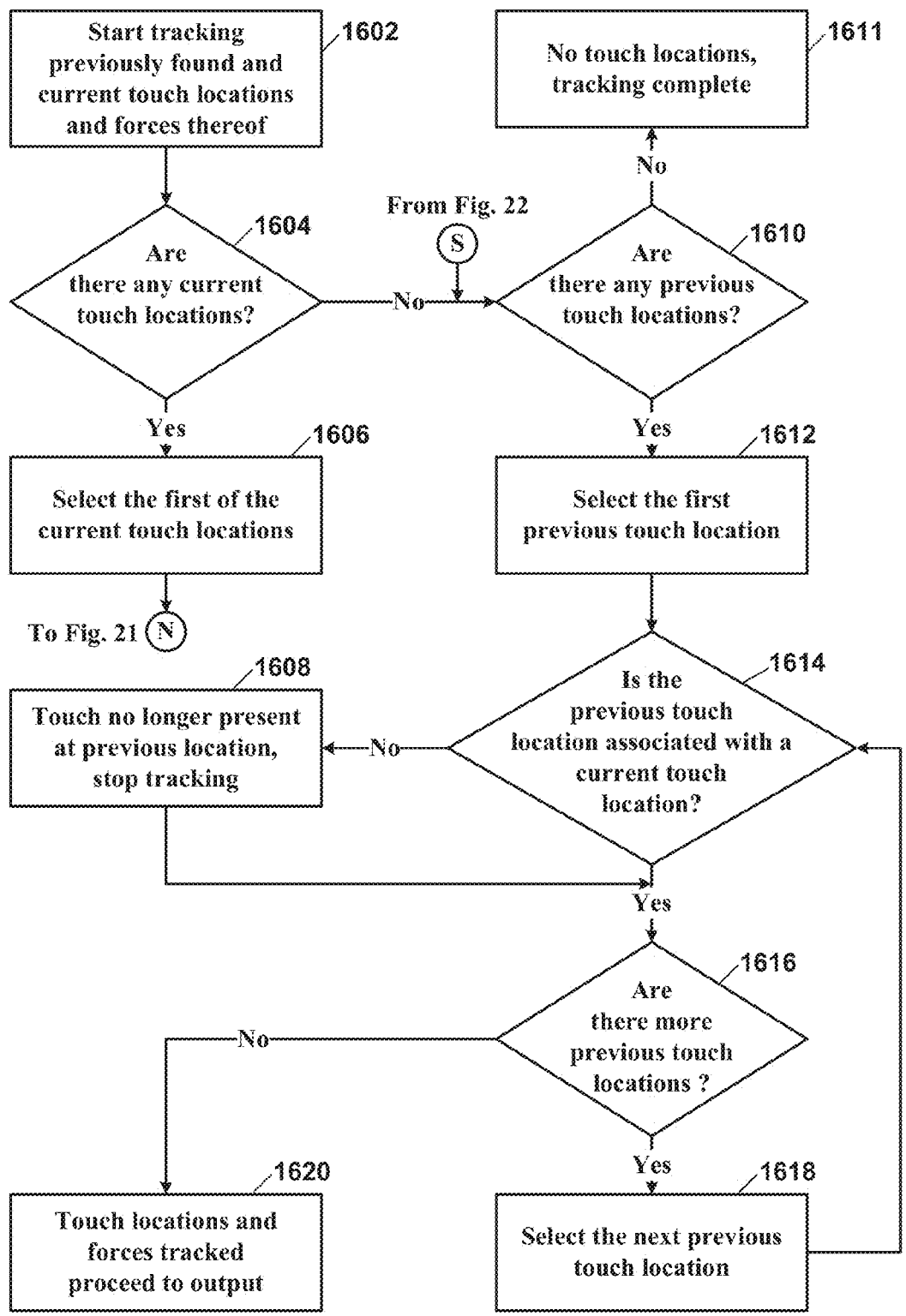
Figure 21:
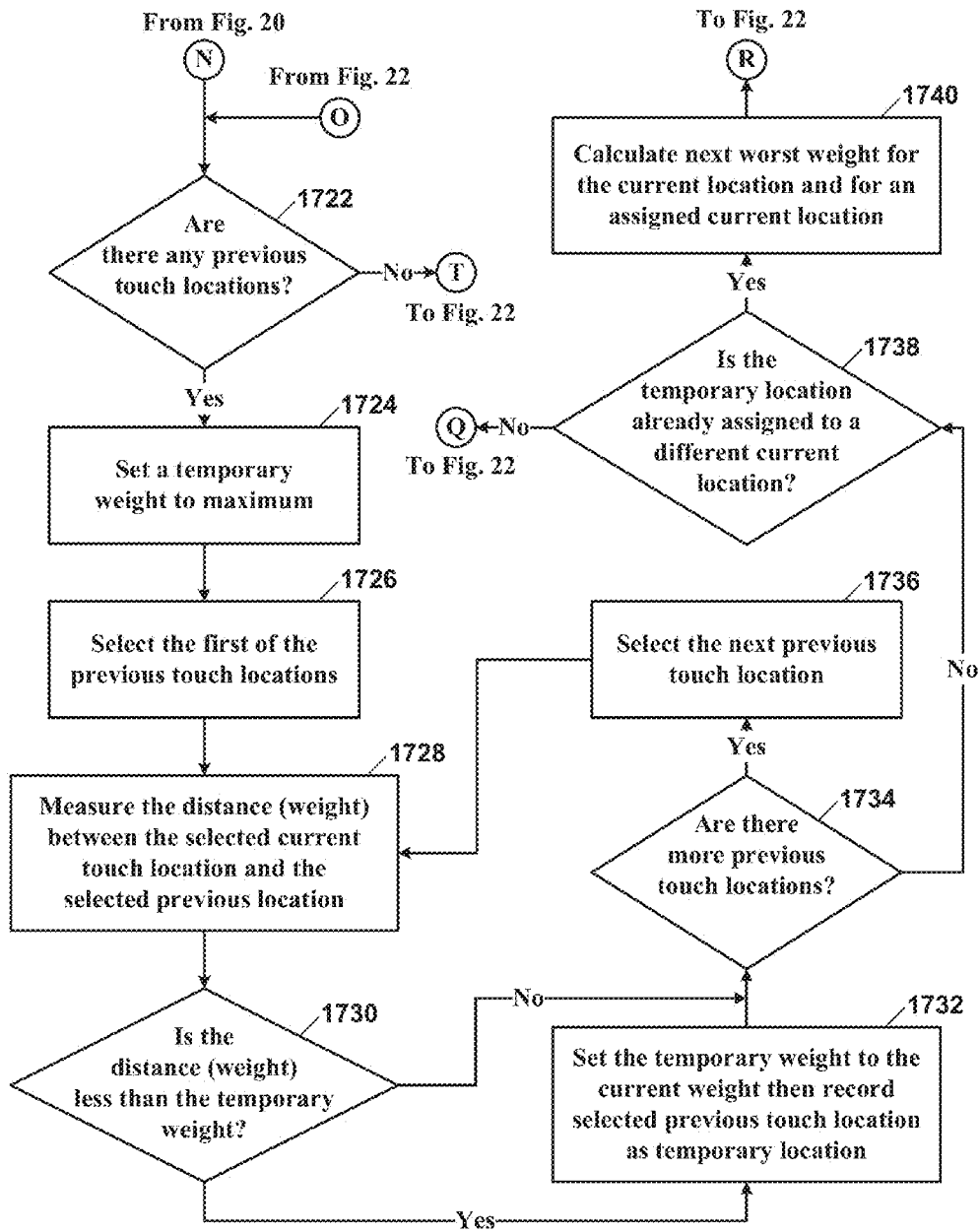
Figure 22:
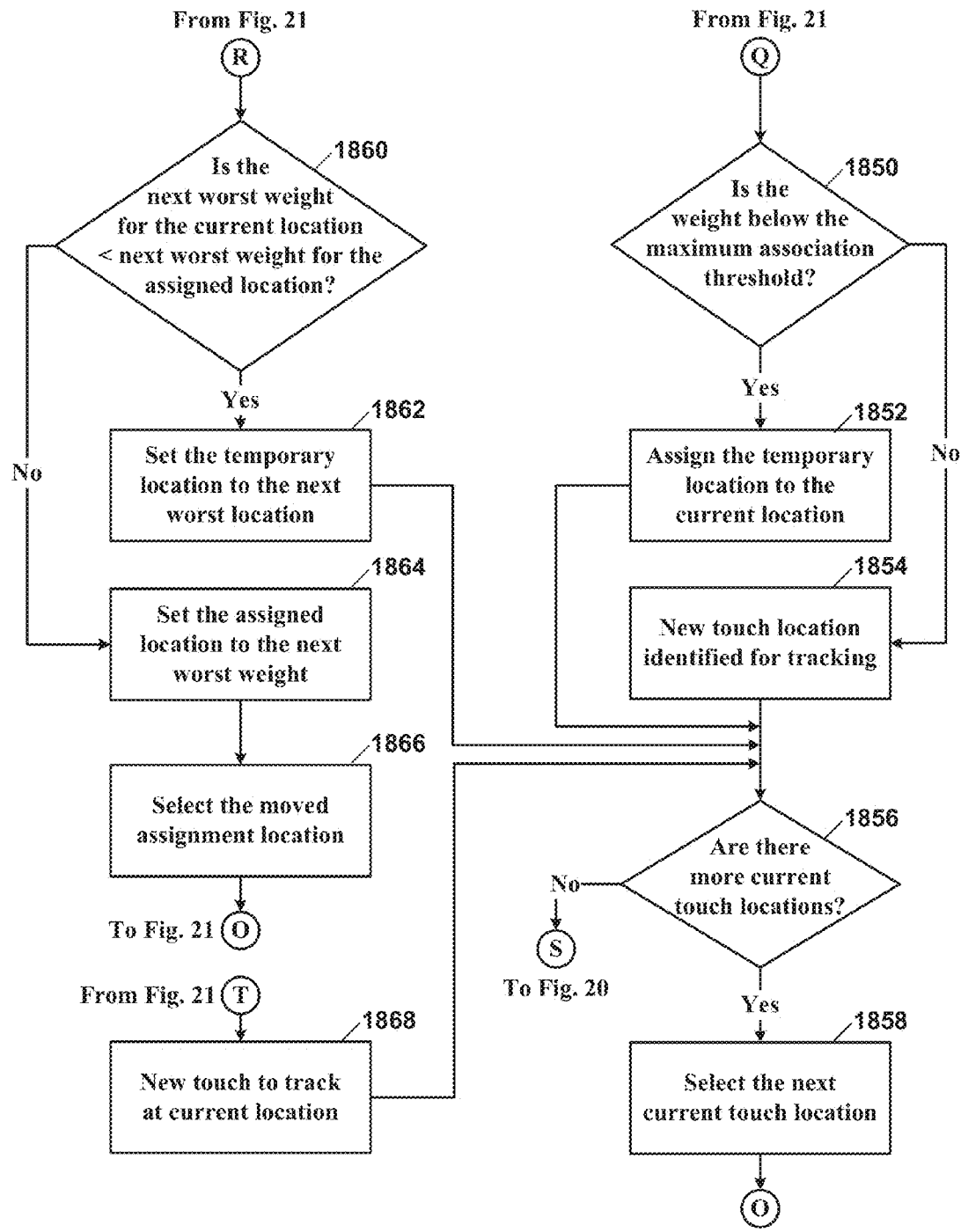

Referring to FIGS. 20, 21 and 22, flow diagrams of a process of Touch and Force Tracking 506 are shown and described hereinafter. In step 1602 the process of Touch and Force Tracking 506 may start by using the previously found and current touch locations. Step 1604 determines whether there may be any current touch locations. If a yes result in step 1604, then step 1606 may select the first of the current touch locations, and thereafter may continue to step 1722 (FIG. 21). If a no result in step 1604, then step 1610 determines whether there may be any previous touch location(s). If a yes result in step 1610, then step 1612 may select the first previous touch location. If a no result in step 1610, then at step 1611 tracking is complete.

Step 1614 determines whether the previous touch location may be associated with a current touch location. If a no result in step 1614, then step 1608 may assert an output of "touch no longer present at previous touch location, stop tracking," and then return to step 1616. If a yes result in step 1614, then step 1616 determines whether there may be any more previous touch locations. If a no result in step 1616, then at step 1620 tracking touch locations is complete and the touch location data may be transmitted as Data Output 508 (FIG. 5) for further processing by the microcontroller 112 (FIG. 1). If a yes result in step 1616, then step 1618 may select the next previous touch location, and thereafter return to step 1614.

Referring to FIG. 21, step 1722 determines whether there may be any previous touch locations. If a no result in step 1722, then continue to step 1868 (FIG. 22) wherein a "New Touch to track is identified" at current location, and thereafter continue to step 1856 (FIG. 22). If a yes result in step 1722, then step 1724 may set a temporary weight value to a maximum weight value. Step 1726 may select the first of the previous touch locations. Then step 1728 may measure a distance between the selected current touch location and the selected previous touch location to determine a current distance (weight value) therebetween. Step 1730 determines whether the current weight value may be less than the temporary weight value. If a yes result in step 1730, then step 1732 may set the temporary weight value to the current weight value and thereafter may record the selected previous touch location as a temporary location and continue to step 1734. If a no result in step 1730, then step 1734 determines whether there may be more previous touch locations. If a yes result in step 1734, then step 1736 may select the next previous touch location, and thereafter return to step 1728. If a no result in step 1734, then step 1738 determines whether the temporary location may have already been assigned to a different current location. If a yes result in step 1738, then step 1740 may calculate a next worst weight value for the current location and for an assigned current location, and thereafter continue to step 1860 (FIG. 22). If a no result in step 1738, then continue to step 1850 (FIG. 22).

Referring to FIG. 22, step 1850 determines whether the weight value may be below a maximum association threshold. If a no result in step 1850, then step 1854 may identify a new touch location for tracking. If a yes result in step 1850, then step 1852 may assign a new temporary location to the current location and then continue to step 1856. Step 1860 determines whether the next worst weight value for the current location may be less than the next worst weight value for the assigned location. If a yes result in step 1860, then step 1862 may set the temporary location to the next worst location and thereafter continue to step 1856. If a no result in step 1860, then step 1864 may set the assigned location to the next worst weight value. Step 1866 may select a moved assignment location and thereafter return to step 1722 (FIG. 21). Step 1856 determines whether there may be more current touch locations. If a yes result in step 1856, then step 1858 may select the next current touch location and thereafter return to step 1722 (FIG. 21).

Figure 23:
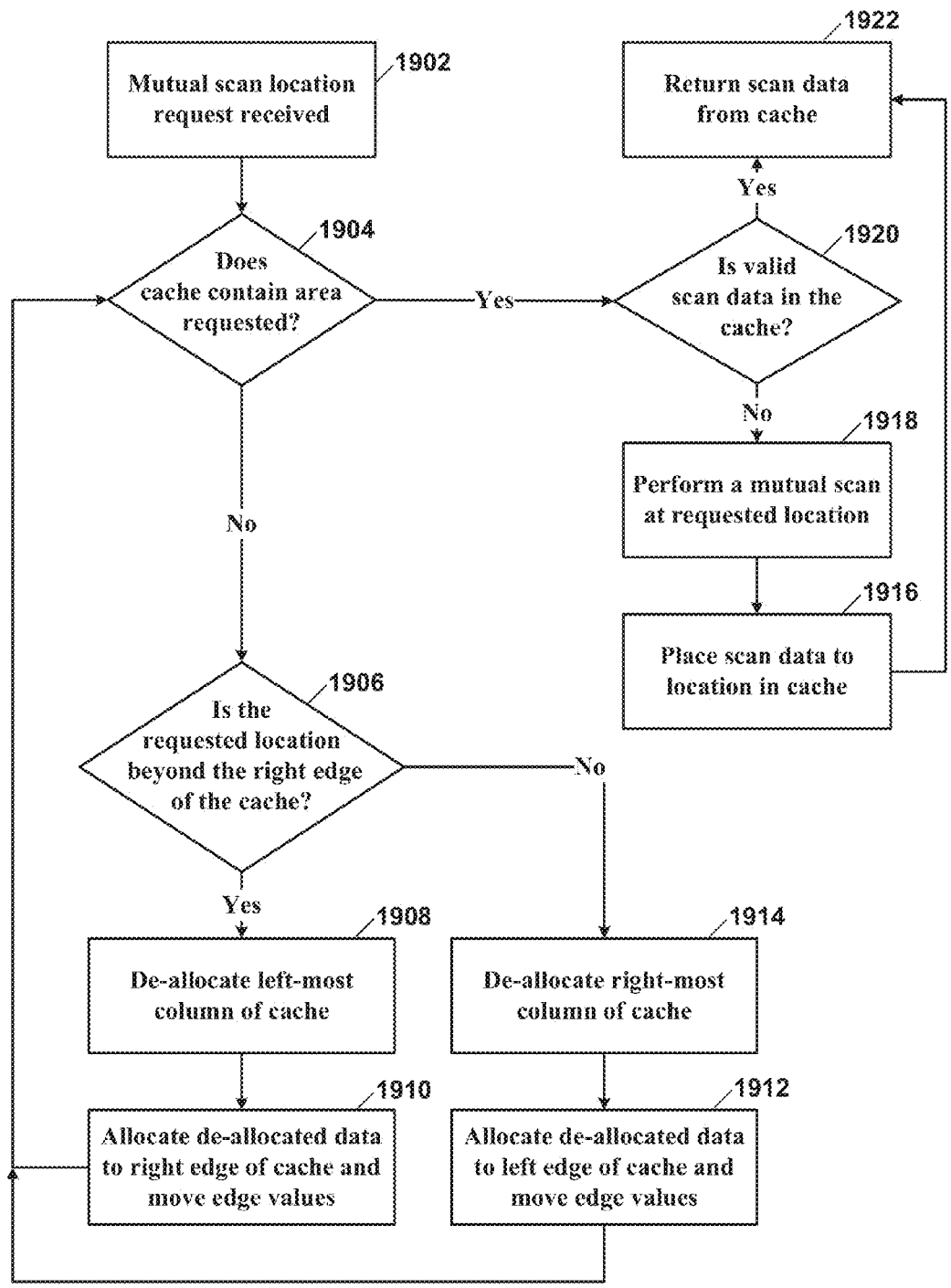

Referring to FIG. 23, depicted is a process flow diagram for a column cache, according to specific example embodiments of this disclosure. Step 1902 may received a mutual scan location request. Step 1904 determines whether the mutual scan area location requested may be stored in the cache memory. If a yes result in step 1904, then step 1920 determines whether the mutual scan data stored in the cache memory may be valid. If a yes result in step 1920, then step 1922 may return mutual scan data to the cache memory. If a no result in step 1920, then step 1918 may perform a mutual scan at the requested location, wherein step 1916 may write the mutual scan data to a location in the cache memory and then return back to step 1922.

If a no result in step 1904, then step 1906 determines whether the requested touch location may be beyond the right edge of the cache. If a yes result in step 1906, then step 1908 may de-allocate the left-most column of mutual scan data from the cache memory. In step 1910 the de-allocated mutual scan data may be allocated to the right edge of the cache memory so as to move the edge values thereof, and thereafter return to step 1904. If a no result in step 1906, then step 1914 may de-allocate the right-most column of data from the cache memory. In step 1912 the de-allocated mutual scan data may be allocated to the left edge of the cache memory so as to move the edge values thereof, and thereafter return to step 1904.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for decoding multiple touches and forces thereof on a touch sensing surface, said method comprising the steps of:
   scanning a plurality of channels aligned on an axis for determining self-capacitance values of each of the plurality of channels;
   comparing the self-capacitance values to determine which one of the channels has a local maximum self-capacitance value, wherein left and right slope values are determined for the at least one self-value, wherein:
   the left slope value is equal to the at least one self-value minus a self-value of a channel to the left of the at least one channel, and
   the right slope value is equal to the at least one self-value minus a self-value of a channel to the right of the at least one channel:
     wherein when the left slope value is greater than zero (0) and the right slope value is less than zero (0), then determine a local maximum self-capacitance value and return to the step of scanning the plurality of nodes of the at least one channel, and when no then continue to next step:
     wherein when a ratio between a positive left slope value and a positive right slope value is greater than a predefined threshold, then determine a local maximum self-capacitance value and return to the step of scanning the plurality of nodes of the at least one channel, and when not then continue to the next step;
     wherein when a ratio between a negative left slope value and a negative right slope value is less than a predefined threshold, then determine a local maximum self-capacitance value and return to the step of scanning the plurality of nodes of the at least one channel, and when not then continue to the next step;
   wherein when there is another self-value, then return to the step of determining left and right slope values;
   scanning a plurality of nodes of at least one channel having local maximum self-capacitance value for determining mutual values of the nodes;
   comparing the mutual values to determine which one of the nodes has the largest mutual capacitance value, wherein the node having the largest mutual capacitance value on the local maximum self-capacitance value channel is a potential touch location; and
   determining a force at the potential touch location from a change in the mutual capacitance values of the node at the potential touch location during no touch and during a touch thereto.

2. The method according to claim 1, further comprising the steps of:
   determining the left and right slope value only when the at least one self-value is greater than a self-touch threshold.

3. The method according to claim 2, further comprising the steps of:
   determining if at least one of the mutual values is greater than a mutual touch threshold, wherein
   if yes then continue to the step of scanning a plurality of nodes of the at least one channel having the largest self value, and
   if no then end the touch detection frame as completed.

4. The method according to claim 3, further comprising the steps of:
   determining a next slope value, wherein the next slope value is equal to a current mutual value minus a next mutual value of a next node; and
   determining a previous slope value, wherein the previous slope value is equal to the current mutual value minus a previous mutual value of a previous node.

5. The method according to claim 4, further comprising the steps of: determining if the next slope value is less than zero (0) and the previous slope value is greater than zero (0), wherein
   when yes then begin the step of validating the node, and
   when no then continue to next step;

determining if the next slope value is greater than zero (0) and less than a percentage of the previous slope value, wherein
when yes then begin the step of validating the node, and when no then continue to next step;
determining if the next slope value is less than zero (0) and greater than the previous slope value, wherein
when yes then begin the step of validating the node, and when no then continue to next step;
determining if there is another mutual value, wherein
when yes then return to the step of determining if at least one of the mutual values is greater than the mutual touch threshold, and
when no then continue to the next step; and determining if there is another self-value, wherein
when yes then examine another self-value and return to the step of determining if at least one of the self-values is greater than a self-touch threshold, and
when no then end the touch detection frame as completed.

6. The method according to claim 5, wherein the nodes are arranged in a matrix extending from east to west on a X-axis and from north to south on a Y-axis and wherein the step of validating the node comprises the steps of:
identifying the node having a local maximum mutual value as a current node; determining if there is a valid node north of the current node, wherein
when no then continue to the step of determining if there is a valid node south of the current node, and
when yes then perform a mutual measurement on the north node and continue to the next step;
determining if the north node is greater than the current node,
when yes then make the north node the current node and continue to the step of determining whether a touch point already exists at this node, and
when no then continue to the next step;
determining if there is a valid node south of the current node, wherein
when no then continue to the step of determining if there is a valid node east of the current node, and
when yes then perform a mutual measurement on the south node and continue to the next step;
determining if the south node is greater than the current node, wherein
when yes then make the south node the current node and continue to the step of determining whether a touch point already exists at this node, and
when no then continue to the next step;
determining if there is a valid node east of the current node, wherein
when no then continue to the step of determining if there is a valid node west of the current node, and
when yes then perform a mutual measurement on the east node and continue to the next step;
determining if the east node is greater than the current node,
when yes then make the east node the current node and continue to the step of determining whether a touch point already exists at this node, and
when no then continue to the next step;
determining if there is a valid node west of the current node, wherein
when no then continue to the step of determining if there is a valid node left of the current node, and
when yes then perform a mutual measurement on the west node and continue to the next step;
determining if the west node is greater than the current node,
when yes then make the west node the current node and continue to the step of determining whether a touch point already exists at this node, and
when no then continue to the next step;
determining if there is a valid node left of the current node, wherein
when no then define a left mutual value as a center mutual value minus a right mutual value and continue to the step of determining a fine position for the node, and
when yes then perform a mutual measurement on the left node and continue to the next step;
determining if there is a valid node right of the current node, wherein
when no then define the mutual value as the center mutual value minus the left mutual value and continue to the step of determining the fine position for the node, and
when if yes then perform a mutual measurement on the right node and continue to the next step;
defining a fine position of the node by subtracting the left value from the right value, dividing this difference by the center value and multiplying the result thereof by 64 and continue to the next step; and
determining whether interpolation was performed for each axis, wherein
when yes, then add another touch point to a list of all detected touch points and return to the step of determining if there are additional mutual values, and
when no, then interpolate another axis by using left and right nodes of the other axis for starting again at the step of determining if there is a valid node left of the current node.

7. A system for determining gesturing motions and forces thereof on a touch sensing surface having a visual display, said system comprising:
a first plurality of electrodes arranged in a parallel orientation having a first axis, wherein each of the first plurality of electrodes comprises a self-capacitance;
a second plurality of electrodes arranged in a parallel orientation having a second axis substantially perpendicular to the first axis, the first plurality of electrodes are located over the second plurality of electrodes and form a plurality of nodes comprising overlapping intersections of the first and second plurality of electrodes, wherein each of the plurality of nodes comprises a mutual capacitance;
a flexible electrically conductive cover over the first plurality of electrodes, wherein a face of the flexible electrically conductive cover forms the touch sensing surface;
a plurality of deformable spacers between the flexible electrically conductive cover and the first plurality of electrodes, wherein the plurality of deformable spacers maintains a distance between the flexible electrically conductive cover and the first plurality of electrodes;
a digital processor and memory, wherein digital outputs of the digital processor are coupled to the first and second plurality of electrodes;
an analog front end coupled to the first and second plurality of electrodes;
an analog-to-digital converter (ADC) having at least one digital output coupled to the digital processor;
wherein
values of the self-capacitances are measured for each of the first plurality of electrodes by the analog front end, the values of the measured self-capacitances are stored in the memory, the digital processor is configured to determine for each measured self-capacitance value of each of the first plurality of electrodes left and right slope values for the at least one self-value, wherein:

the left slope value is equal to the at least one self-value minus a self-value of a electrode to the left, and the right slope value is equal to the at least one self-value minus a self-value of a electrode to the right;

the digital processor is further configured:

to determine from the measured self-capacitance values local maximum self-capacitance values when the left slope value is greater than zero (0) and the right slope value is less than zero (0), or a ration between a positive left slope value and a positive right slope value is greater than a predefined threshold or when a ratio between a negative left slope value and a negative right slope value is less than a predefined threshold;

to control the analog front end to measure values of the mutual capacitances of the nodes of at least one of the first electrodes having at least one local maximum self-capacitance values of the largest values, to store the values of the measured mutual capacitances in the memory; and the digital processor uses the stored self and mutual capacitance values for determining a gesturing motion and at least one force associated therewith applied to the touch sensing surface.

8. The system according to claim 7, wherein the digital processor, memory, analog front end and ADC are provided by a digital device.

9. The system according to claim 8, wherein the digital device comprises a microcontroller.

10. The system according to claim 7, wherein the flexible electrically conductive cover comprises a flexible metal substrate.

11. The system according to claim 7, wherein the flexible electrically conductive cover comprises a flexible non-metal substrate and an electrically conductive coating on a surface thereof.

12. The system according to claim 7, wherein the flexible electrically conductive cover comprises a substantially light transmissive flexible substrate and a coating of Indium Tin Oxide (ITO) on a surface of the flexible substrate.

13. The system according to claim 7, wherein the flexible electrically conductive cover comprises a substantially light transmissive flexible substrate and a coating of Antimony Tin Oxide (ATO) on a surface of the flexible substrate.

14. A system according to claim 7 for determining the gesturing motion and the at least one force associated therewith, wherein the system is configured to select an object shown in the visual display when the object is touched with a first force.

15. The system according to claim 14, wherein the system is configured to lock the object in place when the object is touched with a second force.

16. The system according to claim 15, wherein the system is configured to release the lock on the object when the object is touched with a third force and the touch is moved in a direction across the touch sensing surface.

17. The system according to claim 15, wherein the system is configured to release the lock on the object when the touch at a first force to the object is removed and thereafter the object is touched again at a second force.

18. The system according to claim 17, wherein the second force is greater than the first force.

19. A system according to claim 7 for determining the gesturing motion and the at least one force associated therewith, wherein when a right portion of an object shown in the visual display is touched with a first force;

and a left portion of the object is touched with a second force;

and when the first force is greater than the second force the system is configured to rotate the object in a first direction, and when the second force is greater than the first force to rotate the object in a second direction.

20. The system according to claim 19, wherein the first direction is clockwise and the second direction is counter-clockwise.

21. The system according to claim 19, wherein when the touch at the left portion of the object moves toward the right portion of the object, the system is configured to rotate the object in a third direction, and when the touch at the right portion of the object moves toward the left portion of the object, the system is configured to rotate the object in a fourth direction.

22. The system according to claim 21, wherein the first and second directions are substantially perpendicular to the third and fourth directions.

23. A system according to claim 7 for determining the gesturing motion and the at least one force associated therewith, wherein the system is configured to change a size of an object shown in the visual display when a portion of the object is touched with a force, wherein the greater the force the large the size of the object becomes.

24. The system according to claim 23, wherein the size of the object is fixed when the touch and the force are moved off of the object.

25. The system according to claim 23, wherein the size of the object varies in proportion to the amount of force applied to the object.

26. A system according to claim 7 for determining the gesturing motion and the at least one force associated therewith, wherein the system is configured to handle pages of a document shown in the visual display when a portion of the document is touched with a force sufficient to flip through the pages.

27. The system according to claim 26, wherein the system is configured to remove a currently visible page when the touch at the currently visible page is moved in a first direction parallel with the touch sensing surface.

28. The system according to claim 27, wherein the system is configured to insert the removed page into a new document when the removed page is touched with the force near the new document.

29. A method system according to claim 7 for determining the gesturing motion and the at least one force associated therewith, wherein the system is configured to values of an alpha-numeric character shown in the visual display when the alpha-numeric character is touched with different forces, wherein a first force will cause the alpha-numeric character to increment and a second force will cause the alpha-numeric character to decrement.

30. The system according to claim 29, wherein the value of the alphanumeric character is locked when the touch is moved off of the alpha-numeric character and parallel to the touch sensing surface.

31. A system according to claim 7 for determining the gesturing motion and the at least one force associated therewith, wherein the system is configured to increment a value of an alpha-numeric character shown in the visual display when an upper portion of the alpha-numeric character is touched with a force; and to decrement the value of the alpha-numeric character by touching when a lower portion of the alpha-numeric character is touched with the force.

32. The system according to claim 31, wherein the value of the alphanumeric character is locked when the touch is moved off of the alpha-numeric character and parallel to the touch sensing surface.

33. The system according to claim 31, wherein a speed of incrementing or decrementing the value of the alpha-numeric character is proportional to a magnitude of the force applied to upper portion or lower portion, respectively, of the alpha-numeric character.

34. The system according to claim 29, wherein the alpha-numeric character is a number.

35. The system according to claim 29, wherein the alpha-numeric character is a letter of an alphabet.

36. A method for decoding multiple touches and forces thereof on a touch sensing surface comprising electrodes arranged in a matrix extending from east to west on an X-axis and from north to south on a Y-axis, said method comprising the steps of:

scanning a plurality of channels aligned on the X-axis for determining self-capacitance values of each of the plurality of channels;

comparing the self-capacitance values to determine which one of the channels has a local maximum self-capacitance value, wherein a self-capacitance value is only compared when the self-capacitance value is greater than a self-touch threshold, scanning a plurality of nodes of each channel for which a local maximum self-capacitance value has been determined for determining mutual values of the nodes comparing the mutual values to determine which one of the nodes has the largest mutual capacitance value, wherein the node having the largest mutual capacitance value on a local maximum self-capacitance value channel is a potential touch location, wherein for each channel only mutual values that are greater than a mutual touch threshold are considered, wherein the nodes are formed by electrodes of the X-axis and electrodes of the Y-axis;

wherein for each considered mutual value of a channel a next slope value and a previous slope value are determined, wherein the next slope value is equal to a current mutual value minus a next mutual value of a next node, and wherein the previous slope value is equal to the current mutual value minus a previous mutual value of a previous node;

determining if the next slope value is less than zero (0) and the previous slope value is greater than zero (0), wherein when yes then begin a step of validating the node, and when no then continue to the next step;

determining if the next slope value is greater than zero (0) and less than a percentage of the previous slope value, wherein when yes then begin the step of validating the node, and when no then continue to the next step;

determining if the next slope value is less than zero (0) and greater than the previous slope value, wherein when yes then begin the step of validating the node, and when no then continue to the next step;

determining if there is another mutual value, wherein when yes then return to the step of determining if at least one of the mutual values is greater than the mutual touch threshold, and when no then continue scanning and comparing for a next channel until a touch detection frame is completed;

wherein the step of validating a node comprises the steps of:

identifying the node having a local maximum mutual value as a current node;

determining if there is a valid node north of the current node, wherein when no then continue to the step of determining if there is a valid node south of the current node, and when yes then perform a mutual measurement on the north node and continue to the next step;

determining if the north node is greater than the current node, when yes then make the north node the current node and continue to the step of determining whether a touch point already exists at this node, and when no then continue to the next step determining if there is a valid node south of the current node, wherein when no then continue to the step of determining if there is a valid node east of the current node, and when yes then perform a mutual measurement on the south node and continue to the next step;

determining if the south node is greater than the current node, wherein when yes then make the south node the current node and continue to the step of determining whether a touch point already exists at this node, and when no then continue to the next step;

determining if there is a valid node east of the current node, wherein when no then continue to the step of determining if there is a valid node west of the current node, and when yes then perform a mutual measurement on the east node and continue to the next step;

determining if the east node is greater than the current node, when yes then make the east node the current node and continue to the step of determining whether a touch point already exists at this node, and when no then continue to the next step;

determining if there is a valid node west of the current node, wherein when no then continue to the step of determining if there is a valid node left of the current node, and when yes then perform a mutual measurement on the west node and continue to the next step;

determining if the west node is greater than the current node, when yes then make the west node the current node and continue to the step of determining whether a touch point already exists at this node, and when no then continue to the next step;

determining if there is a valid node left of the current node, wherein when no then define a left mutual value as a center mutual value minus a right mutual value and continue to the step of determining a fine position for the node, and when yes then perform a mutual measurement on the left node and continue to the next step;

determining if there is a valid node right of the current node, wherein when no then define the mutual value as the center mutual value minus the left mutual value and continue to the step of determining the fine position for the node, and when yes then perform a mutual measurement on the right node and continue to the next step;

defining a fine position of the node by subtracting the left value from the right value, dividing this difference by the center value and multiplying the result thereof by 64 and continue to the next step; and determining whether interpolation was performed for each axis, wherein when yes, then add another touch point to a list of all detected touch points and return to the step of determining if there are additional mutual values, and when no, then interpolate another axis by using left and right nodes of the other axis for starting again at the step of determining if there is a valid node left of the current node; and determining a force at the potential touch location from a change in the mutual capacitance values of the node at the potential touch location during no touch and during a touch thereto.

* * * * *